United States Patent
Zhu et al.

(10) Patent No.: US 6,977,791 B2
(45) Date of Patent: Dec. 20, 2005

(54) MEDIA SERVOWRITING SYSTEM

(75) Inventors: Jun Zhu, Palo Alto, CA (US); Alex Moraru, Aptos, CA (US); Teodor Zanetti, Sunnyvale, CA (US); Franklin Tao, Union City, CA (US); Dan L. Kilmer, Seiad Valley, CA (US); Harald Hess, La Jolla, CA (US); Tom Carr, Leucadia, CA (US); Matt Bellis, Santa Rosa, CA (US); Gustavo A. Pinto, Belmont, CA (US); Patrick Rodney Lee, San Diego, CA (US)

(73) Assignee: KLA-Tencor Technologies Corporation, Milpitas, CA (US)

( * ) Notice: Subject to any disclaimer, the term of this patent is extended or adjusted under 35 U.S.C. 154(b) by 181 days.

(21) Appl. No.: 10/395,051

(22) Filed: Mar. 22, 2003

(65) Prior Publication Data

US 2004/0125488 A1 Jul. 1, 2004

(Under 37 CFR 1.47)

Related U.S. Application Data

(60) Provisional application No. 60/367,046, filed on Mar. 23, 2002.

(51) Int. Cl.[7] ............................................. G11B 21/02
(52) U.S. Cl. ..................... 360/75; 360/77.03; 360/78.11
(58) Field of Search ................................ 360/75, 77.03, 360/78.11

(56) References Cited

U.S. PATENT DOCUMENTS

| 5,333,140 A | | 7/1994 | Moraru et al. ............... 714/719 |
| 5,909,333 A | * | 6/1999 | Best et al. ..................... 360/51 |

* cited by examiner

Primary Examiner—David Hudspeth
Assistant Examiner—Mitchell Slavitt
(74) Attorney, Agent, or Firm—Smyrski Law Group, A P.C.

(57) ABSTRACT

A system and methods for efficiently performing media writing functions is disclosed. The system and methods include: detecting media movement with respect to a base and heads during reading and writing, and moving the heads in response; using an interferometer, such as a dual beam differential interferometer, to dynamically monitor disk position and address perceived errors; and minimizing repeatable and non repeatable runout error by writing data, such as servo bursts, in multiple revolutions to average adverse runout conditions. The present system has the ability to use an interferometer to enhance media certification and perform on line, in situ monitoring of the media, and includes shrouding, head mounting, disk biasing, and related mechanical aspects beneficial to media writing.

42 Claims, 25 Drawing Sheets

MEDIA SERVOWRITING SYSTEM

This application claims the benefit of U.S. Provisional Patent Application Ser. No. 60/367,046, filed Mar. 23, 2002.

BACKGROUND OF THE INVENTION

1. Field of the Invention

The present invention relates generally to the field of data storage media, and more specifically to systems and methods for efficiently initializing, certifying or otherwise reading data from or writing data to such media.

2. Description of the Related Art

Disk drives are magnetic recording devices used for the storage of digital information. The digital information is recorded on substantially-concentric tracks on either surface of one or more magnetic recording disks. The disks are rotatably mounted on a spindle motor, and information is accessed by read/write heads mounted to actuator arms rotated by a voice coil motor. The voice coil motor rotates the pivoting arms and moves the heads radially over the surface of the disk or disks. During servowriting and/or initialization of a disk, the read/write heads must generally be accurately positioned on the disk to ensure proper reading and writing of servo information that will define the data storage tracks. After the servo writer writes the servo patterns on the disks, the control system is added to the hard drive assembly.

Movement of the pivoting arms is controlled by a servo system, which utilizes servo information recorded on one or more of the disks to center the head on a particular track. Servo information is utilized to determine an actual position of the heads. A voice coil motor (VCM) moves the heads if the actual head position deviates from a desired head location. Head position is typically controlled by a closed loop servo system.

The servo information in the servo tracks is often written with timing derived from a master clock track in the servo writing system. Writing of servo information must be precise. Servo information is typically recorded by special instruments containing precise mechanical positioners, positioned using highly accurate feedback devices such as optical encoders or laser interferometers.

A media servowriter is a device dedicated primarily to the servo data writing function. It can also perform other functions related to hard disk preparation for insertion into a hard disk drive. In operation, a media servowriter writes multiple disks in preparation for their placement in an HDD, with the goal being minimal further disk preparation once each disk is located in the HDD. Media servowriters can thus be housed in one location while hard disk assembly including completed disks may be performed at another location with the knowledge that the servowritten disks have been tested and approved for certain parameters.

Previously available servowriters suffer from a variety of shortcomings and system performance issues. An example of known system performance issues is that of system positioning accuracy: positioning heads over tracks to accurately read and write information at high speeds is an ongoing performance consideration that can always be improved or enhanced. Most, if not all, of the previously available systems suffer from an inability to support custom read/write heads, or provide accurate micro-move and settle times or track holding accuracy.

One particular problem with currently available disk drives and servowriters is the complexity associated with knowing the location of a head over a disk, and detecting and utilizing relative movements of disks, positioners, heads, and related equipment with respect to a reference point or plane. In current servowriters, no action occurs during normal operation to track or control disk or spindle position with respect to the drive base. Instead, the system tracks and controls head position with respect to some servowriter structural reference point, with the implicit assumption that disk position is sufficiently well known and stationary. In actual operation, however, the disks and spindle may shift, vibrate, deform, or otherwise alter their position in space with respect to the structural reference point. Current systems do not physically track disk position nor compensate for movement or irregularities resulting from real world conditions, including the aforementioned conditions and non-repeatable run out movement. A servowriter without the ability to track disk position and compensate for positional or movement irregularities may introduce or otherwise suffer from errors while heads are reading from or writing to the disks. This error introduction may limit the spin rate and/or track density of the disks.

It would be beneficial if one could track and compensate for media movement during the read and write process, thereby decreasing the risk of reading from or writing to incorrect locations on the media surface.

Another problem with currently available disk drives and servowriters is that of accurate head positioning. During the process of writing servo tracks on magnetic media, servo patterns must be positioned with high accuracy on different radial tracks. The traditional method of locating servo patterns on disks is to use a read/write head flying over a spinning media disk. The read/write head is attached to a rotary positioning device comprising a voice coil, associated voice coil motor, and a rotary optical encoder for closed loop positioning purposes. The rotary positioning device is used to hold the read/write head and swing the head over the spinning media disk. Errors in servo track accuracy can occur whenever the system does not maintain head position in a controlled radius as the media disk spins below the head. In certain circumstances the axis of the spinning media disk can translate laterally in the plane of rotation or the axis can wobble, tilting about a pivot point not coincidence with the media disk plane, thereby also translating the disk with respect to the head. Head position errors may also occur if the entire optical encoder fails to precisely track head position. The entire positioning device can translate or vibrate with respect to the spinning disk, or flexing of any components connecting the head to the optical encoder can produce positional errors.

Previous systems have employed a rigid mechanical connection between the optical encoder and the heads as well as a stable mechanical reference between the optical encoder and the axis of the spinning disk. In a disk having a track pitch below one micron, the rigid positional linkage performance between the optical encoder and the head as well as the optical encoder and spindle axis can be compromised by various factors, such as wobble or translation of the spindle axis within its bearing mount, causing radial runout. Other potentially problematic factors may include tiny distortions of the shape of any hardware that mechanically references the head to the spindle axis. External vibrations, vibrations from the spindle motor, temperature fluctuations or flutter from the disk can all contribute nanometer fluctuations and errors in positioning the head at constant track radius.

It would be beneficial to have a servo system that minimizes the dependence on the idealized mechanical references connecting spindle axis position to head position, thereby minimizing errors and fluctuations in the radius of servo data, or marks.

Another example of known system performance issues is that of system positioning accuracy: positioning heads over tracks to accurately read and write information at high speeds is an ongoing performance consideration that can always be improved or enhanced. One particular problem with currently available servowriters is the equipment used to format a disk writes a set of servo sectors to the disk, and the presence of relatively significant servo sector errors can cause the servowriter to indicate the disk is bad during verification testing. Alternately, when writing to a formatted disk, the presence of relatively significant errors in the servo sectors causes the disk drive to mark those sectors as unusable for data storage, either by detecting excessive servo errors while track following or excessive errors detected during data writing and reading, with the result that the data storage capacity of the disk would be reduced. Thus the downside of the old method of writing servo sectors or data sectors and monitoring the written data for errors would be discarded disks or unusable disk area. These drawbacks decrease yield and reduce available storage capacity.

It would be beneficial to have a method of writing data, including servo data, that would reduce the risk of decreased yields and/or storage capacity of hard disks as compared with previously known systems.

Furthermore, most, if not all, of the previously available systems suffer from an inability to support custom read/write heads, or provide accurate micro-move and settle times or track holding accuracy.

Disk drive heads are replaced periodically due to wear and tear. Instead of staking, wherein the head suspension and the head mount tab 3501 may suffer permanent deformation, it would be beneficial to offer a design that does not encounter permanent mechanical deformation during assembly or reassembly. In a particular hardware implementation, staking has required mounting a tab replacement or head arm or E-block after only two or three head replacements due to permanent deformation of the boss receiving bore of the head mount. It would be preferable to offer a design that can impart less distortion to the interface between the HGA and the mating head mount bore, increasing the number of reuses of the head mount tab before replacement is indicated.

Further, hard disk drives rely heavily on position reference information "written" or recorded as concentric bands of tracks onto disk surfaces. The operation of creating those tracks, known as servo track writing, requires precise record-phase head positioning and spindle mechanisms, as well as accurate timing and control electronics. The servo track writing process traditionally has been performed after disks have been installed into a "hard disk assembly", or HDA. At the stage where disks are located in an HDA, the disks have been positioned on a spindle within the HDA. The HDA read-write heads have been loaded onto the disk or disks. An operator has traditionally placed the HDA onto a Servo Track Writer device that provides head positioning and servo pattern information to the HDA to enable proper recording of the servo tracks onto the disk or disks. This traditional technique is especially useful when multiple disks are used within the HDA.

However, as disk areal data density has increased, many Hard Disk Drives today utilize only one disk, decreasing the usefulness of the aforementioned technique. Further, increased areal data density is frequently accompanied by an increase in track density, which requires that the HDA write additional servo tracks. With at least two servo tracks for every data track, the number of servo tracks has increased at twice the rate of data tracks for a disk of fixed size or area. This increased number of tracks results in a dramatic increase in the time required to write the servo tracks. Servo writing, which previously took a few minutes can now easily exceed a half hour or more, depending on STW machine parameters, disk size, rotational speed (RPM), and total number of servo tracks. This time increase, coupled with the fact that many disk drives today use only a single disk, has created a demand for a media track writer, or MTW, that can simultaneously record servo tracks on multiple disks prior to installation into an HDA.

One aspect of the MTW that is particularly noteworthy is the mechanical clearance between the disk inside diameter, and the hub or chuck outside diameter, namely the disk opening and the hub that fills the opening. A significant clearance dimension is necessary to enable fast and reliable disk installation on and off the hub and to accommodate disk and hub manufacturing tolerances. If this clearance is too large, the disk or disks will move laterally and possibly axially during high RPM rotation. A finite clearance value exists under any set of dimensions. This clearance, if not addressed in some manner, creates an uncertainty with regard to the concentricity of servo tracks to disk ID, and can in certain circumstances result in significant eccentricity errors introduced when removing disks from the MTW and installed into a disk drive HAD. If uncontrolled, these errors can in certain circumstances exceed 4000 microinches, or millionths of an inch. Excessive eccentricity, or servo track "runout", can cause servo capture and performance problems for the HDD, in that the head can be mislocated above the disk and can run outside a track, or begin in one track and end in another.

An additional aspect of a media servowriter is holding a hub, specifically a hub of a disk stacking cylinder employed to hold multiple disks during disk servowriting and certification. Previously available hub holding devices used some type of mechanical "jaws" that gripped the exterior of the hub and/or the notch formed between the hub and the main cylinder. The jaws were formed of some type of metal and were metal pieces used to pin the hub down and hold it in position by applying pressure to the upper side of the hub. These jaw-type locking devices tend to be imprecise in holding the hub or other cylindrical piece. At significantly high RPMs, such as in excess of 10,000 to 20,000 RPMs, centrifugal force works to pry these devices open, and many jaw type devices are pried open or move the piece as a result of high forces applied thereto. This prying tends to damage the hub and/or maintaining device and is generally unacceptable. Thus the previous devices could be characterized as easily pried open, with poor repeatability, and highly subject to movement of the piece.

It would be beneficial to provide a system overcoming these drawbacks present in previously known systems and provide an improved media servowriter, disk writer, and/or other device having improved functionality over devices exhibiting those negative aspects described herein.

SUMMARY OF THE INVENTION

According to one aspect of the present design, there is provided a method for tracking and controlling media read/write characteristics. The method comprises creating media having a predetermined expected baseline configuration, reading the media having the predetermined expected baseline configuration, determining whether the media has moved from an expected position based on the media reading of the predetermined expected baseline condition, and correcting data hardware based on determining whether the media has moved from the expected position.

According to a second aspect of the present design, there is provided a method for minimizing likelihood of a head within a servowriting apparatus contacting a disk located therein. The method comprises sensing sound intensity in a predetermined frequency range from a first sensor positioned at a first location within the servowriting apparatus, determining the existence of a pending head crash based on the sound intensity; and moving an element of the servowriting apparatus upon determining the existence of the pending head crash.

According to a third aspect of the present design, there is provided an apparatus for controlling airflow over rotating media. The apparatus comprises at least one baffle covering the media, the at least one baffle comprising at least one cavity shielding at least a portion of the rotating media; wherein the at least one baffle provides the ability to inhibit turbulent flow when the rotating media rotates.

According to a fourth aspect of the present design, there is provided a method for changing a head assembly employed in a media writing device. The method comprises providing a head mount assembly having a bore passing therethrough, positioning the head assembly adjacent the head mount, aligning the head assembly with the head mount, and press fitting the head assembly to the head mount.

According to a fifth aspect of the present design, there is provided a system for detecting movement of a plurality of disks mounted to a spindle. The system comprises a transmitter/receiver capable of emitting a first beam of energy toward the spindle and receiving energy from the spindle and an error calculator determining differences between actual head position based on the reflective element position and orientation of the spindle.

According to a sixth aspect of the present design, there is provided a system for positioning a head over a disk, the disk mounted to a spindle. The system comprises a transmitter/receiver capable of emitting a first beam of energy toward the spindle and receiving energy from the spindle, a reflective element positionally emulating the head and oriented to receive a second beam of light energy from the transmitter/receiver and reflect the second beam back toward the transmitter/receiver, and an error calculator determining differences between actual head position based on the reflective element position and orientation of the spindle.

According to a seventh aspect of the present design, there is provided a system for accurately positioning a head over rotating media, the rotating media able to spin about a center axis. The system comprises an interferometer having the ability to emit light energy and measure an effective distance between the head and the spindle, and means for computing a correction factor to be applied to the spindle to correct for any perceived distance errors related to the head measurement.

According to an eighth aspect of the present design, there is provided a system for determining spindle orientation inaccuracies. The system comprises an interferometer having the ability to emit light energy and measure an effective distance between the interferometer and the spindle, and means for computing a correction factor for application to the spindle to correct for perceived errors.

According to a ninth aspect of the present design, there is provided a method for increasing magnetic disk yield during the manufacturing process. The method comprises initially writing a first complete set of servo data to a magnetic disk, subsequently writing at least one additional set of servo data to the magnetic disk, evaluating the quality of the servo data written, and removing the lowest quality servo data and retaining the highest quality servo data.

According to a tenth aspect of the present design, there is provided a method of assessing track writing performance on a media. The method comprises monitoring spindle axis position with respect to a reference position, and providing the spindle axis position with respect to a reference position to a processor.

According to an eleventh aspect of the present design, there is provided a method of computing a media track writing performance metric. The method comprises at least one from the group including computing a standard deviation of an observed track write radius from a desired track write radius and decomposing the standard deviation into repeatable and nonrepeatable components, computing time dependent servo mark positions, and computing optically inferred spindle axis positions.

According to a twelfth aspect of the present design, there is provided a method of computing a performance metric for media track writing. The method comprises monitoring position of a rotating component of a holder maintaining the media, computing a topological radius of a surface of the rotating component, and determining a difference between the rotating component position and the topological radius, wherein the difference equals rotating component wobble.

According to a thirteenth aspect of the present design, there is provided a method for biasing at least one disk fixedly attached to a spindle. The method comprises applying a biasing lateral force to a first disk fixedly attached to the spindle thereby tightly interfacing the disk with the spindle at one portion of the disk and applying a differently oriented biasing lateral force to any second disk fixedly attached to the spindle.

According to a fourteenth aspect of the present design, there is provided a method for biasing a disk attached to a spindle, comprising applying a biasing lateral force to the disk fixedly attached to the spindle thereby tightly interfacing the disk with the spindle at one portion of the disk.

According to a fifteenth aspect of the present design, there is provided a system for maintaining media, comprising a cap, at least one spring holding the cap, and a fluid release ball bearing arrangement having the ability to slidably engage and release the cap using force generated by the at least one spring.

According to a sixteenth aspect of the present design, there is provided a device for holding a rotating hub, comprising a chuck clamp housing, a mounting plate fixedly mounted to the chuck clamp housing, a spindle within the chuck mounting plate, and a chuck clamp surrounding the chuck mounting plate and having the ability to engage the hub, wherein the chuck clamp comprises a plurality of finger elements.

These and other objects and advantages of the present invention will become apparent to those skilled in the art from the following detailed description of the invention and the accompanying drawings.

DETAILED DESCRIPTION OF THE INVENTION

Figure 1:
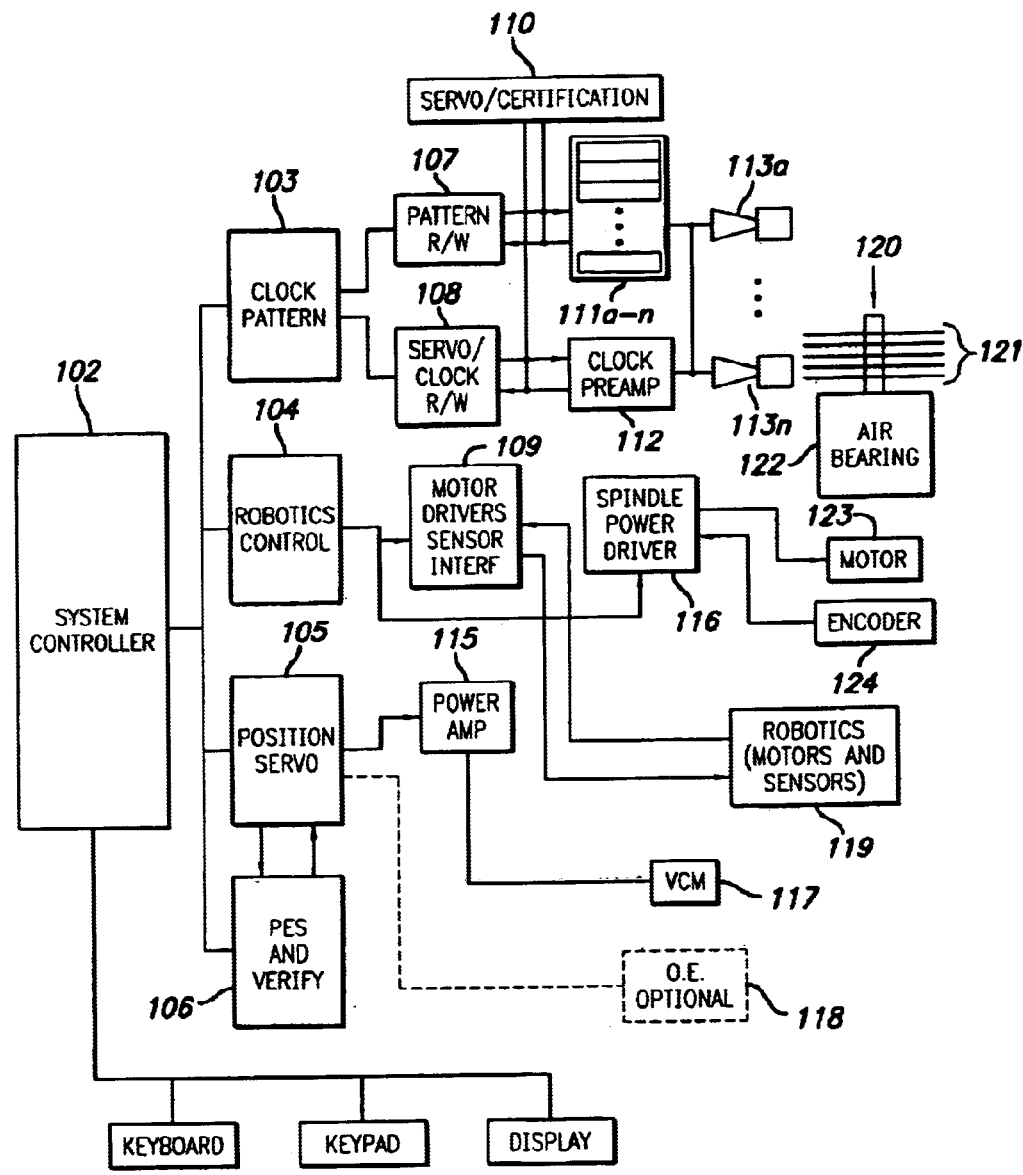
FIG. 1 is a general conceptual representation of the servowriting system according to one aspect of the current invention.

According to the present invention, there is provided an enhanced media servowriter having several aspects constituting improvements over previously known designs. An aspect of the present invention is a system and method for tracking disk and spindle position, typically in a multiple media disk arrangement, whereby data from the disks or spindle are fed back to hardware and/or software to compensate for position errors during reading and/or writing to the media.

In a particular aspect of the present invention, a non-contact radiation detection system cooperates with an ideal disk produced using patterning technology to detect movement of disks mechanically coupled to a spindle. The system further utilizes an ideal magnetic disk to detect movement of disks mechanically coupled to a spindle. Further, the system and method disclosed herein detect spindle and disk (or disks) movement with respect to a common base by detecting radiation reflected by a rotating part of the spindle.

A particular implementation measures and calculates the distance between the spindle axis position and an emulated head position and uses this distance to more accurately position the head. The system may employ a dual channel interferometer, such as a multiphase or guided wave interferometer, to reflect energy beams off the spindle holding the rotating media by using a retro reflector emulating head position and a lensing arrangement. The interferometer determines actual distance from the head to the spindle using the emulated head position and the system utilizes a digital signal processor or other computing device to compare that distance to any topological shift in the spindle position to find an overall error. The system then applies the overall error to the voice coil to correct head position. Alternate aspects of the invention employ interferometers in the z (vertical) direction or in the y direction to determine and compensate for tilt, vibration, or other undesirable media and/or head shifting.

In one aspect, the interferometer operates by reflecting light off the polished chuck holding the disks, which is part of the rotating portion of the spindle and thus accurately emulates spindle axis position and orientation. Due to errors in the spindle chuck (not perfectly cylindrical, tilted or otherwise computationally off desired orientation) the system determines the topological offset of the chuck and uses this value in combination with the raw distance between the head and the chuck and/or spindle to determine an overall positional error rate signal. The DSP processes this error signal to produce a corrective positional signal, which the DSP applies to the voice coil or other control device. The result is a compensation for angular tilt and/or shifts in orientation and/or the relationship between the head or the media. The retro reflector may be a corner cube or cat's eye or any other optical element having beneficial functionality in this interferometer-emulated head position arrangement.

The devices and methods disclosed herein may be employed in servowriting and/or data writing systems, and may be used in other systems employing a device such as a head to write or read data to or from rotating media.

A further aspect of the present invention includes a method for increasing the yield of magnetic disks during the manufacturing process. According to an aspect of the present invention, once the system has written the set of servo sectors to the disk, the servowriter verifies data written in the servo sectors to validate the disk. If the data written within the servo sectors exhibits sufficient integrity, the servowriting process is considered successful, and data sectors corresponding to the servo sectors are produced and validated. The data sectors may store data subsequently written to the disk.

Another aspect of the invention utilizes the writing and reading concepts disclosed above to increase the data storage capacity of a hard disk drive by writing multiple duplicate versions of data to the disk in different data sectors around the disk, and then retaining only the data exhibiting a sufficient degree of integrity. In this aspect of the invention, similar to the servowriting aspect outlined above, more than one set of data sectors is written to the media disk during normal operation, preferably during the same revolution. As a result, instead of a single set of data sectors disposed at predetermined positions around the disk based on available space on the disk, this aspect of the method disclosed herein produces one or more additional sets of data sectors, each of these data sectors being disposed at predetermined positions around the disk with respect to other data sectors. Once written, the HDD determines the set of data having the highest data integrity by comparing all data sets against original or baseline data. The system may then erase lower quality or duplicate data.

A further aspect of the present invention is tracking disk and spindle position, typically in a multiple media disk arrangement, whereby data from the disks or spindle are fed back to hardware and/or software to compensate for position errors during reading and/or writing to the media. This aspect of the invention may or may not be used with the hardware disclosed. A non-contact radiation detection system cooperates with an ideal disk produced using patterning technology to detect movement of disks mechanically coupled to a spindle. Another aspect of the present invention utilizes an ideal magnetic disk to detect movement of disks mechanically coupled to a spindle. An aspect of the invention provides a system and method for detecting spindle and disk (or disks) movement with respect to a common base by detecting radiation reflected by a part of the spindle.

Media Servowriter

FIG. 1 is a general conceptual representation of the servowriting system in which the present invention may be employed. From FIG. 1, the system controller 102 controls clock pattern 103, robotics control 104, position servo 105, and PES and verify block 106. Robotics control 104, position servo 105, and PES and verify blocked 106 perform functions related to the present invention. For example, robotics control 104 provides commands to drive the motors and sensors interacting with the spindle and air bearing to drive the multidisk spindle and air bearing arrangement.

In one embodiment, clock pattern circuit 103 generates a clocking signal and establishes the pattern generated on the disk surface. System controller 102 provides an indication to clock pattern circuit 103 to initiate a pattern on the disk surface when appropriate, such as during disk processing routines when it is appropriate for certification and servowriting to occur. Pattern read/write block 107 provides signals for reading and writing the pattern established by the clock pattern circuit 103. This pattern is the pattern used for this certification as described herein, which is written to and read from the media. Clock pattern circuit 103 also issues commands for servo/clock writing to servo clock read/write circuit 108. Servo clock read/write circuit 109 writes servo clock information to the disk and reads that clocking information to assess the validity of the servo data. Servo/certification module 110 determines the proper time, data, and pattern for servowriting for the multiple head/multiple disk arrangement of the present invention.

Operation of servo/certification module 110 in one embodiment is described below. Servo certification module 110 receives data from pattern read/write block 107 and servo clock read/write circuit 108. Servo certification module 110 transmits appropriate data and receives relevant data at multiple data preamps 111a through 111n, where n is the total number of preamps used to write to multiple disks. For example, but without limitation, a system may employ ten disks and twenty heads in connection with four preamps. Uniform correspondence in preamp to disk ratio between data preamps is not required, and one data preamp may write to one disk while another may write to several media disks in the same configuration. Multiple data preamp and disk arrangements may be employed while still within the course and scope of the present invention. Servo clock read/write circuit 108 also transmits and receives relevant data at clock preamp 112. These preamps filter and amplify data received from the various circuits and transmit the amplified signals to the appropriate read/write heads 113a–n.

In association with one possible implementation of the present invention, media disks are located on spindle 120 and read/write heads 113a–n positioned proximate the disk surface using the head stack assembly. The spindle 120 preferably rides on an air bearing 122, thereby operating to rotate the disks in an efficient manner while multiple heads engage the media 121, such as multiple hard disks 121a–n, in order to read and write appropriate information. The system writes patterns, including servo patterns, to each disk using the read/write heads. As reading and writing using multiple heads may involve simultaneous processing, reduced processing requirements and time sharing could result in significant cost savings. The system writes servo data and performs certification in a timely and cost effective manner using the spindle 120 and head stack assembly arrangement.

Compensation for Head and Disk Movement

One aspect of the invention disclosed herein detects movement (other than spinning) of the spindle and/or media, such as computer disks, with respect to a reference location, such as a granite base to which disk drive or servowriter hardware is attached, or directly with respect to a head interacting with the media. The present invention comprises methods and systems for compensating for such movement. The result of this aspect of the invention is to in most cases decrease the relative movement (other than spinning) between the heads and disks during normal disk drive or servowriting operation.

Four aspects and various related embodiments of the current invention are specifically disclosed herein for detecting movement of media disks and/or the spindle holding the media with respect to the base. These four aspects compensate movement with respect to the base and/or heads. The first aspect is a non-contact radiation detection system combined with an ideal disk produced using patterning technology. The second aspect is an ideal magnetic disk serving as a reference for a head reading information from the ideal magnetic disk. The third aspect is a non-contact radiation detection system that bounces radiation off one or more parts of the spindle. The fourth aspect is a non-contact radiation detection system that bounces radiation off both a part of the spindle and one or more parts of one or more heads.

1. Non-Contact Radiation Detection System Combined with an Ideal Disk Produced Using Patterning Technology In a first aspect of the current invention, a non-contact radiation detection system cooperates with an ideal disk produced using patterning technology to detect movement of disks mechanically coupled to a spindle.

Figure 2:
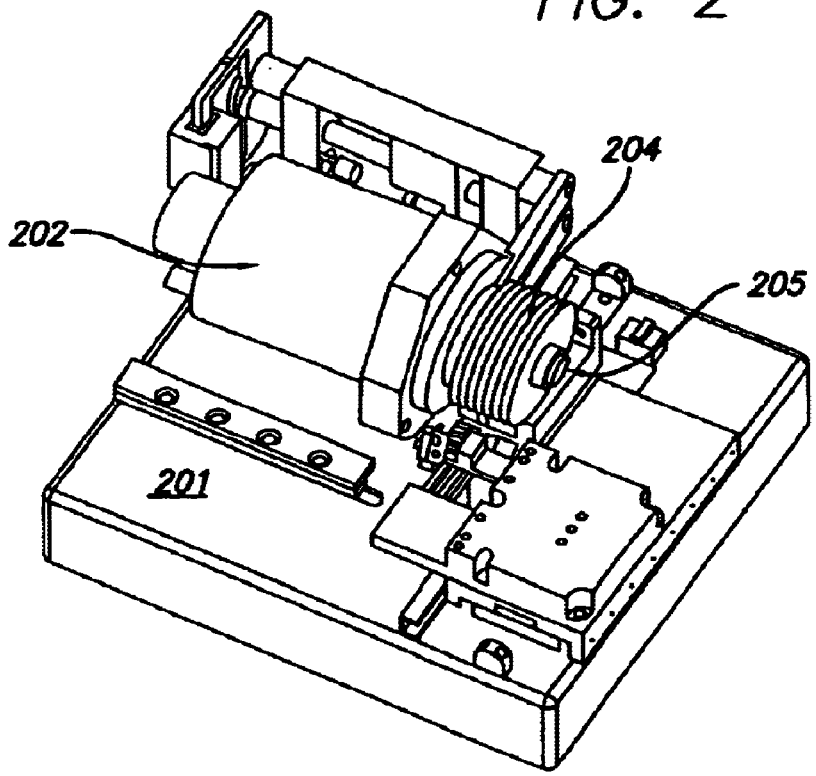
FIG. 2 represents the mechanics of the servo writing device of one aspect of the current invention.
Figure 4:
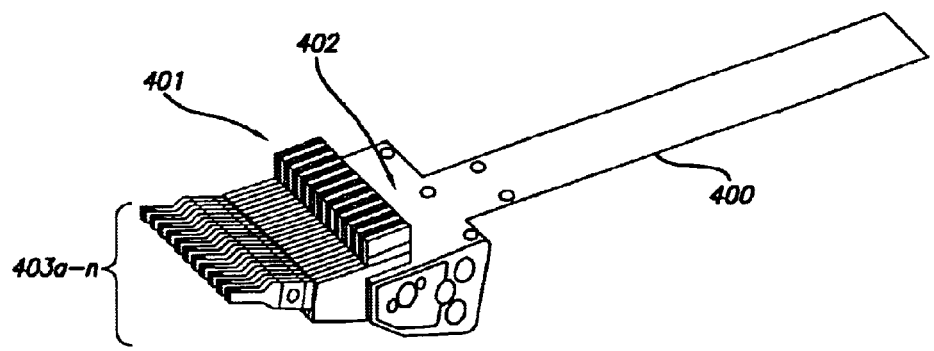
FIG. 4 presents a single multiple read/write head positioner arrangement that may be utilized in accordance with one aspect of the current invention.
Figure 5:
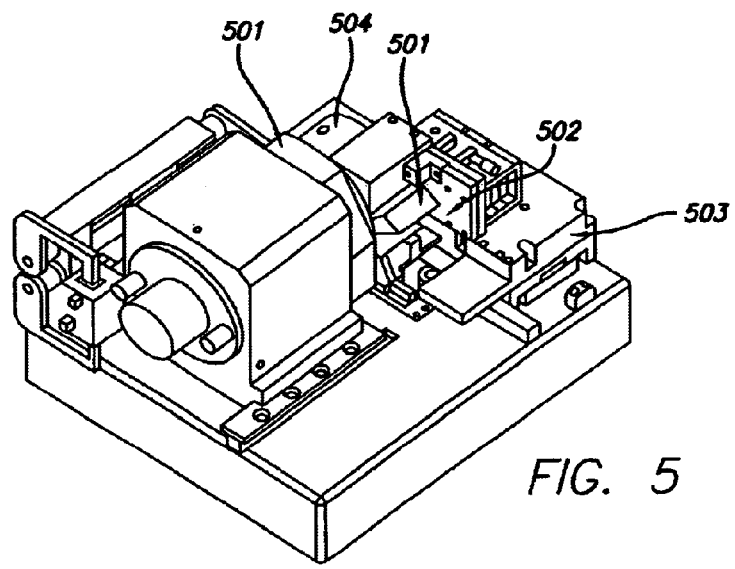
FIG. 5 presents an alternate view of the servowriting device with media cover and in-place positioner according to one aspect of the current invention.

From FIG. 2, the current system comprises a base 201, having a mounting block (not shown) or other holding device affixed thereto. The mounting block is fixedly mounted to a spindle 202. The rotating spindle may maintain a plurality of media disks 204 (a) through (n), illustrated in further detail in FIG. 3, but may maintain a single disk or virtually any number of disks. In the configuration shown, ten disks are employed and are secured by locking cap 302 and chuck clamp 303. Positioner 401 of FIG. 4 maintains a series of heads 403(a) through (n), typically individual read/write heads that perform both reading and writing functions, where each head flies over the surface of the media 204(a) through (n), which are typically hard disks. A depiction of the entire system is presented in FIG. 5, wherein the positioner 401 is closely associated with the disk stack and a VCM motor 502 to read from and write to the disks.

Figure 3:
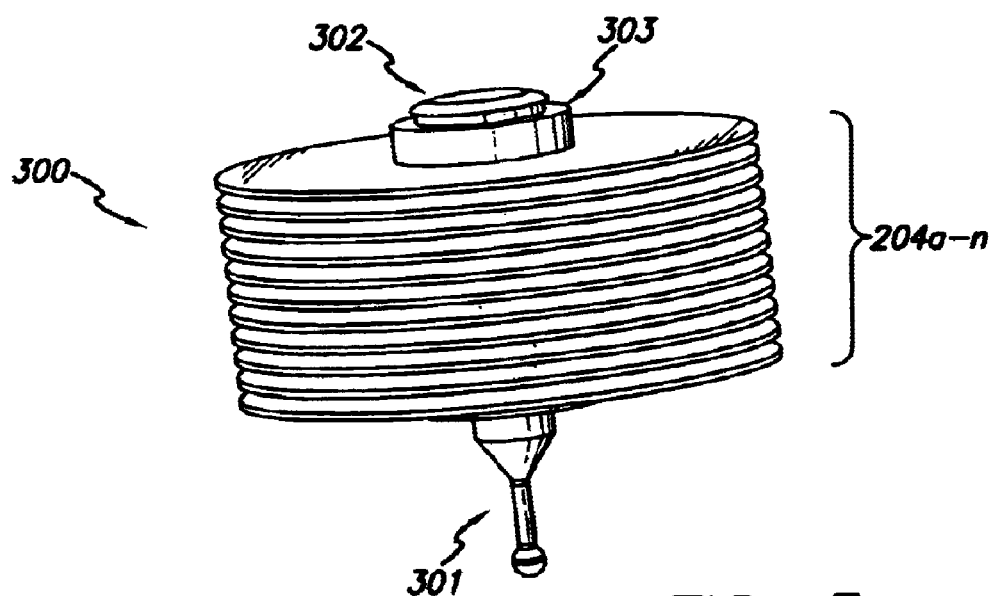
FIG. 3 is the multiple disk and spindle arrangement used in accordance with one aspect of the current invention.

In the current aspect of the present invention, an ideal disk (not shown) comprising positional guiding information, such as a particular data and/or servo data track structure, is produced possibly separate and apart from the configuration illustrated in FIG. 3. The ideal disk may be produced using the FIGS. 2 through 5 configuration, but it is typically not produced in the same multi-disk situation as illustrated in FIG. 3.

According to an aspect of the invention, the ideal disk is produced using patterning technology. In one case, the ideal disk is produced using lithography methods, as employed in the semiconductor industry. In another case, the ideal disk is produced using an electron beam (e.g., the tracks on the disk are written using an electron beam). This ideal disk is used as a reference for the subsequent media reading and writing functions performed by the system of FIG. 1. If the ideal disk is a magnetic disk, the system reads magnetic reference data. If the ideal disk is produced using patterning technology, lithography, or an e-beam, reading reference data from the disk may include employing a device such as a laser positioning system employing, for example, reflection, refraction, or transmission, such as in the case where physical holes are placed in the ideal disk.

In one embodiment, the ideal disk produced using methods disclosed herein is then mechanically coupled to the spindle along with any other disks that may normally be coupled to the spindle. In a particular application, a plurality of disks to be written or tested is arranged in a stacked formation and is mechanically coupled to the spindle. In this particular application, the ideal disk is also mechanically coupled to the spindle to detect movement of the spindle, and implicitly, of one or more of the stacked disks. More than one ideal disk may be attached to the spindle to further improve the accuracy of the movement detection process. In the present arrangement, the system has predetermined knowledge of the parameters of the ideal, or reference, disk and uses the ideal disk to form a reference point for tracking the actual position of the spindle and media located thereon. Use of additional ideal disks provides further reference points to track and eliminate media position irregularities.

A non-contact radiation detection system interacts with the ideal disk to detect movement of the ideal disk, and implicitly, of the spindle mechanically coupled to the ideal disk.

Figure 6:
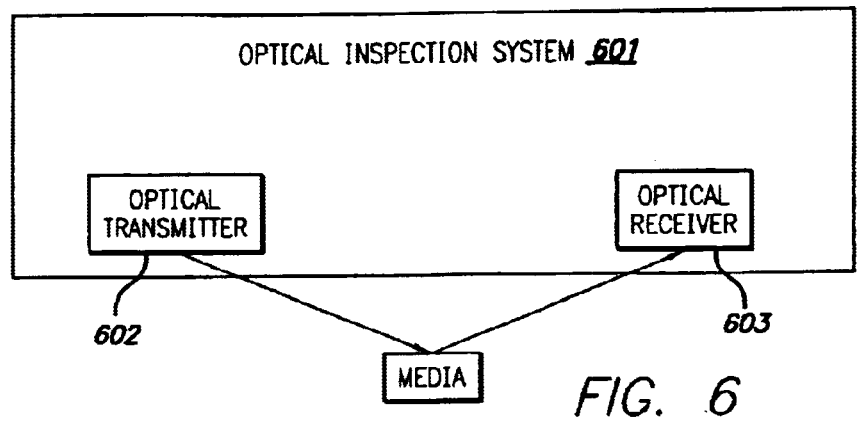
FIG. 6 is a conceptual view of the optical inspection system according to one aspect of the current invention.

In one aspect of this non-contact radiation detection system, the non-contact radiation detection system comprises an optical system, conceptually illustrated in FIG. 6. The optical system 601 comprises an optical transmitter 602, such as a laser diode, and an optical receiver 603, such as an optical detector. The optical transmitter and receiver may be disposed on the base of the system, such as at base 201, and may cooperate to detect movement of the ideal disk with respect to the base 201. Depending on the structure and properties of the ideal disk, the optical transmitter and receiver may be disposed on opposite sides of the ideal disk. For example, the positional guiding information may be derived from apertures that permit transmission of optical radiation. Alternately, positional guiding information may be derived from a same side of the ideal disk. For example, the positional guiding information and/or the ideal disk may exhibit reflective properties, and data may be transmitted to the disk surface and be reflected and interpreted therefrom.

The optical system 601 detects movement of the ideal disk with respect to the optical transmitter 602 and receiver 603. Hardware and/or software logic utilizes the information provided by the optical system to determine the magnitude and direction of movement at any point along the spindle or on the disks, both with respect to the base and with respect to any heads operating on the disks. In one aspect, the optical system may be affixed or mechanically interconnected to the base 201, and the optical system 601 knows the position of the base 201, the spindle, and the disks. The optical system monitors disk position relative to its own position and transmits any variations to hardware and/or software logic to correct for perceived deviations based on the pattern observed from the ideal disk. Once the direction and magnitude of motion of a particular disk is determined at a point proximate to a corresponding head reading from, or writing to the disk, the head moves accordingly to compensate for disk motion. As a result, the system minimizes or eliminates relative motion of the head with respect to the media disk.

In a particular implementation, a voice coil motor (VCM) that normally engages and operates the head utilizes information provided by the optical system 601 and/or other logic to move the head in response to disk movement. In this implementation, the head is substantially rigidly coupled to an arm that moves under control of the VCM. A positional difference in the ideal disk perceived by the optical system 201 is provided to the VCM logic such that the head and arm are moved to compensate for the perceived positional shift. In many situations, the positional shift will be a rotation that is too fast or too slow, meaning the head is either ahead of or behind its desired position. In such a lead or lag situation, the rotation of the system may be altered or the head shifted forward or backward in the rotation.

In an alternative implementation, the head is mechanically coupled via a jointed connection to a first end of the arm controlled by the VCM, and the head may move (rotate or translate) with respect to the first end of the arm under the control of one or more actuators.

2. Ideal Magnetic Disk Serving as a Reference for a Head

Another aspect of the present invention utilizes an ideal magnetic disk to detect movement of disks mechanically coupled to a spindle.

An ideal magnetic disk comprising positional guiding information, such as a preferred data and/or servo-data track structure, is produced according to an aspect of the present invention. The ideal magnetic disk may be produced separate and apart from the multiple disk configuration of FIGS. 2 through 5, but this is not specifically required. The ideal magnetic disk having magnetic positional information located thereon is then mechanically coupled to the spindle, in addition to any other disks that may normally be coupled to the spindle. In a particular application, a plurality of disks to be written or tested is arranged in a stacked formation and is mechanically coupled to the spindle, as in FIG. 2. In this particular application, the ideal magnetic disk is also mechanically coupled to the spindle to detect movement of the spindle, and implicitly, of one or more of the stacked disks. More than one ideal magnetic disk may be attached to the spindle to again improve the accuracy of the movement detection process.

Thus the system may reduce relative movement between the head and the ideal disk by either moving the spindle in combination with the disk(s), or moving the heads. If moving the spindle, such movement may be accomplished using an air pulse, a mechanical centrifugal device such as a screw or actuator, varying the magnetic field in the spindle electromotor, or varying the external magnetic field surrounding the spindle. If the system reduces relative movement by moving the heads, it employs either jointed head arms having individual actuators located thereon, moving only the tip of the head arm, or alternately may move the entire head arm.

According to one aspect of the invention, the ideal magnetic disk (not shown) is produced by writing a data or servo track in multiple revolutions instead of writing the track in a single revolution. Commonly, a data or servo track may be written in a single revolution, but the track may exhibit random deviations from the desirable circular pattern. The random deviations may include non repeatable run out errors that may occur due to temporary and non-recurring factors. An aspect of the current invention is to provide for writing such a track during multiple revolutions by partitioning the track into multiple segments and writing different segments in different revolutions to average out the random deviations. By writing different segments of the track during different passes, random errors introduced into the system by sources that move the disks with respect to the heads are averaged out, thereby being reduced or eliminated.

One aspect of the current invention associated with employing an ideal magnetic disk as a reference is that of writing servo bursts in multiple revolutions to average the adverse affects associated with servowriting, such as the problem of non-repetitive run out. This aspect requires writing servo data in multiple revolutions. Under previously known servowriting operation, when the system servowrites a track, the NRRO (non-repetitive run out) occurring during the servowriting revolution is written into the track. The NRRO contribution can be minimized by averaging such writing over all or part of servowritten data. Data writing averaging may be achieved by writing a servo burst in multiple revolutions, with different portions of the servo data written in different revolutions.

In a particular implementation of the invention, one or more portions of the servo data may be written multiple times in substantially the same physical location on the disk during different tracks. Writing a particular portion of servo data more than one time may be desirable under various circumstances, including, for example, to assess characteristics of the disk and/or heads, or to improve the accuracy of the track by further averaging out random errors. In a particular embodiment, writing a particular portion of servo data more than one time may be achieved by partially or fully overlapping data written to contiguous portions of the disk.

In operation, in one embodiment of the invention, the servowriter writes a long track, such as a four-revolution track, during four separate revolutions. The segments written every revolution produce the final servo pattern. In one case, the system performs dynamic control of the write gate to avoid overwriting portions written in previous revolutions, i.e. the write gate does not write when commanded under all conditions as had been done on previous systems. In another case, the system performs dynamic control of the write gate but permits partial or total overwriting of one or more portions written in previous revolutions. The switching of head current in connection with embodiments disclosed herein may be performed at a significant rate, typically higher than that previously done. The rate at which the head current is switched may be decreased in situations where the system writes data patterns comprising segments spaced further apart on the disk.

According to this aspect of the invention, the system writes servo data multiple times over the surface of the disk. For example, servo data for a certain position of the disk may be written more than once, such as four times, to the same area. Alternatively, a particular segment of data may be partitioned into multiple overlapping, contiguous and/or non-contiguous subsegments, and the subsegments may be written during one or more different revolutions. In either case, should one of the writing functions suffer from non-repetitive runout, that writing function may be averaged with the other writing functions and the system may selectively read from the areas exceeding or not exceeding an averaged threshold, or a combined threshold. This averaging technique may be achieved by writing the servo data multiple times over a single disk.

Figure 7:
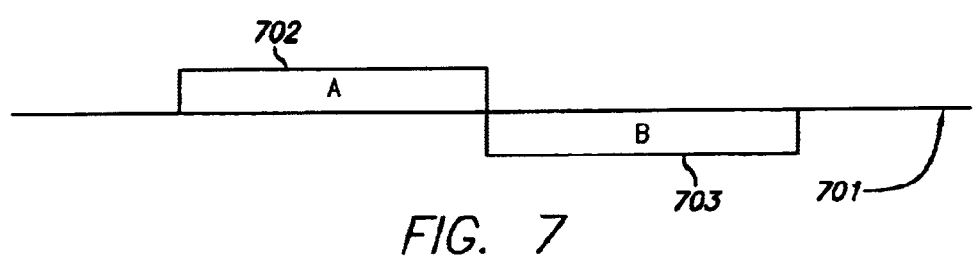
FIG. 7 shows ideal operation of writing bursts to a track.

FIGS. 7–10 illustrate further aspects of the system relating to the concept of the averaging technique of an aspect of the invention. FIG. 7 shows normal operation of writing bursts to a track. Track 701 is the target for writing and also subsequently for reading of information using a series of bursts. First burst 702, or Burst A, is written first, and second burst 703, or Burst B, is written thereafter. FIG. 7 is an ideal version of the burst writing arrangement. In reality, tracks may be neither perfectly straight nor perfectly circular, and burst writing is frequently inexact, off center, too short or too long, and/or otherwise imperfect. A more typical illustration is provided in FIG. 8, wherein burst A spans the track and Burst B is located entirely off the track. This effect makes reading and writing over the locations as imprecise and undesirable. A conventional write head writes a burst in a single revolution, shown in FIG. 9 as Burst A 901. In reality, this conceptual depiction of Burst A 901 may be inaccurate, as the head may impart a magnetic signal in the form of a typical sine wave to the track and disk, such as that shown as magnetic signal 902.

Figure 8:
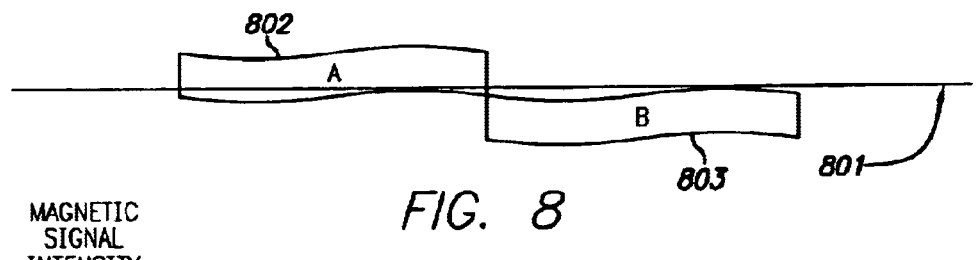
FIG. 8 illustrates a more typical operation of burst writing observed under certain typical conditions.
Figure 9:
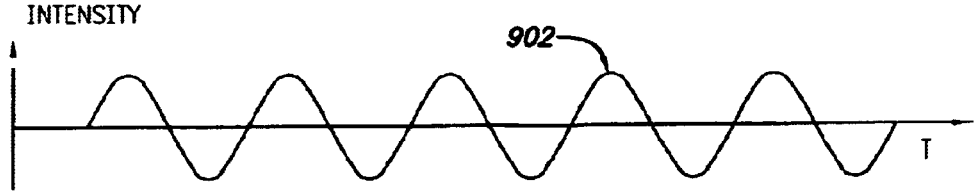
FIG. 9 shows a conceptual illustration of the sinusoidal dipulse writing of a burst.
Figure 9:
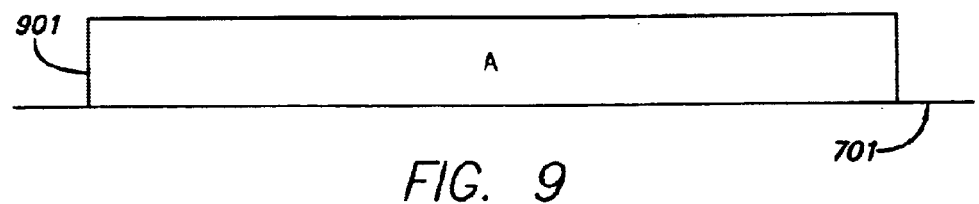

Thus, according to the embodiments of FIGS. 7 and 8, writing of Burst A and Burst B comprises writing a first set of data in a sine wave as Burst A and a second set of data in a sine wave on the opposite side of the track as Burst B. The result may be sine waves disposed in varied orientation on the disk with respect to the track. In one case, once the head writes Bursts A and B to the disk, the system positions the read and/or write head on the track and reads the A and B Bursts. $S_A$ and $S_B$ represent the energy perceived by reading Bursts A and B, respectively. In a particular implementation, the head passes the received energy for the two bursts to hardware and/or software to compute the following energy value:

$$E=(S_A-S_B)/(S_A+S_B)$$

If the Burst A and Burst B energy levels are equal, this value goes to zero, indicating that Bursts A and B are located close to their desirable positions along the intended track. If the magnitude of energy E exceeds a particular threshold, the system may decide that the position, shape, or other relevant characteristics of the track are unsatisfactory, and may choose to reposition the head and rewrite Bursts A and B. Correction of such position, shape, or other relevant characteristics of the track may be achieved and verified by decreasing the magnitude of energy E.

Since the value of E may be positive or negative, in one embodiment the system may utilize two different thresholds, depending on whether E is positive or negative. The two thresholds may also be equal in magnitude but opposite in sign. The thresholds may be predetermined based on characteristics of the disk and/or system, or may be dynamically computed and/or adjusted along the tracks based on information that the system obtains while writing and reading tracks. The sign of E may be used to assess which of Bursts A or B is deviating more from a desirable position, and this assessment may be utilized to select an appropriate corrective action. In one case, the system may select to only rewrite a particular burst. In other cases, the system may select to rewrite more than one burst, or a combination of complete and/or partial bursts. In other embodiments of the invention, other methods may be employed to determine undesirable deviations in position, shape, or other relevant characteristics of the track, including more complex mathematical models and formulas for the energy E.

In previous systems, an inaccurately-written track would either go uncorrected or would require reading the written area, erasing bad tracks, and again writing the data, but this could again have the data writing errors such as those pictured in FIG. 8 and/or may waste time and system resources.

Figure 10:
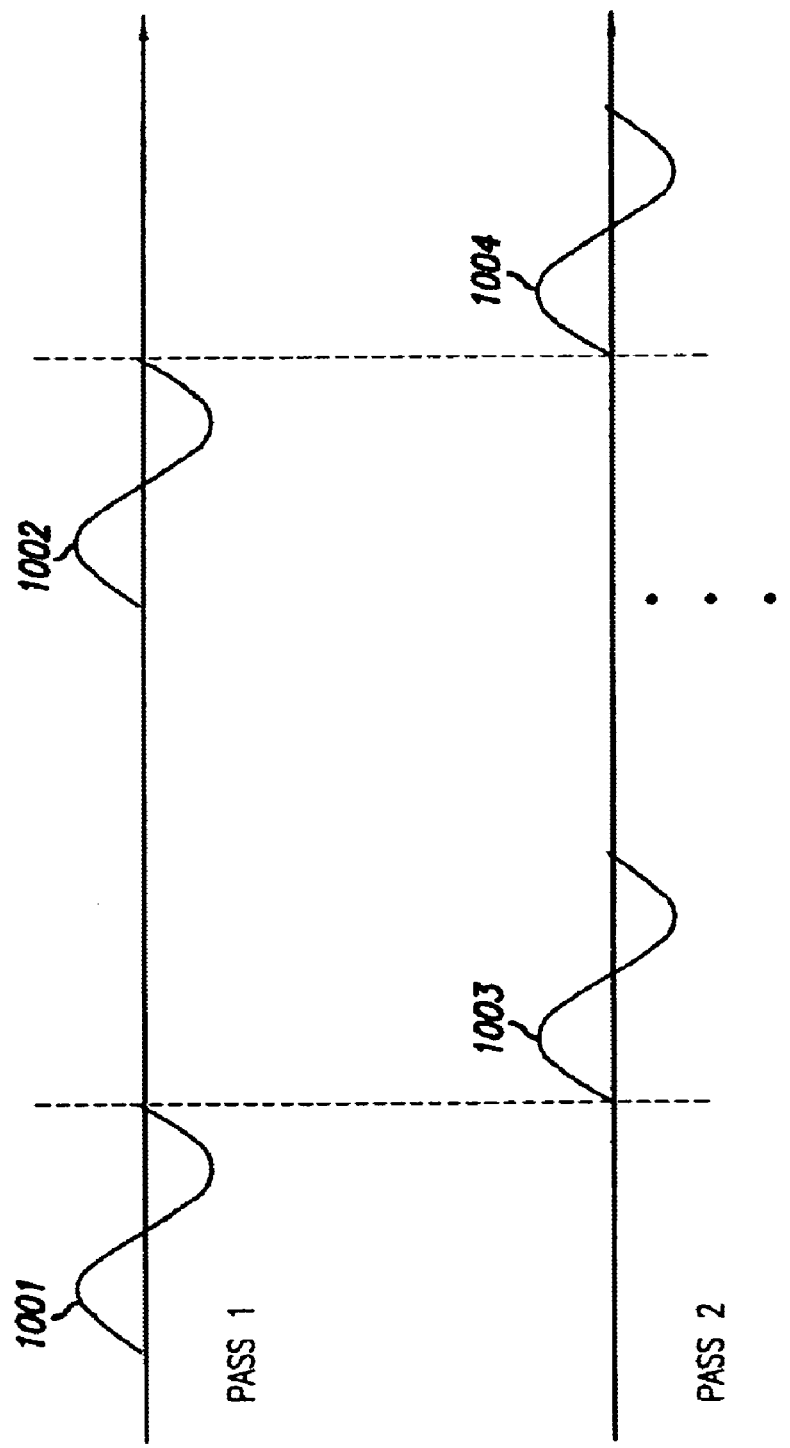
FIG. 10 presents multiple dipulse writing over multiple passes in accordance with an aspect of the present invention.

According to one aspect of the present invention, the system writes the A and B bursts in multiple revolutions over the same disk area. FIG. 10 illustrates writing a first sinusoidal dipulse 1001 for Burst A at the beginning of the desired Burst A location, followed by a second dipulse 1002 for Burst B at the beginning of the desired Burst B location. On a second pass, the head writes the second Burst A dipulse 1003 offset in position from the first Burst A dipulse 1001, possibly at or near the end of the first dipulse 1001 point. Second Burst B dipulse 1004 is similarly written at a position offset from first Burst B dipulse, and possibly at or near the completion point of the first Burst B dipulse 1002. The system can step through the Burst dipulses and may write more than one dipulse per pass, illustrated by the ellipsis in FIG. 10. Two passes may be employed, or more than two passes, within the scope of the present invention. Alternatively, the system may write partial dipulses in various passes, or a combination of partial and full dipulses.

The result of this partial burst writing technique employed on multiple passes is to provide an averaged positioning and signal strength for burst writing such that writing on a single pass with a single offset becomes unlikely. Should one pass suffer from an offset during the writing procedure, that offset may be corrected or decreased in subsequent passes.

A drive having a substantially-constant offset at all times, or a bias, may be unacceptable and improperly operating. The system may elect to correct this bias. Alternatively, such a bias may be detected and communicated to a disk drive comprising the respective disk, such that the disk drive may utilize the bias to follow the track comprising the bias. In one case, such a bias may be attributed to repeatable run off errors.

The effect addressed by the present aspect of the system is random noise or intermittent wandering experienced during writing under normal operation. Over a number of passes, it is to be understood that the present aspect of the system tends to reduce adverse effects due to errant dipulse and burst writing.

It is to be understood also that part of a dipulse may be written in one pass, or multiple dipulses, but in most cases the entire burst area and all dipulses are not written in a single pass for a particular data burst. Thus it is within the scope of the present system to write a subset of the pulse or a number of dipulses which is less than all of the dipulses to the disk in a first pass, then an additional dipulse or number of dipulses or portion of the burst or portions of the burst on a subsequent pass or multiple subsequent passes.

Once this multiple pass data burst writing technique is completed, the system may optionally compute the energy calculation provided above for Bursts A and B. While the energy errors may be less for the disk written according to the multiple pass technique, should the value of the energy computation be outside a particular range the bursts may need to be rewritten. This reading, energy computation, assessment, and rewriting is optional but may have a tendency to provide enhanced and improved burst writing capability.

With respect to the magnetic disk aspect of the present system, according to an aspect of the invention, once an ideal magnetic disk is produced, the ideal magnetic disk is mechanically coupled to the spindle, possibly in addition to other disks to be written or tested stacked thereon, such as in the configuration illustrated in FIG. 1. The ideal magnetic disk spins together with the other disks. Alternatively, the ideal magnetic disk may not spin together with the other disks, but may be offset by a predetermined, predictable or determinable amount with respect to the other disks. As previously mentioned, more than one ideal magnetic disk may be utilized.

In one embodiment, a detector head reads information stored on the ideal magnetic disk and detects movement of the ideal magnetic disk with respect to the head. Hardware and/or software logic utilizes the information provided by the detector head to determine the magnitude and direction of movement at any point along the spindle or on the disks, with respect to any heads operating on the disks. If the disk is ahead or behind the point where it should be, for example, the differential between the present position and the desired position is applied to hardware and/or software logic to either alter the spin of the disk or alter the head position to move into closer synchronization with the preferred position. In other words, once the system determines the direction and magnitude of motion of a particular disk at a point proximate to a corresponding head reading from or writing to the disk, the system moves that head to compensate for the motion of the disk. As a result, the relative motion of the head with respect to the corresponding disk is reduced or eliminated.

In one implementation, a voice coil motor (VCM) that normally engages and operates the head utilizes information provided by the detector head and/or other logic to move the head in response to movement of the disk. In this aspect, the head is substantially-rigidly coupled to an arm that moves under control of the VCM. In an alternative implementation, the head is mechanically coupled to a first end of the arm controlled by the VCM via a jointed connection, and the head may move with respect to the first end of the arm under the control of one or more actuators.

The method for averaging out random errors by writing different segments of a track in multiple revolutions disclosed herein may be utilized in connection with one or more heads writing information to a disk. When multiple heads are utilized to write to a single disk, the heads may be distributed along a single arm controlled by a single VCM. Each head may be individually controlled by one or more corresponding actuators mechanically coupled to the arm. Alternatively, there may be more than one arm, and each arm may be controlled by the same or different VCMs.

While the description above has provided an example of how an aspect of the present invention may be employed to produce an ideal magnetic disk, the methods and systems disclosed herein may also be applied to produce regular data disks. More specifically, the systems and methods taught herein may be utilized by a commercial system to write data to a disk prior to distribution of the disk to an end user, or by a disk drive comprised in a system utilized by an end user. The systems and methods disclosed herein and discussed in connection with FIGS. 7–10 may be employed to improve the accuracy with which data tracks are written in a variety of applications, aside from certification, initialization and servo writing of disks. For example, but without limitation, a desktop or a laptop computer system may comprise a disk drive that utilizes methods and systems taught herein to improve the reading and/or writing of regular data from and/or to a disk, such as operating system information, software and word processing files. As another example, a portable consumer device may employ methods and systems taught herein to improve storage and/or retrieval of data to and/or from a disk, including audio, video, and/or communication data.

Certain modifications to the methods and systems disclosed herein may be made while remaining within the scope of the present aspects of the invention to more appropriately address particular characteristics of the intended application. For example, in a mobile consumer device that may be commonly and repeatedly exposed to physical shocks due to physical impacts or movements, the expression of the energy E and/or the corresponding thresholds may be altered to tolerate a wider range of deviations in the position, shape, or other relevant characteristics of the data tracks, possibly at the expense of track density.

3. Non-Contact Radiation Detection System that Bounces Radiation off a Part of the Spindle Yet another aspect of the invention provides a system and method for detecting movement of a spindle and/or one or more disks with respect to a common base by detecting radiation reflected by a part of the spindle. Movement of the spindle and/or one or more disks with respect to the common base may then be related to movement with respect to one or more read/write heads.

As described above, movement of the spindle with respect to the base may result in relative movement between a disk and a corresponding head writing to, or reading from the media disk, thereby possibly interfering with the operation of the head. In one embodiment, the system detects the magnitude and direction of such movement between a disk and a corresponding head and compensates for such movement by moving the head accordingly.

One implementation of this aspect of the invention utilizes a source that directs radiation towards an area of the spindle and a receiver that detects radiation reflected by the area of the spindle. Hardware and/or software logic functionally connected to the transmitter and/or receiver detects movement of the spindle with respect to the base and moves one or more heads reading from, or writing to the disks accordingly.

In one aspect, the non-contact radiation detection system comprises an optical system. The optical system comprises an optical transmitter, such as a laser diode, and an optical receiver, such as an optical detector. The optical transmitter and receiver are disposed or otherwise fixedly mounted to the base of the equipment and cooperate to detect movement (other than normal spinning) of the spindle with respect to the base.

A cylindrical area of the spindle exhibits a certain degree of reflectivity. In one case, the cylindrical area is manufactured from a reflective metal, such as steel, and is polished to exhibit a relatively high degree of reflectivity. Alternatively, the cylindrical area of the spindle may be covered with a reflective material. The cylindrical area of the spindle is substantially perpendicular to the planar surfaces of the disks stacked on the spindle. The spinning axis of the disks stacked on the spindle is substantially parallel with the cylindrical area and approximately coincides with the central axis of the cylindrical area. Both the cylindrical area and the stacked disks are substantially rigidly connected to the spindle, such that the cylindrical area and the stacked disks spin with approximately the same angular speed.

The optical system detects movement of the spindle with respect to the base by illuminating the reflective cylindrical area with a laser beam produced by the optical transmitter and receiving a reflected portion of the laser beam at the optical detector.

Cross sections of the cylindrical area may not be perfectly circular, but may exhibit irregularities, such as an oval, non-circularly-curved, or "egg" shape. To compensate for any imperfections in the surface of the cylindrical area, the system in one aspect analyzes the Fourier frequency spectrum of the light reflected off the cylindrical area and filters out periodic signals that may be attributed to imperfections of the cylindrical surface intercepting the incident laser beam periodically as the spindle spins at a relatively-high rate.

Another aspect of this reflective spindle configuration utilizes two or more laser beams offset with respect to each other. Each laser beam corresponds to a dedicated laser source and a dedicated laser detector. Since imperfections of the cylindrical surface will exhibit similar signatures on each laser beam, as detected by the various corresponding laser detectors, these imperfections may be filtered out and the actual movement of the spindle with respect to the base may be isolated and detected or estimated.

One alternate aspect of the invention in addition to those outlined above is using a series of ridges or non-reflective material equally spaced around the cylinder such that light energy transmitted to the cylinder reflects efficiently off reflective areas but does not reflect efficiently off the ridged or nonreflective areas. This enables the system to measure relative position and timing and correct errors by counting the number and time of reflections provided.

Hardware and/or software logic may utilize variations in the intensity, frequency and/or phase of each reflected laser beam received at the corresponding detector to determine the magnitude and direction of movement at any point along the spindle or on the disks, both with respect to the base and with respect to any heads operating on the disks. The system can determine such parameters using an interferometer to detect movement of the spindle.

Once the direction and magnitude of motion of a particular disk is determined at a point proximate to a corresponding head reading from, or writing to the disk, the system moves the head to compensate for the motion of the disk. As a result, the relative motion of the head with respect to the disk is minimized or eliminated. In a particular implementation, a voice coil motor (VCM) that normally engages and operates the head utilizes information provided by the optical system and/or other logic to move the head in response to movement of the disk. In this aspect, the head may be substantially-rigidly coupled to an arm that moves under control of the VCM. In an alternative implementation, the head is mechanically coupled to a first end of the arm controlled by the VCM via a jointed connection, and the head may move with respect to the first end of the arm under the control of one or more actuators.

According to an embodiment of the invention, multiple heads are utilized to write to a single disk, and the heads may be distributed along a single arm controlled by a single VCM. Each head may be individually controlled by one or more corresponding actuators mechanically coupled to the arm. Alternatively, there may be more than one arm, and each arm may be controlled by the same or different VCMs. In each of these implementations, the system may utilize the information obtained regarding the magnitude and direction of relative movement between a particular head and a corresponding disk to reposition the head and/or disk dynamically.

An alternative aspect of spindle position measurement provides alternate differential systems to detect spindle movement with respect to the base. The differential system for detecting motion of the spindle may, for example, comprise two or more laser beams reflecting off different portions of a reflective or alternating reflectivity/nonreflectivity part of the spindle to detect the magnitude and direction of spindle movement at different points in the system.

As a further feature of the present design, the system performs various functions designed to minimize repeatable run out and/or non repeatable runout errors (RRO and NRRO). RRO and NRRO are measurements of the radial accuracy of written tracks. RRO and NRRO measurements may be performed after the system has written to the disk, and can be assessed by assembling the written disks into drives and testing. Components such as the spindle may also be tested independently to insure runout error is within predetermined specifications, but this again typically occurs after the write operation. Such measurements are generally not made during the servowriting process. In some cases, a few basic runout performance values can be made available after writing the servo pattern by reading the radial positioning error with the same magnetic read/write head on the servowriter used to write data. The system then records the standard deviation of the RRO and NRRO for the just-written tracks.

The present system monitors runout performance during servowriting. The runout error signal may be used for a follow up correction indication so that improperly written data, such as a servo mark, can be rewritten. Rewriting miswritten data tends to limit the tail of the runout error statistical distribution, thereby enabling tighter overall error distribution and therefore smaller track spacing.

For simultaneous monitoring of radial track positioning errors, the system generally cannot use the read/write head during the writing process. Various supplemental optical or capacitive sensors monitor the spindle axis position with respect to a base, reference spindle axis position, or a surface that emulates the head position with respect to spindle axis position. This relative measurement may be performed using, for example, a single beam or differential beam interferometer as discussed herein. Other routine position monitoring devices such as capacitance probes, inductive sensors or alternate optical position sensors could also be employed to monitor spindle position.

Performance metrics for track writing performance may be expressed in terms of the standard deviation of radius from a demanded radius. This standard deviation can be separated into repeatable and nonrepeatable components for purposes of measuring/correcting. In addition, numerous monitoring and performance metrics have not been previously implemented on data writing devices such as servowriters.

An aspect of the invention provides a method and system for determination of a monitoring and performance metric for assessing track data: the time or RPM dependent servo mark positions, or optically inferred spindle axis position. Since disks are mechanically coupled to the spindle, the position of the axis of the spindle may be reliably correlated with the position of a servo mark located on any particular disk, and such a correlation is bi-directional in the sense that knowing either of the two enables determination of the other one.

According to various aspects of the present invention, assessing time or RPM dependent servo mark positions or optically inferred spindle axis positions can be accomplished in different ways. In a particular implementation, an optical sensor can be used to monitor the position r of the spindle chuck or hub surface and record $r(\theta(t))$ as the spindle chuck spins with angular velocity $\omega$. The topographical radius $r_t(\theta)=r_t(\omega t)$ of the surface as a function of angle $\theta$ can be determined independently. The difference:

$$\delta r(t)=r(\theta(t))-r_t(\theta)$$

expresses the amount of wobble in the disk axis. This wobble can be divided into two components: a repeatable part having harmonics of the basic rotational rate given by the following Fourier components $$A_N(\omega)=(2\pi)^{-1}\Sigma_i \exp(iN\omega t_i)\delta r(t_i);$$

$$\delta r_{rro}(t_i)=\Sigma_N \exp(-iN\omega t_i)A_N(\omega).$$

and a non repeatable part including nonharmonic components $$\delta r_{nrro}(t_i)=\delta r(t_i)-\Sigma_N \exp(-iN\omega t_i)A_N(\omega)$$

With respect to the repeatable portion, $A_N(\omega)$ is the amplitude of the spindle wobble at a frequency of N $\omega$. This value may not be constant but may change slowly with time. The media writer or servo writer has the ability to monitor this amplitude during writing for process control, grading, media writer self testing, or for actively controlling the media writer as disclosed herein using this repeatable portion amplitude. For example, active control of the media writer may occur by putting a deflection on the voice coil to place a compensating position on the writer head.

Another example of employing processed data in servowriting performance is using the histogram of the NRRO component (non-repeatable part of the wobble that includes the nonharmonic components) of the servo mark positions or optically inferred spindle axis position. In this arrangement, an optical sensor such as an interferometer monitors these non repeatable errors during servowriting. The width and shape of this distribution assesses data writer performance as well as the quality of the servo patterns on the disk.

4. Radial Positioning Using Interferometer

Yet another aspect of the invention provides a system and method for detecting movement of a spindle and/or one or more disks with respect to one or more read/write heads by detecting radiation reflected by both a part of the spindle and one or more features mechanically coupled to one or more of the heads. One embodiment of the invention employs an interferometer in performing radial positioning functions. The present design enables in-situ monitoring of the disks and allows certification by offering dynamic compensation for spindle movement.

In an alternative implementation, information regarding movement of the spindle and/or heads with respect to a common base obtained as previously described may be employed together with data obtained according to the embodiment further described in this section to further improve the accuracy and/or reliability of the measurements.

In common implementations, interferometers are devices that convert the phase difference between two input waves into intensity variations on one or more output waves that carry information about the phase difference between the input waves. The interferometer outputs may represent superpositions of portions of the two input waves. The amount of each input delivered to each output and the phase shift imparted during delivery correlates to the optical path length difference between the two beams.

One type of interferometer that may be used in the present system is that described in U.S. patent application Ser. No. 09/694,849, entitled "Waveguide Based Parallel Multi-Phaseshift Interferometry for High Speed Metrology, Optical Inspection, and Non Contact Sensing," inventors David Peale, et al., assigned to the assignee of the present invention, which is hereby incorporated by reference into the present application. The interferometer of this aforementioned application is a multiphase interferometer that employs waveguided optics and an optical coupler to produce a tri-phase signal that enables measurement of phase differences between two emitted beams.

Figure 11:
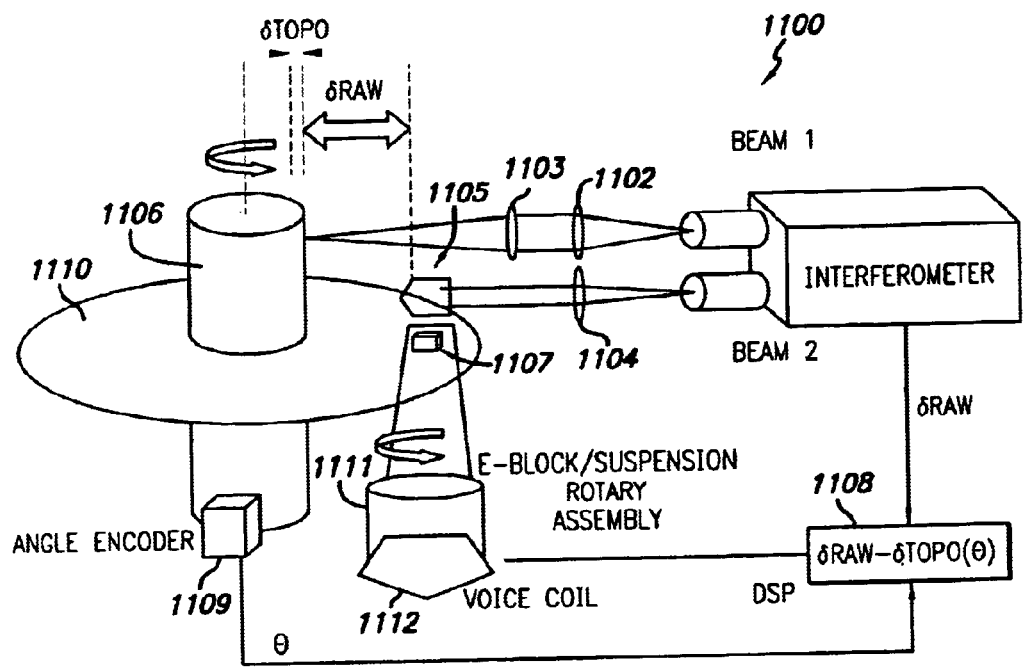
FIG. 11 represents one aspect of the inventive device disclosed herein.

One aspect of the invention disclosed herein is to measure the distance of the head to the disk axis, or spindle, as accurately and directly as possible. Direct measurement comprises using as actual a distance measure of the head position as possible, with as little indirect or calculated measurement as may be performed under the circumstances. One aspect of the present invention is illustrated in FIG. 11. From FIG. 11, the system employs an optical interferometer transmitting two laser beams in a differential mode. Interferometer 1101 comprises a laser light generating source, and possibly more than one such source, to generate two separate laser beams. The first laser beam strikes a first lens 1102 and a second focusing lens 1103 and directs the resultant beam to the polished chuck 1106. Polished chuck 1106 typically comprises a highly reflective or mirror like surface. The second beam passes through third lens 1104 and is retro reflected from a corner cube 1105 or other retro reflecting surface mounted on the e-block, illustrated in FIG. 4 as element 404. A corner cube, or cat's eye, operates under the law of reflection, but operates differently from a typical mirror or reflective surface. A beam of light entering the corner cube is reflected back in the same general direction as its angle of entry. This same-direction reflection occurs for not only one special angle of incidence with a mirror, but for all angles of incidence with the corner cube. The second beam in FIG. 11 is typically collimated, or emits energy waves that are substantially parallel. Mounting the retro element, such as corner cube 1105, to the e-block, is performed in an orientation that emulates the head position. In other words, the retro reflective element is mounted in a position on the positioner or e-block that emulates the position of the read/write head, and the stiffness of the positioner arm and connection between the e-block position and the read/write head offers a substantial analogy to actual head position. The retro reflector or corner cube 1105 swings in an arc tangent to the second, substantially collimated, interferometer beam, and reflects back through third lens 1104 and back to the interferometer, where the time of reflection or distance from the interferometer 1101 to the emulated head position is determined. The resultant interferometer signal substantially measures the distance between the surface of the chuck or chuck spindle 1103 and the simulated head position at the retro reflector or corner cube 1105. The difference between the interferometer and the chuck minus the distance between the emulated head and the interferometer is δraw, or the raw measurement of head position relative to the polished chuck 1106.

The difference signal δraw must be corrected for topological parameters of the polished chuck 1106. The chuck 1106 can deviate from a perfect and exactly centered cylinder, and under certain circumstances may move or shift during operation. The system measures deviation independently as a function of disk angle, $\Theta$, and the measurement is dynamically stored in memory. Deviation of the cylindrical chuck is represented by δtopo($\Theta$). The system then computes the error signal based on the difference between the raw position of the emulated head minus the topographical error of the disk cylinder, δerr=δraw−δtopo($\Theta$). This error signal is employed by the system to actuate the voice coil 1107 and micro actuators on the suspension to reposition the head to more accurately track the radius of the true axis of the disk. The error measurement is factored into the desired position of the head to affect movement of the head to a more exact position over the disk. In addition, that portion of the error signal at frequencies too high for the positioning servo to correct for can be used to inhibit writing of the servo information if this signal is above a predetermined limit. Writing of the servo information may recommence once the error signal falls below the limit.

In an alternate aspect of the present design, an additional interferometer is employed above the disk to provide a z-axis measurement and to address issues of tilt. In this embodiment, the retro reflector or corner cube is located at a different height than the lateral version to measure differential z position caused by tilt. The second interferometer also uses lensing to set up a collimated beam and tracks a reference Z point, which may be disk position or spindle location, or some other available reference height point on the arrangement. The measurement at an additional axial position (z) is fed back to the signal processor and the voice coil is employed to correct the head position over the disk. If the system measures the tilt of a rotating spindle, signal processing requires the raw positional z measurement minus the topographical shift resulting from tilt. Depending on the parameter desired to be measured, whether head position, spindle position, or disk position, the retro reflector must be positioned to offer an accurate representation of the target parameter. Thus if z position of the head is the desired parameter to be measured, the retro reflector positioning must, like the aspect described above, emulate the head position, such as on the e-block or otherwise associated as directly as possible with the positioner and/or read/write head. Alternately, if tilt of the spindle is the desired measured parameter, one beam may reflect off approximately the top center point of the spindle, for example, while the second beam reflects off a point as far to the periphery of the spindle as possible.

In another alternate aspect of the present system, a second lateral interferometer is used with the system illustrated in FIG. 11, with a 90 degree difference between the first interferometer and the second to measure y axis movement in addition to x axis movement.

Unless indicated or implied otherwise, as used herein, x and y directions are conventionally assumed to indicate directions substantially in the plane of a particular disk, while the z direction indicates a direction substantially parallel with the axis of the spindle. In particular embodiments, more than one substantially-parallel x-y planes may be considered when more than one disk is coupled to the spindle. Depending on the context, the angle theta ($\theta$) may be conventionally defined in a particular x-y plane, or may be a spindle-characteristic value that is common to all disks coupled to the spindle.

This aspect of the invention uses an additional retro reflector or corner cube mounted on the e-block or other available and practical location to emulate head position and retro reflect the incoming collimated beam. The interferometer again passes energy through a lensing arrangement to focus and/or collimate the beams, and one beam is also directed toward the spindle arrangement. This x-y dual interferometer arrangement provides additional accuracy, and similar parameters are fed to the signal processor and used to command the voice coil to more accurately position the e-block, positioner, and associated read/write heads.

An embodiment of a system employed as taught herein to attain high accuracy positioning may include a dual beam interferometer as described in the Peale application, U.S. patent Ser. No. 09/694,849. The Peale design uses a tri-coupler where the reference beam of the tri-coupler is collimated onto a retro-reflector mounted to the E-Block described previously and the other beam is focused onto the spindle hub.

More specifically, the guided wave interferometer is a system comprises a tri-coupler and has the following aspects. The tri-coupler consists of three waveguide inputs, three waveguide outputs, and a region between the inputs and outputs wherein waves from each of the three inputs are redistributed approximately equally to each of the three outputs. Assuming that the tri-coupler is lossless and distributes light from an input waveguide equally to each of the three output waveguides, then there may be a 120 degree phase shift between each of the three output light waves. Thus, if light is injected into two of the input waveguides, the intensity of the light in the three output waveguides will possess a periodic interferometric modulation as the phase difference between the input beams advances, and in particular, the phase relation among the intensities of these three beams will be 120 degrees. It is thus possible to measure the intensities of the three output beams, and accurately determine the phase difference between the two input beams. In addition, the total intensity of the input light can also be calculated.

Figure 14:
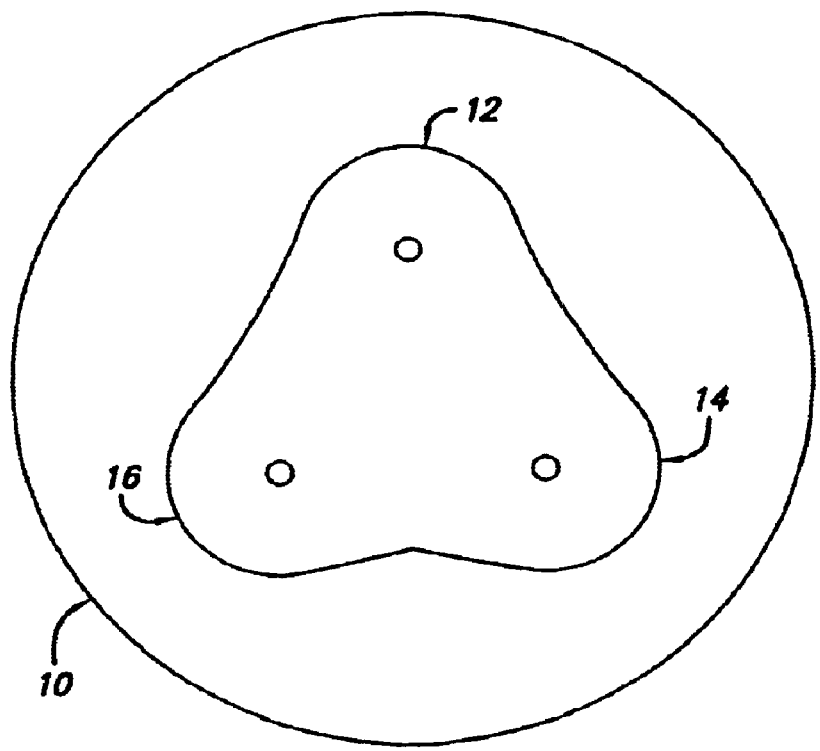
FIG. 14 is a schematic cross-sectional view at some point along the length of a fiber optical tri-coupler such as used in an interferometer according to one aspect of the current invention.

Referring to the drawings more particularly by reference numbers, FIG. 14 is a schematic cross section through one section of a fused-fiber optical tri-coupler 10 showing the spatial symmetry of the three fibers 12, 14 and 16, leading to the characteristic 120 degree phase relation between the light waves within each of the three waveguides. The tri-coupler 10 couples light between the first 12, second 14 and third 16 waveguides such that light input at one end of any waveguide is substantially equally distributed to each of the three waveguides at the output end.

Figure 15:
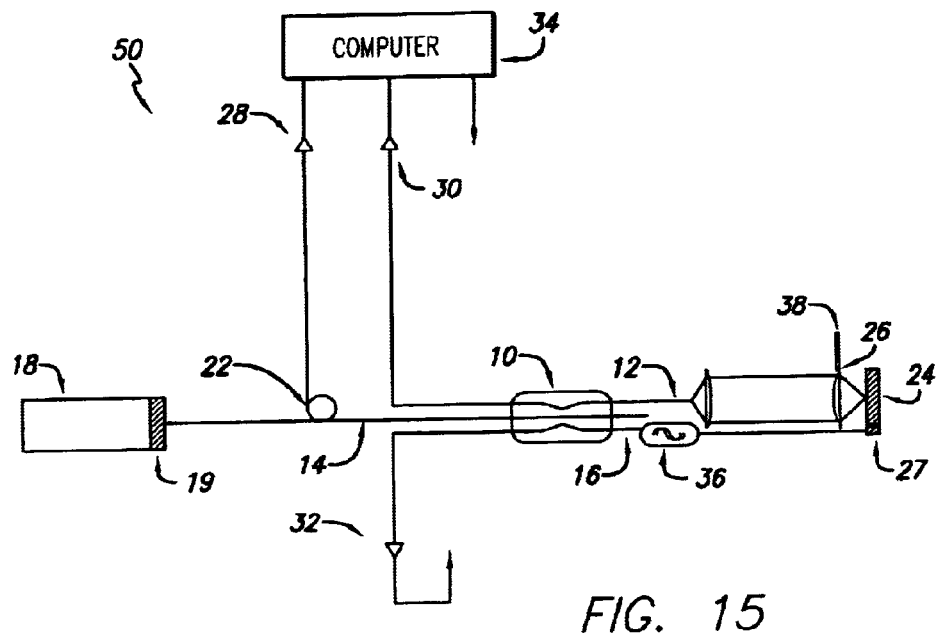
FIG. 15 is a schematic of an embodiment of an interferometer according to the present invention.

FIG. 15 shows an embodiment of an optical interferometer 50 of the present invention. The interferometer 50 may include a first waveguide 12, a second waveguide 14 and a third waveguide 16. The waveguides may be fiber optic cables or integrated waveguides that transmit light.

One of the waveguides, namely the second waveguide 14, may be coupled to a light source 18. By way of example, the light source 18 may be a laser. The light source 18 may have a return isolator 19 that prevents back reflections from feeding back into the source 18. The light emitted from the light source 18 and isolator 19 may be directed into the tri-coupler 10 via an optical circulator 22.

Light entering the tri-coupler 10 along waveguide 14 is distributed to each of the three output waveguides in roughly equal intensities. Light exiting the tri-coupler on waveguide 14 is allowed to escape the waveguide unused, and the waveguide is terminated in such a way that minimal light is reflected back into the tri-coupler. The light exiting the first waveguide 12 is reflected from an object surface 24 back into the waveguide 12. The interferometer 50 may include a lens assembly 26 and autofocus system 38 that focuses the light onto surface 24 and back into waveguide 12. Light within the third waveguide 16 may be reflected from a reference surface 27 back into the waveguide 16. The object 24 and reference 27 surfaces may be separate locations of the same test surface. Alternatively, the light from the third waveguide 16 may be reflected from a reference surface (not shown) separate from the object surface 24.

The light reflected from the test surface 24 and reference surface 27 through the first 12 and third 16 waveguides travels back through the tri-coupler 10. The reflected light within the first waveguide 12 provides an object beam. The light within the third waveguide 16 provides a reference beam that interferes with the object beam within the tri-coupler 10.

The tri-coupler 10 allows reflected light within the first waveguide 12 to be coupled into the second 14 and third 16 waveguides, and reflected light from the third waveguide 16 to be coupled into the first 12 and second 14 waveguides. The output of the tri-coupler 10 is three light beams with intensities that are out of phase with each other by approximately 120 degrees. The light intensity of each light beam detected by photodetectors 28, 30, and 32. The light exiting the tri-coupler along waveguide 14 is directed to the detector 28 via the circulator 22.

Photodetectors 28, 30, and 32 provide electrical output signals to the computer 34. The computer 34 may have one or more analog to digital converters, processor, memory etc. that can process the output signals.

By way of example, the interferometer 50 can be used to infer the distance between the retro-reflector mounted on the E-Block and the surface of the spindle hub where the surface of the spindle hub 24 is at the focus and the retro-reflector 27 returns the collimated beam.

The differential distance (modulo $\lambda/2$) at any point can be inferred from the following equation.

$$h=\lambda*\theta/4\pi \quad (1)$$

where:
h is the apparent differential distance;
$\theta$ is the interferometric phase angle between the object and reference beams, and
$\lambda$ is the wavelength of the reflected light.

The interferometric phase angle can be determined by solving the following three equations.

$$I1=\alpha1(E1^2+(\beta1E2)^2+2\beta1E1E2\cos(\theta-\Phi1) \quad (2)$$

$$I2=\alpha2(E1^2+(\beta2E2)^2+2\beta2E1E2\cos(\theta-\Phi2)) \quad (3)$$

$$I3=\alpha3(E1^2+(\alpha3E2)^2+2\beta3E1E2\cos(\theta-\Phi3)) \quad (4)$$

where:
I1=is the light intensity measured by the photodetector 28;
I2=is the light intensity measured by the photodetector 30;
I3=is the light intensity measured by the photodetector 32;
E1=is the optical field of the light reflected from the test surface into the first waveguide 12;
E2=is the optical field of the light reflected from the test surface into the third waveguide 16;
$\Phi1$=is the phase shift of the detected light within the first waveguide, this may be approximately −120 degrees;
$\Phi2$=is the phase shift of the detected light within the second waveguide, this may be defined to be 0 degrees;
$\Phi3$=is the phase shift of the detected light within the third waveguide, this may be approximately +120 degrees;
$\alpha1$=is a channel scaling factor for the first waveguide and detector;
$\alpha2$=is a channel scaling factor for the second waveguide and detector;
$\alpha3$=is a channel scaling factor for the third waveguide and detector;
$\beta1$=is a coupler nonideality correction term for channel 1;
$\beta2$=is a coupler nonideality correction term for channel 2, and
$\beta3$=is a coupler nonideality correction term for channel 3.

The interferometer 50 may include a phase shifter 36 that shifts the phase of the light within the third waveguide 16. The phase shifter 36 may be an electro-optic device that can change the phase to obtain a number of calibration data points. The calibration data can be used to solve for the phase shift values $\Phi1$, and $\Phi3$, the channel scaling factors $\alpha1$, $\alpha2$, and $\alpha3$, and the coupler nonideality factors $\beta1$, $\beta2$, and $\beta3$. The values are stored by the computer 34 and together with the measured light intensities I1, I2, and I3 are used to solve equations 1, 2, 3, and 4 to compute the phase angle, $\theta$ and the apparent distance h.

Figure 16:
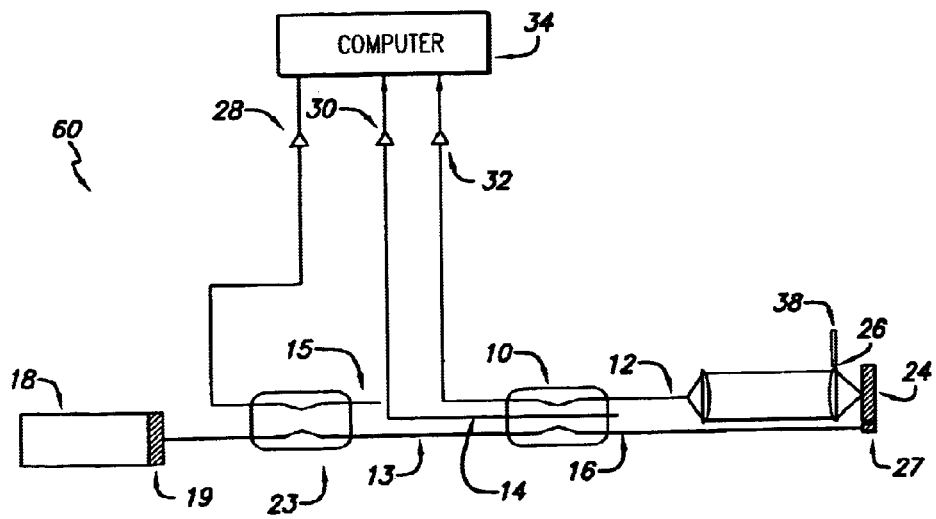
FIG. 16 is a schematic of an alternate embodiment of an interferometer according to the present invention.

FIG. 16 shows an alternate embodiment of an optical interferometer 60 of the present invention. The interferometer 60 uses a 2×2 optical coupler 23 in place of the circulator 22 used in interferometer 50. In this case, light from the laser is split as it passes forward through coupler 23. Light exiting coupler 23 along waveguide 15 is discarded. Light exiting coupler 23 in waveguide 13 is fed into tri-coupler 10 as in the interferometer 50 previously discussed. Light returning from tri-coupler 10 along waveguide 13 is split. Light exiting coupler 23 along waveguide 13 is rejected by isolator 19 and does not interfere with the laser. Light exiting coupler 23 along waveguide 15 is fed to detector 28. This embodiment of interferometer 60 may be less expensive to produce than that of interferometer 50 owing to the fact that coupler 23 may be considerably less expensive than circulator 22. However, the laser power delivered into the tri-coupler 10 may be correspondingly reduced and the signal detected by detector 28 may also be reduced as compared to those detected in detectors 30 and 32.

Figure 17:
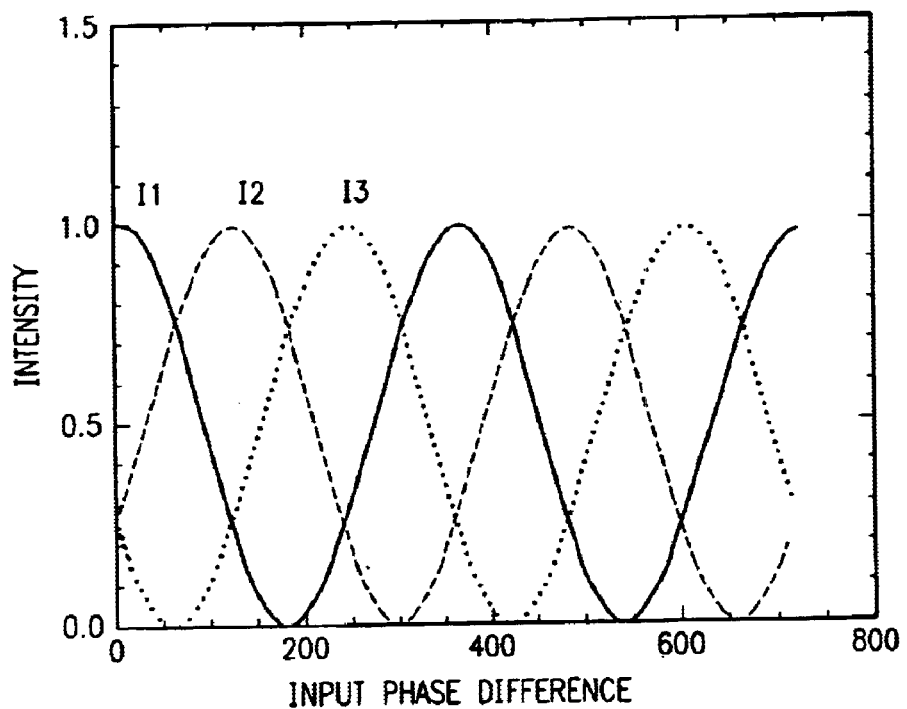
FIG. 17 is a graph showing the output signals from photodetectors on the interferometer versus the input phase-difference between the input beams according to one aspect of the current invention.

The output signals of the photodetectors 28, 30, and 32, responding to a steadily advancing phase angle at the inputs, are shown superimposed in FIG. 17. The phase shifts between different light beams separates the maxima and minima of the output signals. With such an arrangement at least one of the signals will be in a relatively sensitive portion of the waveform between a maximum and minimum. This illustrates how the present invention provides an interferometric detector that has a relatively uniform sensitivity and is therefore desirable for metrological applications.

Interferometers 50 and 60 of the present invention provide three out-of-phase signals with a minimal number of parts. The tri-coupler 10 and fiber optic waveguides 12, 14, and 16 can be packaged into a relatively small unit, typically measuring only 0.12 inches diameter by two inches in length. This reduces the size, weight and cost of the interferometers. By way of example, the tri-coupler 10 and waveguides 12, 14, and 16 could be also constructed onto a single planar substrate using known photolithographic and waveguide fabrication techniques. Such a construction method would have advantageous properties which would allow tighter integration with other portions of the interferometric system together with reduced assembly costs.

As an alternative to those aspects discussed herein using interferometers, other sensing means or sensors may be employed to detect head position, using independently positioned detectors. Such a construct may employ fiber optics where the fibers are in close proximity to the head and/or spindle. In such a design, the position of the spindle and heads are generally known to a degree. Light energy or other energy may be directed toward, for example, a head, and energy reflected off the head and received by a sensor located proximate or near the head in the zone of expected energy reflection. Capacitance sensors or inductive sensors could also be employed in the design. In general, any three independent position detectors could be used to detect head position or spindle position in this design.

The present aspect of the invention is not limited to the specific constructions and arrangements shown and described, since various other modifications may occur to those ordinarily skilled in the art. For example, although the light reflected from the test surface 24 is initially directed through the tri-coupler 10, it is to be understood that the light can be introduced to the test surface 24 without initially traveling through the coupler 10.

Adjustment of Spindle Position

Various aspects of the invention described herein provide methods and systems for directly on indirectly determining relative motion between one or more heads and one or more corresponding disks. In a typical case, one or more heads are operationally coupled to a disk reading to or writing from the disk, and a system provided by an embodiment of the present invention attempts to accurately position the one or more heads on the disk by identifying and minimizing or eliminating positional error interferences. In particular embodiments, the system operates substantially simultaneously on more than one disk. In the embodiments previously disclosed, correction of positional errors has been generally achieved by repositioning the heads.

An aspect of the present invention provides an alternative method for correcting positional errors between heads and disks, namely, rather than repositioning a head, the system may reposition the spindle. Alternatively, the system may reposition both the head and the spindle. In a general case, according to an embodiment of the invention, the system may reposition each head in the system while, substantially-simultaneously, also repositioning the spindle. In this general case, there may be more than one head operationally coupled to each disk, and each of these heads may be individually repositioned.

Cooperative repositioning of heads and spindle may help reduce or eliminate positioning errors with respect to each disk on which the system operates, and therefore may improve reading and writing of data to each such disk. In a servowriting and/or certification system, but also in any other commercial or end user system or application, this may improve system performance, such as increasing the track density and the throughput, and may reduce costs.

In one embodiment, as the system tracks positioning errors for each disk and head in the system, the system may elect to solely reposition the spindle without repositioning any of the heads in the system. This may occur when the system determines that repositioning of the spindle may satisfactorily reduce all or sufficiently many of the positional errors associated with individual heads in the system without repositioning any of the individual heads. This may be a more efficient and faster solution to correcting positioning errors during operation of the system as compared to individually adjusting the position of individual heads.

Movement of the spindle may be an effective approach to resolve repeatable run out errors. One cause for repeatable run out errors is an imbalance in the mass distribution of the spindle and disks. An aspect of the invention may reduce positioning errors attributed to repeatable runout by addressing and attempting to compensate for imbalances in the spindle and/or disk mass distribution.

Various embodiments of the invention provide methods and systems for repositioning a spindle to address positioning errors in the system. Once an error is detected, the spindle may be moved using conventional means while rotating, including but not limited to using an electromotive force (EMF) to alter spindle position. In one implementation, the spindle motor that normally drives the spindle to rotate the disks coupled to the spindle may move the spindle in any arbitrary direction. For example, the spindle motor may move the spindle along the spindle axis, in the plane of any particular disk coupled to the spindle, or in an arbitrary three dimensional spatial direction. Such an arbitrary three dimensional direction may include displacement both in a plane that substantially comprises the spindle axis and in an x-y plane that substantially comprises the surface of a particular disk coupled to the spindle.

In one embodiment, the spindle may be moved by altering the current through the spindle motor coil. In one embodiment, the spindle may be moved using one or more electromagnets disposed in proximity of the spindle to interact with the spindle and move the spindle via a magnetic field. In one implementation, at least three external electromagnets are disposed around the spindle, and the three electromagnets cooperate to produce magnetic fields of arbitrary orientations and intensities that may move the spindle in any three dimensional arbitrary direction. In one embodiment, permanent magnets are mechanically coupled to the spindle to interact with the external electromagnets. In another embodiment, one or more spindle electromagnets are mechanically coupled to the spindle to interact with the external electromagnets. Electromagnets coupled to the spindle may also interact with external permanent magnets. Any combination and number of permanent magnets and electromagnets may be mechanically coupled to the spindle and/or disposed along the spindle. To reposition the spindle, the system may vary electric currents through such spindle or external electromagnets to produce appropriate variations in the magnetic fields interacting with the spindle, thereby moving the spindle as desired.

Various devices may be utilized as electromagnets, including Helmholtz Coils, magnetic coils with or without cores, and others. Generally, and device or combination of devices that produce a magnetic field with an adjustable intensity, gradient, and/or orientation may be utilized as described herein to move the spindle. Some of the embodiments disclosed herein insulate sensitive system components from the magnetic fields produced by permanent magnets and/or electromagnets to avoid interference. The system components that may be protected from magnetic fields include actuators, read and/or write heads, and other components sensitive to electromagnetic interference.

According to an aspect of the invention, a spindle may also be moved mechanically, via physical forces. In one aspect, variable air pressure through the orifices of the air bearing could be employed to control and correct spindle positioning.

An embodiment of the invention utilizes actuators embedded in the spindle to redistribute the mass of the spindle and disks. In one case, if the system determines an imbalance in the mass distribution of the spindle that produces a repeatable run out error on one or more disks, the system may activate one or more actuators disposed along the spindle subsystem to rebalance the mass distribution. This may be achieved by extending and/or retrieving one or more objects via actuators with respect to the spindle axis. In a particular implementation, for example, the system may extend an actuator beyond the circumference of the rotating spindle, thereby adding mass in a particular radial direction of the spindle. Adding mass in particular radial direction of a rotating spindle would increase the local centrifugal force, thereby producing an additional local force, which could be utilized to move the spindle. The reverse effect could be achieved by retrieving an actuator inside the circumference of a rotating spindle, thereby decreasing the local centrifugal force.

One embodiment may include altering spindle position by interacting with the spindle via particles that exhibit mass. In a particular implementation, the system may utilize air bursts or other fluid bursts produced by one or more sources disposed in proximity of the spindle to move the spindle. Such an arrangement may employ a nozzle or nozzles, and may require submerging the spindle and/or media in fluid.

According to an aspect of the invention, any combination of the methods and systems disclosed above for moving a spindle may be utilized to reposition the spindle alone, or in further combination with repositioning of any group of one or more individual heads. For example, in one case, mechanical actuators may be employed to rebalance a spindle system exhibiting a mass-induced repeatable run out error, while a combination of magnetic devices actively reposition the spindle and individual heads are repositioned with respect to particular disks.

Multiple Sector Servo Writing

Another aspect of the invention disclosed herein seeks to improve disk manufacturing yield by writing multiple sets of servo sectors or data sectors to the disk in a single revolution and then selecting the set of servo sectors exhibiting the highest data integrity. This aspect of the present invention applies to various types of data storage employing circular media, including but not limited to magnetic disk systems, optical disk systems, and the like. The use of a single revolution to write data to circular media and subsequent selection of specific sectors of the media is applicable to any circular media writing system.

Figure 12:
FIG. 12 represents the relationship between a single data sector and an associated servo sector.
Figure 13:
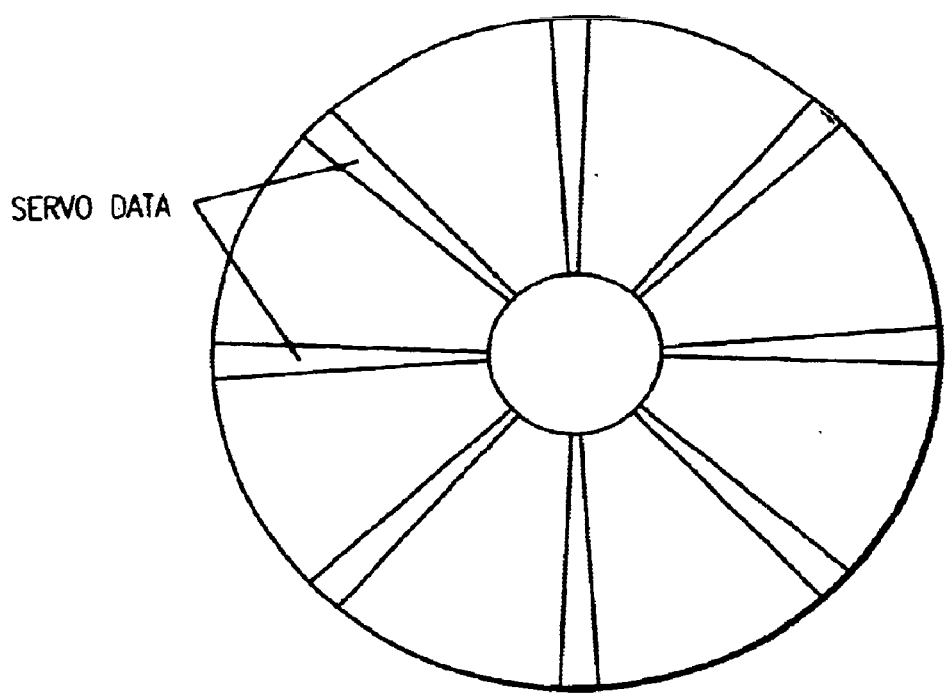
FIG. 13 shows the disposition of servo sectors at substantially regular angular offset positions around the disk according to one aspect of the current invention.

An aspect of the current invention provides a method for increasing magnetic disk yield during the manufacturing process. During the media disk formatting phase, the system writes a set of servo sectors to the disk to provide a structure that guides writing and/or reading of data to the disk in subsequent phases. Generally, the number of servo sectors on a particular disk is the same as the number of data sectors. According to one embodiment, each servo sector 1201 corresponds to a data sector and is comprised within the data sector 1202 as shown in FIG. 12. Conventionally, the servo sector 1201 is located at the beginning of the data sector, as perceived in the angular direction of rotation of the disk. Physically, both the data sector 1202 and the servo sector 1201 are shaped as partial substantially-circular sectors, but the servo sector 1201 subtends a significantly lower angle and occupies a correspondingly lower overall area. The servo sectors comprised in the set of servo sectors written to the disk during the formatting stage are disposed at substantially regular angular offset positions around the disk, a representation of which is illustrated in FIG. 13. More or fewer servo sectors may be written to the disk depending on system requirements, but the important characteristic of this aspect of the invention is that servo data is disposed around the disk during this single revolution initial formatting stage.

According to an aspect of the present invention, once the system has written the set of servo sectors to the disk, the servowriter verifies data written in the servo sectors to validate the disk. If the data written within the servo sectors exhibits sufficient integrity, the servowriting process is considered successful, and data sectors corresponding to the servo sectors are produced and validated. The data sectors may store data subsequently written to the disk.

According to an aspect of the present invention, more than one set of servo sectors is written to the disk in the formatting phase, preferably during the same revolution. As a result, instead of a single set of servo sectors disposed at substantially regular angular positions around the disk as shown in FIG. 13, the method disclosed herein produces one or more additional sets of servo sectors, each of these servo sectors being also disposed at substantially regular angular positions around the disk with respect to other servo sectors within the same set. Alternatively stated, this method produces duplicates of the original set of servo sectors, wherein each servo sector comprised in a duplicate set is offset by a constant angular amount with respect to a corresponding servo sector in the original set of servo sectors. For example, if the original set of servo sectors comprises a total of 36 servo sectors, the beginning of each servo sector is offset from the beginning of the preceding servo sector by ten degrees. A duplicate set of servo sectors would comprise a total of 36 duplicate servo sectors, and each of these duplicate servo sectors would be offset with respect to the preceding duplicate servo sector by ten degrees. If, for example, the duplicate set of servo sectors is disposed on the disk such that a particular duplicate servo sector is offset from a particular original servo sector by three degrees, each subsequent duplicate servo sector will also be offset from a corresponding original servo sector by three degrees. In an alternative implementation, individual servo sectors may be offset at arbitrary intervals, but the system may need to store more information regarding the actual position of such servo sectors.

Upon writing one or more duplicate sets of servo sectors to the disk, the system proceeds to verify the integrity of the data written to each servo sector. One way of verifying the integrity of this data is to read the data and compare it against the data originally written to the disk. The system then selects the set of servo sectors exhibiting the highest degree of data integrity and erases or discards all other servo sectors. Depending on the result of the verification process, the system may elect to retain the original set of servo sectors, or may retain one of the duplicate sets of servo sectors. After erasure, the disk may be removed from the servowriter and located in a hard disk drive, or if in a disk drive originally, the disk may remain therein and operate normally. The system comprising the media disk may then utilize the selected set of servo sectors as a basis for further operations on the disk, including data storage to the disk.

Another aspect of the invention utilizes the writing and reading concepts disclosed above to increase the data storage capacity of a disk by writing multiple duplicate versions of data to the disk in different data sectors around the disk, and then retaining only the data exhibiting a sufficient degree of integrity. This aspect of the invention applies the method described above to regular data commonly stored on magnetic disks, such as computer operating system data or a word processing file stored on a hard disk, rather than just to servo data. In this aspect of the invention, similar to the servowriting aspect outlined above, more than one set of data sectors is written to the media disk during normal operation, preferably during the same revolution. As a result, instead of a single set of data sectors disposed at predetermined positions around the disk based on available space on the disk, this aspect of the method disclosed herein produces one or more additional sets of data sectors, each of these data sectors being also disposed at predetermined and available positions around the disk with respect to other data sectors. The system in this aspect of the invention writes data, here called "associated data," to available areas of the disk using an associated data header to indicate the beginning of the data area. As used herein, the term "associated data" indicates data located on a media disk surface typically associated with other data on said media disk surface, as differentiated from the term "data," which indicates data generally, associated or unassociated. Associated data subsets are located at available positions around the disk with information correlating such associated data with similarly associated data. The system writes a second set of data with a predetermined header indicating the beginning of said data and writes the remaining data around the disk to available locations. Data included in this second group may be spaced at different locations around the disk, but the data is associated with the second group and second header such that it can be retrieved appropriately. The result is two identical sets of data written to the disk, with header information indicating that the associated data is identical but separate, along with information specifically associating the separate but identical groupings of associated data.

Alternatively stated, this method produces duplicates of the original set of data sectors, wherein each data sector in a duplicate set is offset with respect to a corresponding data sector in the original set of data sectors. The data sectors are not necessarily equally offset from one another, but rather may be randomly offset and broken apart in different configurations.

Upon writing one or more duplicate sets of data sectors to the disk, in one embodiment, the system proceeds to verify the integrity of the data written to each data sector. One way of verifying the integrity of this data is to read the data and compare it against the data originally written to the disk. The system then selects the set of data sectors exhibiting the highest degree of data integrity and erases all redundant data sectors. Depending on the result of the verification process, the system may elect to retain the original set of data sectors, or may retain one of the duplicate sets of data sectors, including the relevant header information and association data. Once the disk has been erased, the disk may be operated normally. The system where the media disk is integrated then utilizes the selected set of data sectors as a basis for further operations on the disk, including data storage to the disk.

Head Stack Failure Detection and Handling

Figure 18:
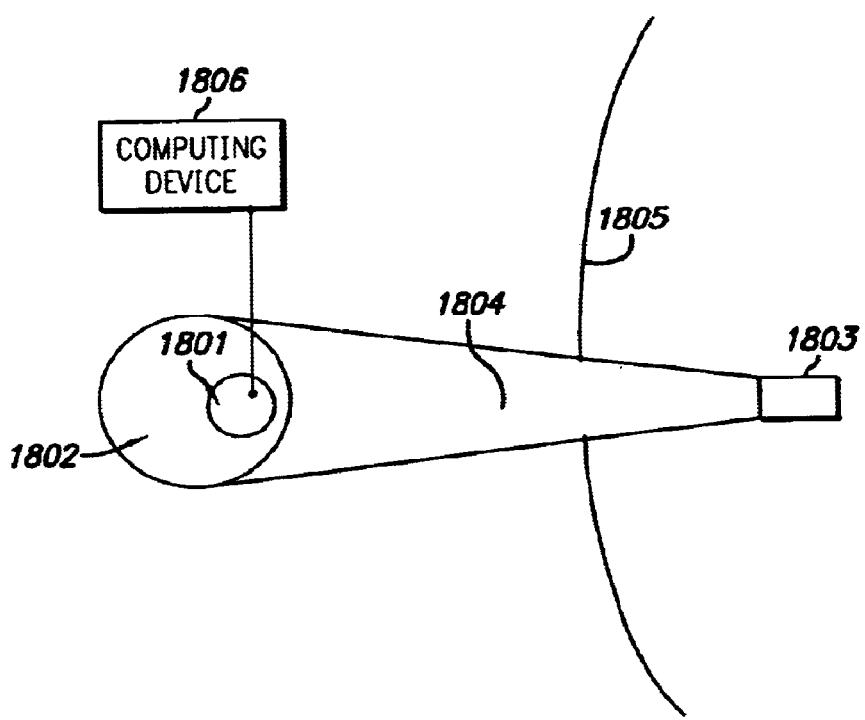
FIG. 18 represents a conceptual top view of an acoustic sensor implemented in one aspect of the present invention.

FIG. 18 illustrates one possible implementation of the present system. From FIG. 18, the media disks of the present system are optionally encased by a shrouding arrangement, shown as two shrouds, and an acoustic sensor 1801 is mounted on a positioner arm 1802 proximate the disks. The acoustic sensor is employed to detect the noise produced by one or more heads that come in contact with one or more corresponding disks upon the occurrence of or in advance of a head crash. When a head crash is imminent, it is understood that the acoustical emissions by the drive may take on certain abnormal characteristics, and in the presence of these abnormal characteristics, it is preferable to remove the head or heads from the disk. Impending head crashes may produce different characteristics in different drives and may even vary under different circumstances within a single drive. Unusual or abnormal circumstances may include, but are not limited to, high frequency variations or ripples. With respect to sensing such abnormal circumstances or the, existence of a head crash, it is to be specifically understood that the acoustic sensor may be located in an alternate position from that shown in FIG. 18, such as on the e-block, on a disk cover, or otherwise, and more than one such sensor may be employed. Location of the acoustic sensor as close to the head as physically possible and practicable is one possible way to locate the sensor. Sensor location will depend on a variety of factors, including but not limited to physical construction of the servowriter, placement of the heads, and associated acoustical issues.

During normal operation, the head reading from or writing to a disk is displaced in physical proximity of the disk. The head and the disk are normally not in direct physical contact, but are operationally coupled. For example, for a magnetic disk, a head flies relatively close to the surface of the disk reading from, or writing to the media disk via magnetic fields that propagate across the physical gap between the head and the disk.

When a head crashes, possibly as a result of a mechanical or power failure, the head may contact the corresponding disk producing a characteristic noise. While a disk failure may create sound waves having varying characteristics, the noise is typically characterized by frequencies and amplitudes in particular ranges. Certain pending head crashes may also exhibit frequency or amplitude abnormalities. The implementation of the invention described herein utilizes an acoustic sensor 1801 to detect this characteristic noise. The noise characteristic to a head crash exhibits a certain sound intensity and operates within a certain frequency spectrum. This implementation of the invention distinguishes the noise characteristic to a head crash from other noises that may otherwise occur in the system by determining the noise in the system, detecting amplitude and frequency levels, and indicating when those amplitude and frequency levels fall outside an expected range or within an undesirable range. The acoustic sensor and associated electronics only react to sound whose intensity exceeds a certain threshold and whose frequency spectrum matches the frequency spectrum characteristic to a head crash.

From FIG. 18, media disk 1805 has head 1803 operating above and in association therewith. Positioner base 1802 has acoustic sensor 1801 affixed thereto, and positioner base 1802 is adjoined to head 1803 via positioner arm 1804. Acoustic sensor 1801 is electronically linked to computing device 1806, which may be any electronic device capable of discriminating between signals, dynamically computing values in real time, and transmitting command values to a voice coil and/or voice coil motor, such as a digital signal processor. The computing device 1806 determines whether the sound intensity is within an expected range or within an unexpected range and commands the VCM (not shown) to lift the head 1803 from the disk 1805 under failure conditions.

The sound intensity associated with the noise produced by a head crash depends on various factors, including the physical characteristics of the disk and head. The system, via the acoustic sensor 1801 and the associated electronics, only reacts when the intensity of the sound detected exceeds a certain threshold or is within an undesirable threshold range. A value of this threshold may be determined experimentally for a particular combination of head and disk, or may be developed analytically. As may be appreciated, a disk failure due to, among other causes, a broken disk, produces a high amplitude sound. In other circumstances, such as a power failure, a failure is indicated by an absence of sound. Normal operation of disks, particularly in servowriting and certification, is a constant speed rotational sound, sometimes called a "whirring" or "whizzing" sound. These tend to be constant sounds, unlike a traditional hard drive sound that operates in fits and starts depending upon the function performed by the hard disk drive. In hard disk drive operation, the disk may not spin for a period of time and then spin for an extended period of time. The servowriter/certifier hardware system, by contrast, may be either on or off for an extended period of time, and thus noises outside the expected norm may be considered a system failure.

In one aspect, the acoustic sensor has a relatively low sensitivity such that it only detects noise above the threshold. In another case, the acoustic sensor detects a wider range of sound intensities, but software and/or hardware logic coupled to the acoustic sensor responds to the system when the sound intensity detected by the sensor is below a particular threshold. Software and/or hardware logic coupled to the acoustic sensor may be configured to respond to a range of sound thresholds.

The frequency spectrum associated with the noise produced by a head crash also depends on the physical characteristics of the disk and head, among other factors. The system only reacts when the frequency spectrum of the sound detected matches a certain frequency spectrum signature. This frequency spectrum signature may be determined experimentally for a particular combination of head and disk or disks, or may be developed analytically. In one case, the acoustic sensor has a particular spectral sensitivity such that it only detects noise whose frequency spectrum matches the frequency spectrum signature. In another case, the acoustic sensor detects a wide range of frequencies, but software and/or hardware logic coupled to the acoustic sensor suppresses response of the system when the frequency spectrum detected by the sensor does not match the appropriate frequency spectrum signature. Software and/or hardware logic coupled to the acoustic sensor, possibly including frequency filtering logic, may be configured to respond to a range of spectral frequencies and suppress other frequencies.

The intensity and frequency spectrum of the sound detected by the acoustic sensor may also depend on the proximity of the sensor with respect to the point of contact between the disk and the head. In a particular implementation, the acoustic sensor is disposed on the arm supporting the head, in physical proximity to the head. In another implementation, the acoustic sensor is located on the e-block, further away from the head.

In one implementation, multiple acoustic sensors are employed to detect head crash in a multiple head, multiple disk environment. In this implementation, multiple heads read and/or write information to multiple disks substantially simultaneously. There may be more than one head operationally coupled to each disk. Further, there may be more than one head coupled to each VCM-driven arm, possibly coupled via actuators, and there may be more than one arm operating on each disk. In this implementation, multiple acoustic sensors may be disposed throughout the system to detect head crashes that may occur at any point in the system. Each acoustic sensor and associated logic may correspond to a particular head and may be configured to ignore head crash noises produced by any other head.

Alternatively, the system may utilize information produced by a multitude of sensors to identify the head that crashed (e.g., through triangulation and/or through a spectral and intensity sound analysis that considers the characteristics of various disks, heads and system components disposed throughout the system).

If possible, in the current system and in many other systems, the acoustic sensor would be located as close to the head as possible. Physical drive characteristics limit the proximity of the acoustic sensor to the disk, but such a sensor may be employed at or near the positioner, e-block, shroud, or other points in the representative design illustrated herein.

In operation, once a head crash or other system failure is detected using the sensor or sensors disclosed herein, the system retracts the heads or otherwise moves the head or heads away from the disk or disks as rapidly as possible. This removal of heads from disks provides necessary space between disk and head. While the head may still contact the disk under certain failure conditions, such as a disk fracture or head failure, removal of the heads from the disk breaks the typical association between disks and heads and minimizes the chance of damaging either. Removing heads from the disk is a normal circumstance of media servowriting, and thus the system operates in a known manner when removing heads from the disks. Under one condition, a power failure causes the system to rectify the voltage available from the spindle and that voltage is applied to the voice coil, or alternately directly to the voice coil motor, which moves the head or heads away from the media disk or disks. In operation, a ramp type structure is moved by the voice coil motor to contact head holding apparatus and lift the head.

In other words, in one implementation, the invention utilizes the spindle as an electrical power generator to retract the heads off the disk.

In this implementation, the system utilizes a relay to detect a power failure. In one case, the relay detects when the electrical voltage at a particular point decreases below a certain threshold. In a particular case, this threshold is eight volts.

Upon a loss of power, the spindle continues to rotate due to its angular momentum. The mass of the spindle and other subsystems mechanically coupled to the spindle is relatively large, such that the angular momentum of the spindle system is correspondingly large. Upon loss of power, the spindle continues to spin for a significant period of time.

The invention exploits the angular momentum of the spindle by utilizing the spindle as an induction power generator. Inertial rotation of the spindle induces electricity in a coil. This coil may be substantially stationary with respect to the spindle, and therefore rotate with the spindle, or may be stationary with respect to the base of the spindle. In one case, the coil is part of the electrical motor that engages and rotates the spindle under normal operating conditions.

The electrical power produced by the spindle is rectified and is employed to operate servo systems that may retract the heads off the disk. In one aspect, the electrical power produced by the spindle is divided into two components: a first component operates a voice coil motor that retracts the heads off the disk, while a second component operates a motor that moves a ramp that mechanically engages the heads in a preferred resting position.

The present invention may apply to a single head operating on a corresponding disk, to multiple heads operating on a single corresponding disk, or to multiple heads operating on multiple disks.

As an alternative to the foregoing, the system may determine that a pending crash is imminent or has occurred if vibrations occur within the spindle. In such an arrangement, the spindle is monitored with a vibration sensor to detect spindle movement, and abnormal readings in frequency, amplitude, or intensity may be employed to remove the heads from the disk in certain circumstances.

This aspect of the invention has been outlined in the context of a rotating spindle. In an alternative implementation, the invention may also apply to a medium in linear motion (e.g., conveyor belt-type of system). In such a system, failure causes operation of a ramp that mechanically engages the heads in a preferred resting position.

Media Shroud

1. Multiple-Disk Shroud.

One implementation of the invention disclosed herein provides a multiple-disk shroud comprising a left baffle shroud and a right baffle shroud. From FIG. 19, the left baffle 1901 comprises a plurality of individual left baffle cavities 1902a–n corresponding to disks arranged in a stacked formation. Each individual left baffle cavity 1902 comprises an opening or slot that fits around the media and is adapted to partially receive a corresponding media disk, thereby partially enclosing the disk. In a particular embodiment, each individual left baffle cavity 1902 extends substantially to the center of the corresponding disk, thereby enclosing substantially half of the disk. The distances between the inner planar surfaces of each left baffle shroud and the corresponding planar surfaces of the corresponding disk are preferably small. In a particular case, these distances are approximately 10 mils, or $10/1000$ of one inch. Construction of this aspect of the current invention therefore comprises a series of separating walls, wherein the separating walls create the cavities 1902 in the baffle shroud.

As may be appreciated by those skilled in the art, the number of left baffle cavities or openings generally corresponds to the number of media disks in the arrangement or disk stack, such that the existence of five disks in the stack dictates a baffle shroud or shrouds with five cavities, while the existence of eleven media disks in the stack suggests eleven left sets of cavities in each baffle shroud. The number of left baffle cavities is generally related to the number of available disks or media that may be employed, rather than the actual number employed. In the previous example, if the spindle or disk holding device is capable of holding five disks but is only fitted with three disks, the number of cavities will be five. The foregoing is meant by way of example and not as a limitation.

The media disks are disposed in substantially parallel planes and may spin around a common axis that is substantially normal to the planes of the media disks. The disks are operationally coupled to corresponding heads that may read and/or write data to the disks.

The left baffle 1901 may be translationally coupled to the frame of the servowriter such that the left baffle 1901 may pivot into physical proximity of the media disks. In one embodiment, the left baffle 1901 is not directly coupled to either the media disks or the read/write heads, and may translate independently of the disks and heads. Upon translating proximally to the disks, each of the individual left baffle shrouds 1902a–n partially encloses a corresponding disk, thereby controlling air flow around the disk as the disk spins at a relatively high velocity.

Figure 20:
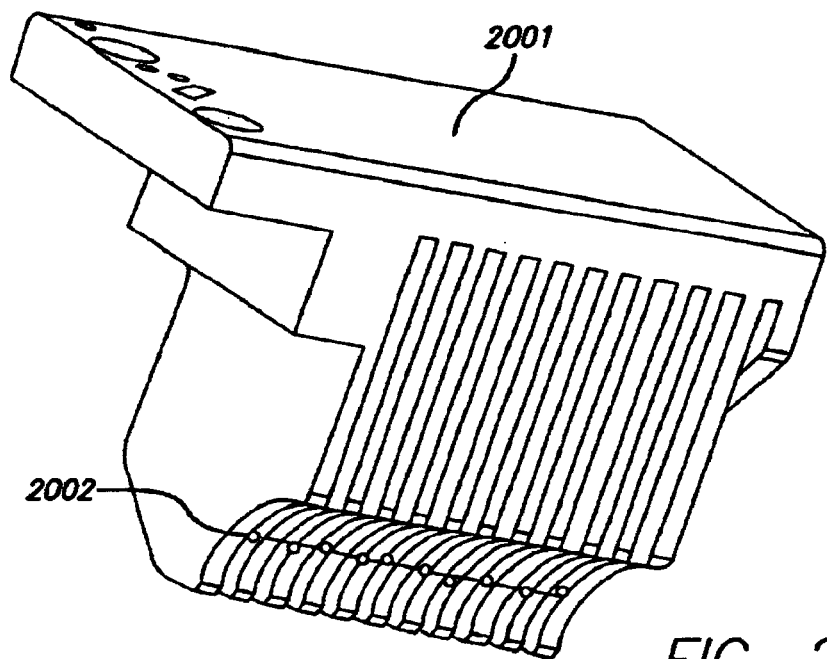
FIG. 20 is a perspective view of an eleven-shroud right baffle according to one aspect of the present invention.
Figure 21:
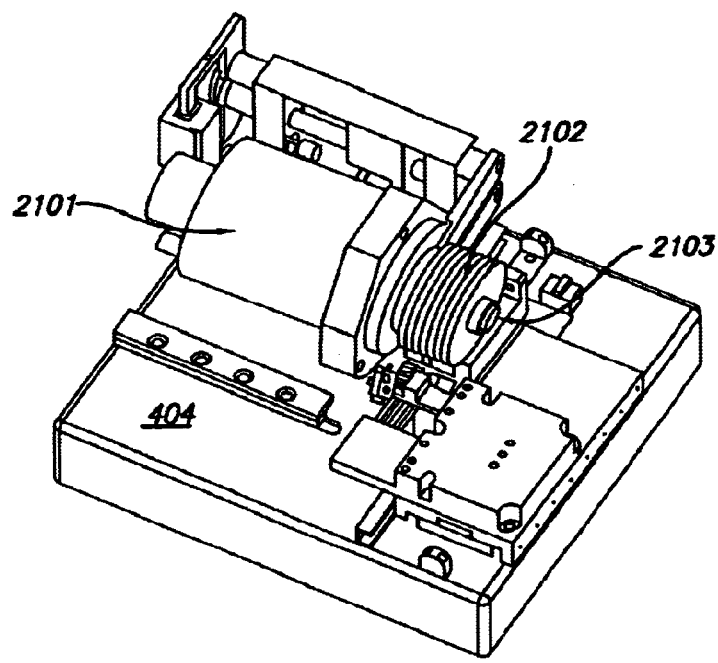
FIG. 21 represents the hardware associated with the servo writing device according to one aspect of the current invention.

In a further aspect of the present invention, a right baffle 2001 as illustrated in FIG. 20 is analogous to the left baffle 1901 described above and comprises a plurality of individual right baffle cavities 2002a–n corresponding to the number of media disks that may be loaded on the spindle. The structure and functionality of the right baffle are substantially the same as the structure and functionality of the left baffle, although certain differences exist. One such difference between the left and the right baffles 1901 and 2001 is that the planar dimensions of the right baffle shrouds in this aspect of the invention are smaller, such that each right baffle shroud receives and protects a smaller portion of the corresponding disk. In a particular embodiment, each right baffle shroud encloses substantially a quarter of the corresponding disk. In a related embodiment, each left baffle shroud and the corresponding right baffle shroud cooperatively enclose a non-insubstantial portion of the disk, in the aspect illustrated approximately ¾ of the corresponding disk. The remaining ¼ of each such disk is essentially covered by one or more heads and/or other related hardware.

Other specific dimensional characteristics are available for the left and right baffle, as may be appreciated by one of skill in the art. The function and purpose of the shrouding arrangement is to cover as much media disk surface as reasonably practicable while at the same time allowing reasonably free access by the read and write heads to the media disks. Alternate designs include, but are not limited to, use of a single shroud similar to the left shroud covering approximately half the media surface, and use of a shroud covering approximately half the surface similar to the left shroud 1901 and a larger or smaller dimension right shroud than that shown. Dimensions of the shroud or shrouds are dictated by various factors, including desired rotation speed of the disks, physical dimensions of the positioner arm or arms, amount of media disk access required, and disk holding considerations, such as spindle, chuck, and other holding mechanism dimensions. By way of example and not limitation, the spacing between the disks and the shroud or baffle hardware may be as small as on the order of 10 mils and possibly lower, such as 9 or 8 mils.

Figure 19:
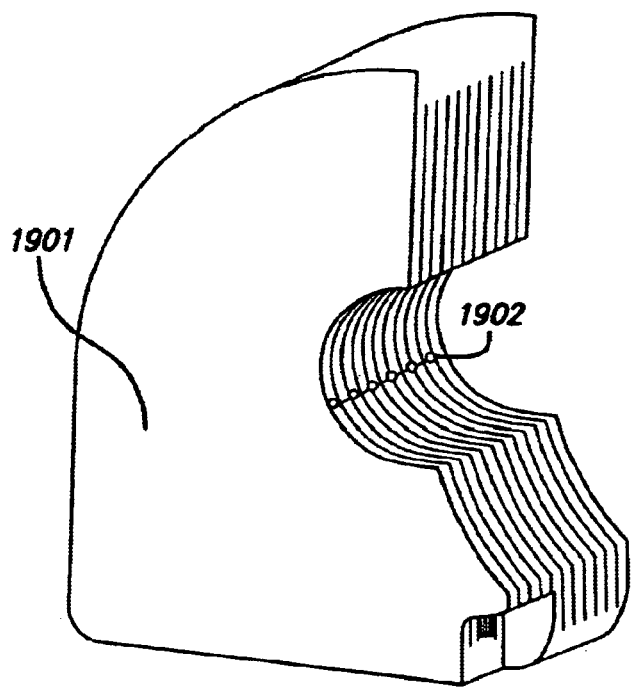
FIG. 19 illustrates a perspective view of the left baffle shroud according to one aspect of the present invention.

When engaged in an operational position in the configuration illustrated in FIGS. 19 and 20, the right baffle 2001 may be disposed substantially opposite to the left baffle 1901 with respect to the spinning axis of the disks. The translating directions of the left and right baffles 1901 and 2001 are also opposite, with the left baffle 1901 approaching the disks from the left direction and the right baffle 2001 approaching the disks from the right direction. Further, unlike the left baffle 1901, which may translate independently of the heads, the right baffle 2001 is mechanically coupled to the read/write heads and associated positioner in one aspect, such that the heads and the right baffle are disposed on the same arm. In this aspect, when the heads are engaged in a functional position by the voice coil motor (VCM), the right baffle 2001 is substantially simultaneously disposed in an operational position. Subsequently, during normal operation, the heads may move with respect to the disks and the right baffle 2001 while reading and/or writing to the disks, but the individual right baffle shrouds 2002a–n remain substantially stationary with respect to the corresponding left baffle shrouds 1902a–n and the spinning axis of the disks.

It is to be understood that the foregoing represents a single specific design of the present invention and is not meant to be limiting to the design shown. Translating is not necessarily required, and for example the shrouds may be fixed in position, disks may be rotated into the shroud using a movable spindle, and either one, both, or neither shroud may interact directly with the positioner, VCM, and other system hardware. The design must, at a minimum, provide a level of coverage or enclosure of the media disks and decrease the risk of windage disrupting the interaction between head and disk.

In one aspect of the current invention, the left baffle 1901 and the right baffle 2001 are constructed from aluminum. Alternatively, the left baffle 1901 and/or the right baffle 2001 may be constructed from plastic. Other materials may be employed while within the scope of the present invention, provided the materials provide adequate strength characteristics and operate to minimize the risk of turbulent flow in the arrangement selected. Thus materials such as aluminum and/or plastic may be used, but these materials are neither required nor exclusive for constructing the inventive baffle arrangement shown herein.

In a particular implementation, the left and/or right baffles 1901 and/or 2001 may comprise one or more vacuum ports or inlets (not shown in the illustrated aspect but known to those of skill in the art) that may be utilized to remove debris or particles located in proximity of the spinning disks. Such debris is typically found in the form of small particles, and such small particles may inhibit performance of the disk stack. The inlet operates in connection with a vacuum pump to intake or vacuum air and particles from the shroud arrangement. The inlets may be located at each baffle, or at one baffle, and may span all chambers of the baffle, a single chamber of the baffle, or any intermediate number of chambers. The purpose and functionality of the inlet arrangement is to remove unwanted particles and provides a means to reduce the quantity of ambient particles contacting disk surfaces in the multi disk arrangement. The inlets or vacuum ports may be a single small diameter hole located atop or on the side of the baffle, or alternately a long sealed opening on the side of the baffle to afford access to each disk and chamber or cavity. Other vacuum port or inlet shapes and configurations may be employed while still within the scope of this aspect of the invention.

Figure 22:
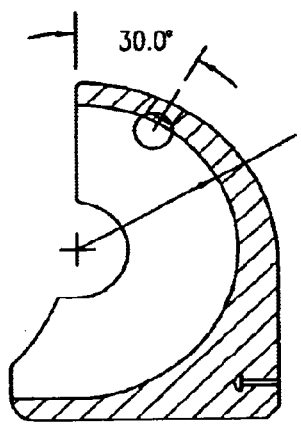
FIG. 22 is a top cutaway view of the left baffle shroud according to one aspect of the current invention.
Figure 23:
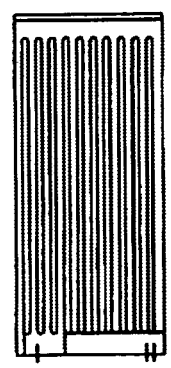
FIG. 23 presents a side cutaway view of the left baffle shroud according to one aspect of the current invention.
Figure 24:
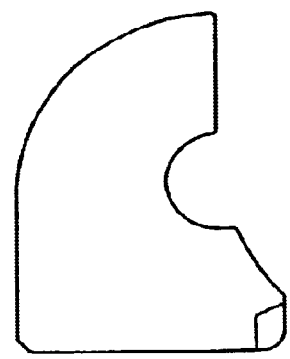
FIG. 24 shows a bottom view of the left baffle shroud according to one aspect of the current invention.
Figure 25:
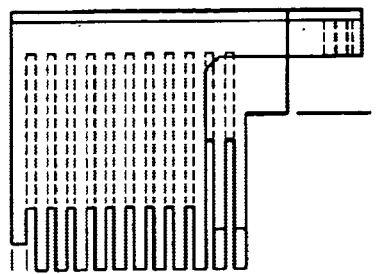
FIG. 25 illustrates a side view of the right baffle shroud according to one aspect of the current invention.
Figure 26:
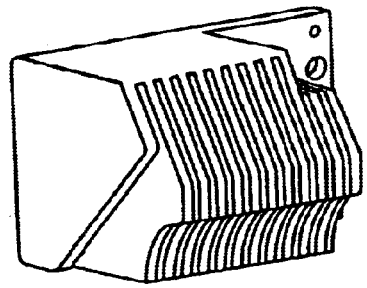
FIG. 26 is an alternate perspective view of the right baffle shroud according to one aspect of the current invention.
Figure 27:
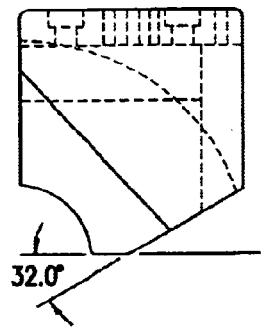
FIG. 27 shows a bottom view of the right baffle shroud according to one aspect of the current invention.

While varying dimensions may be employed, particularly of the shroud, baffle, baffle Alternate views of the baffles are illustrated in FIGS. 22 through 27. FIG. 22 is a top cutaway view of the left baffle. FIG. 23 is a side cutaway view of the left baffle. FIG. 24 is a bottom view of the left baffle. FIG. 25 is a side view of the right baffle. FIG. 26 is an alternate perspective view of the right baffle. FIG. 27 is a bottom view of the right baffle.

2. Clock Head Shroud.

Figure 28:
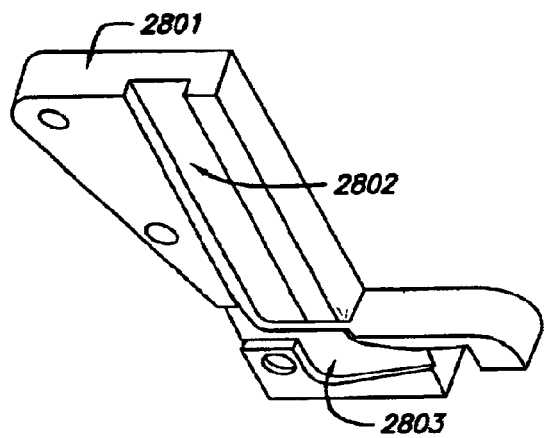
FIG. 28 is a perspective view of the clock shroud according to another aspect of the current invention.
Figure 29:
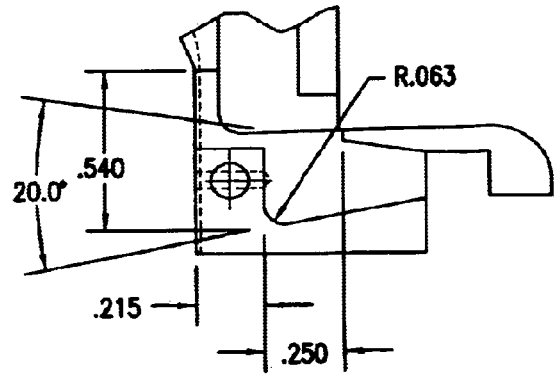
FIG. 29 presents a top view of the clock shroud of FIG. 28 according to one aspect of the current invention.

Another embodiment of the invention provides a shroud that may protect a media disk while a clock head reads or writes data from the disk. The shroud of this aspect of the invention is presented in FIG. 28. The clock shroud 2801 encloses the head at close proximity to the disk substantially completely, but comprises a number of apertures, such as first relief cut 2802 and second relief cut 2803, that permit introduction and withdrawal of the clock head and/or of other devices. Such relief cuts are beneficial in certain circumstances but are not required as part of the present invention; rather, the important aspect of the invention is to provide a shroud or covering that covers the head and decreases the amount of windage encountering the head and reduces risk of disruption of the head-media disk interaction. In the design shown, additional apertures located in the shroud permit disposition of certain devices, such as a motor. The use of the clock shroud enables a more accurate clock and timing arrangement for the system, minimizes interference between the clock head and the disk, keeps certain data, such as servo pattern data phase coherent, and minimizes vibration. The clock head sits in the notch illustrated in FIG. 28. FIG. 29 is a top view of a clock shroud that may be employed in association with the current invention.

Head Mounting Design

A further aspect of the present design is employed in connection with the heads writing to and reading from the media in the configuration presented above. More particularly, the present design includes a system and method for mounting the heads to relevant hardware, such as an assembly or holding device, positioner arms and an E-block, so that the heads can be removed and replaced in a more efficient manner than previously known.

Figure 30:
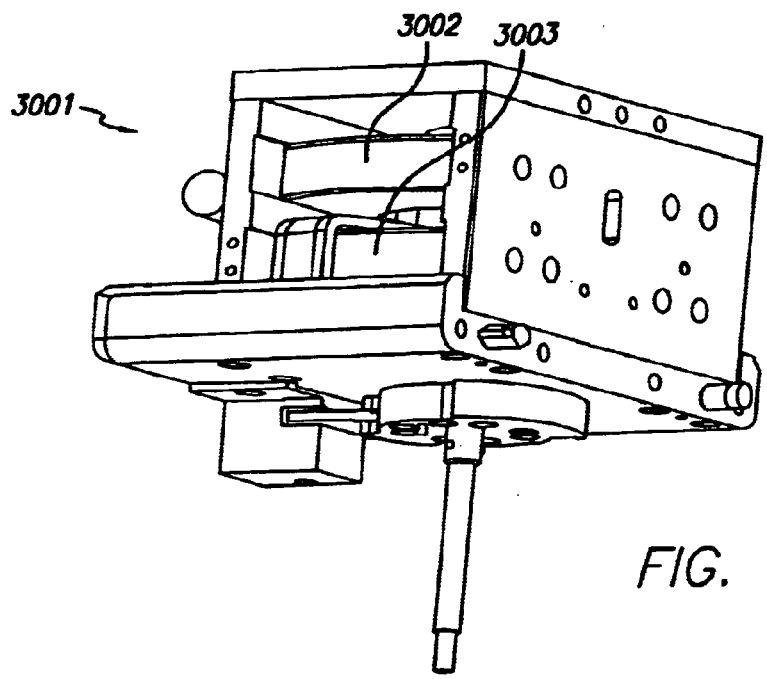
FIG. 30 is a rotary voice coil motor design according to one embodiment of the current invention.
Figure 31:
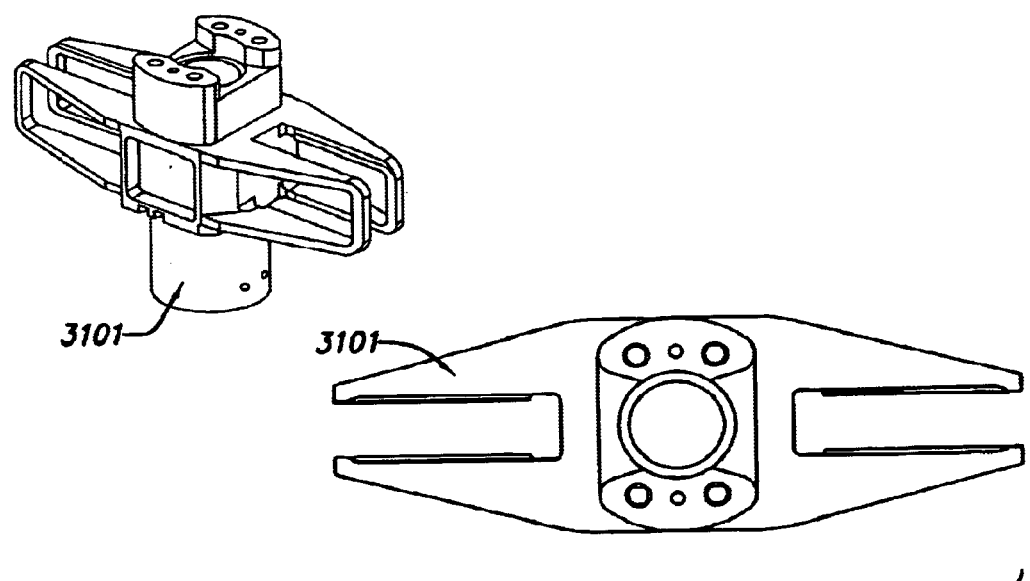
FIG. 31 presents a coil housing according to one embodiment of the current invention.
Figure 32:
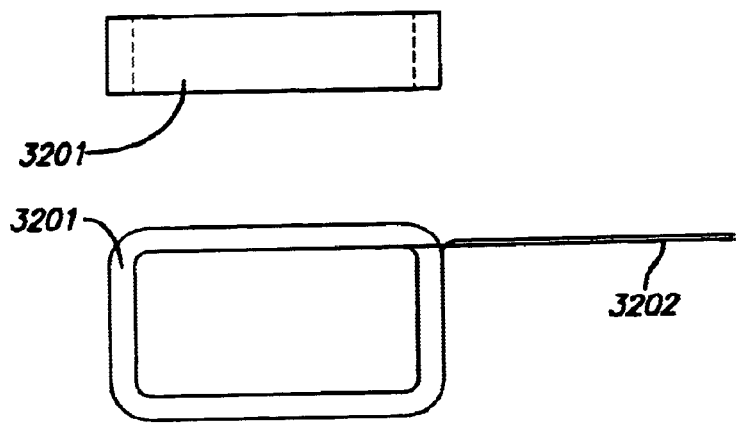
FIG. 32 presents a front and side view of a coil according to one embodiment of the current invention.
Figure 33:
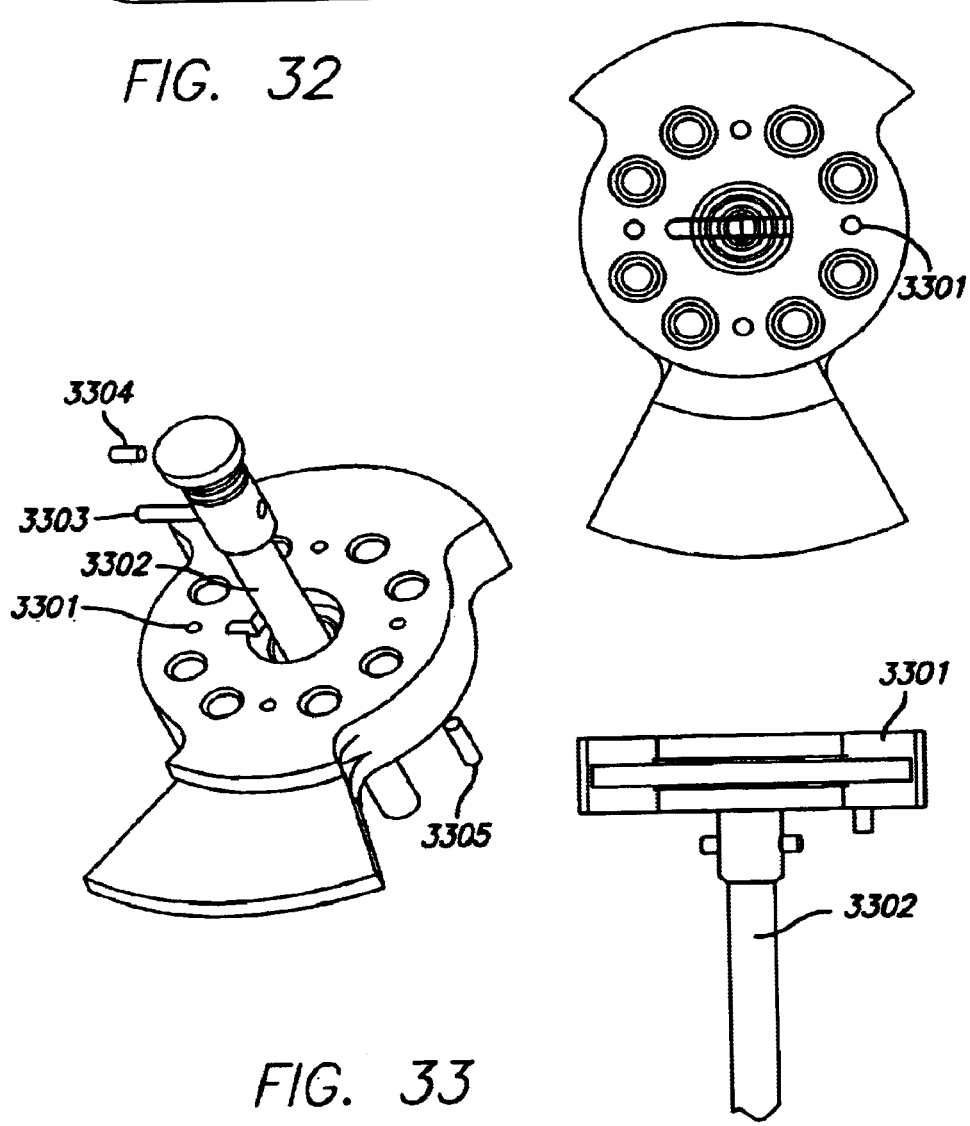
FIG. 33 shows a scale holder and shaft used to maintain and rotate the positioner, E-block, and related components according to one embodiment of the current invention.
Figure 34:
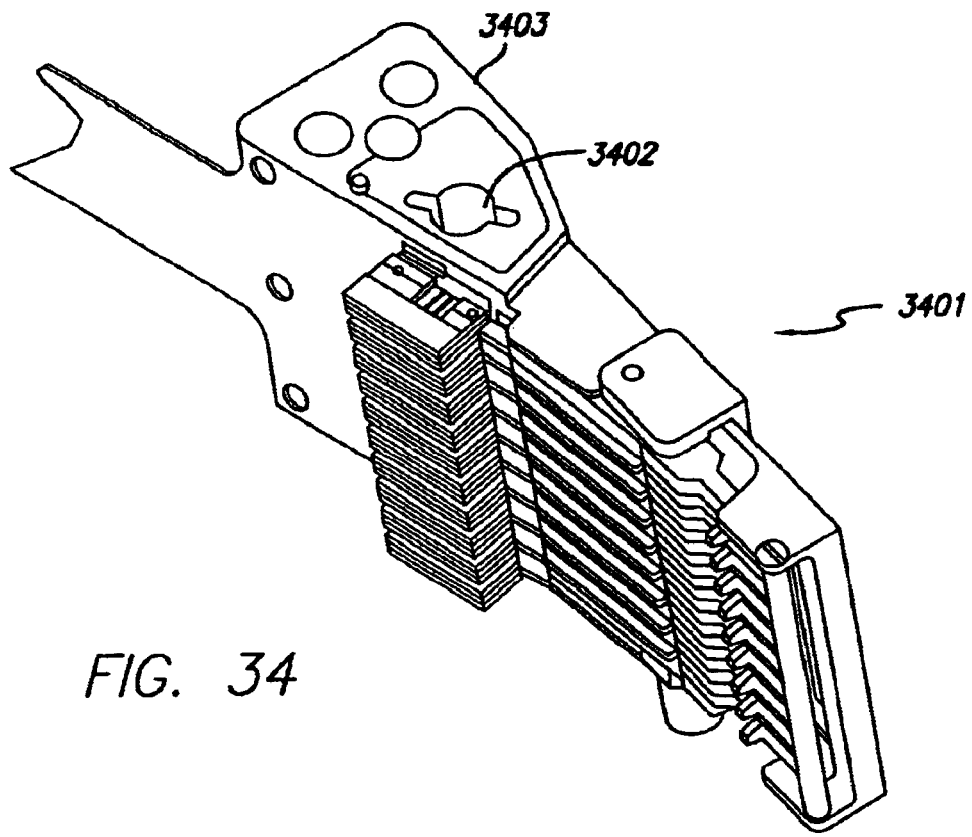
FIG. 34 shows the E-block assembly, including a plurality of heads attached thereto on head assemblies according to one embodiment of the current invention.

FIG. 30 presents one rotary voice coil motor design 3001 that may be employed in a media track writer or servowriter as shown above, wherein the voice coil motor is used to drive the head positioner and the heads located thereon. The voice coil motor design 3001 is a balanced torque design having twin coils 3002 and 3003 placed on opposite sides of a central pivot. The rotating portion of the voice coil motor is suspended on two high precision preloaded ball bearings (not shown), and includes the coil housing 3101 of FIG. 31, two coils 3201 shown in FIG. 32, scale holder 3301 and shaft 3302. The shaft on the scale holder 3301 and shaft 3302 assembly, including dowels 3303, 3304, and 3305, are used to guide and align the scale holder to the FIG. 34 E-block positioner arm assembly 3401. The shaft 3302 fits into cavity 3402 in E-block positioner arm assembly 3401, with coarse angular alignment established by crosswise dowel pin 3303 and final angular alignment performed by smaller dowel pin 3304. E-Block 3403 is attached to the remainder of the E-Block positioner arm assembly 3401. This smaller dowel pin 3304 is inserted between scale holder 3301 and the E-block positioner arm assembly 3401. A standard wing nut, not shown, fastens the E-block positioner arm assembly 3401 to the scale holder 3301 and shaft 3302. This wing-nut attachment of E-block and head assembly provides for rapid loosening of the wing nut, releasing the shaft, removing the shaft, and disengaging the E-Block positioner arm assembly 3401 from the rest of the media writer. It is desirable to periodically replace the head assembly to address normal wear and tear during servowriting or damage to one or more heads resulting from faulty disks while retaining the assembly for future use.

Figure 35:
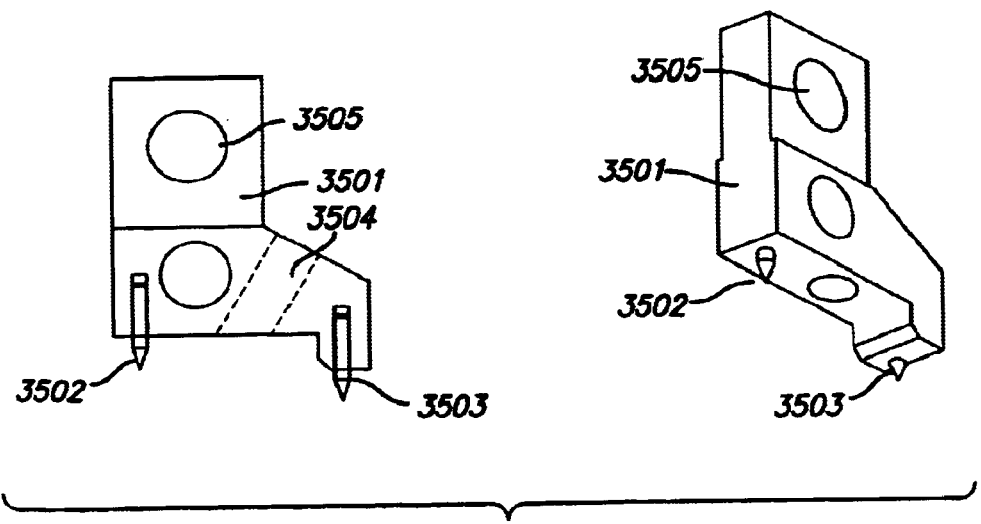
FIG. 35 shows an example of a mounting tab that may be mounted to the E-block and that may operate in accordance with the present invention according to one embodiment of the current invention.
Figure 36:
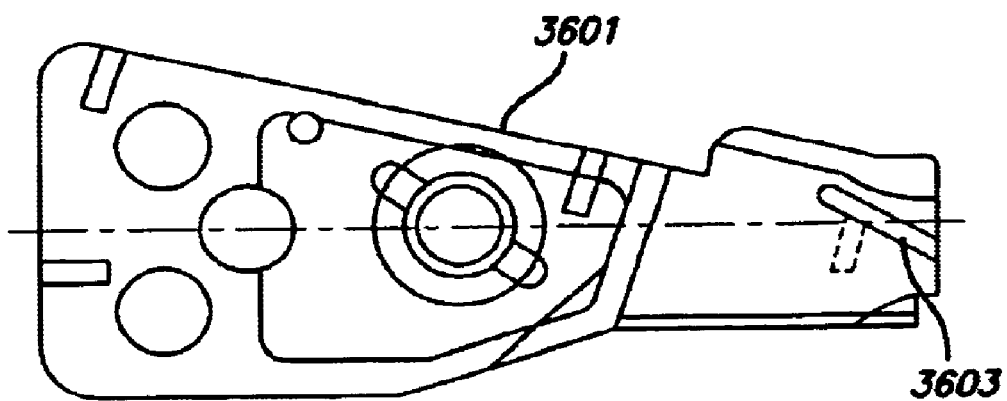
FIG. 36 shows a top view of the E-Block bifurcated by a centerline and particularly highlighting the slots for receiving the dowels or pins of the mounting tab according to one embodiment of the current invention.

With respect to the head assembly, and namely the assembly exclusive of the head, E-Block, and positioner arms, the way the device is assembled during operation is as follows. Individual head-gimbal assemblies (HGAs) are attached to small mounting tabs. When assembled, the HGA may be attached to mounting tab 3501 as shown in FIG. 35, which is then affixed to the arms of the E-block 3601, shown in detail in FIG. 36. Each mounting tab 3501 is held in place on the E-block arms using a small screw, such as a M1.2 screw, which passes through channel 3504. FIG. 36 illustrates a top view of the E-Block 3601 bifurcated by an imaginary centerline. Alignment of the mounting tab and E-block 3601 of FIG. 36 occurs using the two dowel pointed pins 3502 and 3503, which are ultimately inserted into two slots 3602 and 3603 in E-Block 3601. From the angle of FIG. 36, only one slot 3603 is visible. Use of the dowel pointed pins 3502 and 3503 align the tab 3501 to the arm 3606 of the E-block 3601. A tab having one or two heads may be removed from or assembled to the E-block with the installation or removal of a single screw.

The present apparatus obviates the need for the previous method of "staking." The present design uses a press fit scheme, whereby the HGA and head mount components are pressed into place and secured to other assemblies using dowels, pins, screw, wing nut, and other components. Staking required mounting tab replacement or head arm or E-block after only two or three head replacements due to permanent deformation of the boss receiving bore 3504 of the head mount. The present design employs a smaller head bore 3504 than the mating boss on the head suspension, enabling the HGA to be attached to the head mount by applying pressure, or pressing, the part and forcing the suspension boss into the head mount bore 3504. This pressing operation allows the suspension boss to maintain sufficient torque to allow proper head operation during functions such as ramp load and unload of heads onto the disks. Compared to staking, a press fit or a pressure fitting has the ability to impart less distortion to the interface between the HGA and the mating head mount bore, increasing the number of reuses of the head mount tab 3501 before replacement is indicated. Since HGA distortion is generally less than that of the mating head mount bore, head damage can be minimized by press fitting rather than staking.

An alignment and pressing fixture may be employed to assemble one or two HGAs to a head mount. HGAs may be assembled using the devices shown in FIG. 37. In practice, the head mount is located within the center section 3702 while one or two HGAs are affixed to the head mount depending on the application. HGAs are sandwiched between the left section 3701 and the head mount fixedly positioned within center section 3702, and/or the head mount fixedly positioned within the center section 3702 and the right section 3703. The heads are then aligned with and affixed to the head mount tab, which is thereafter assembled on the E-block.

Figure 37:
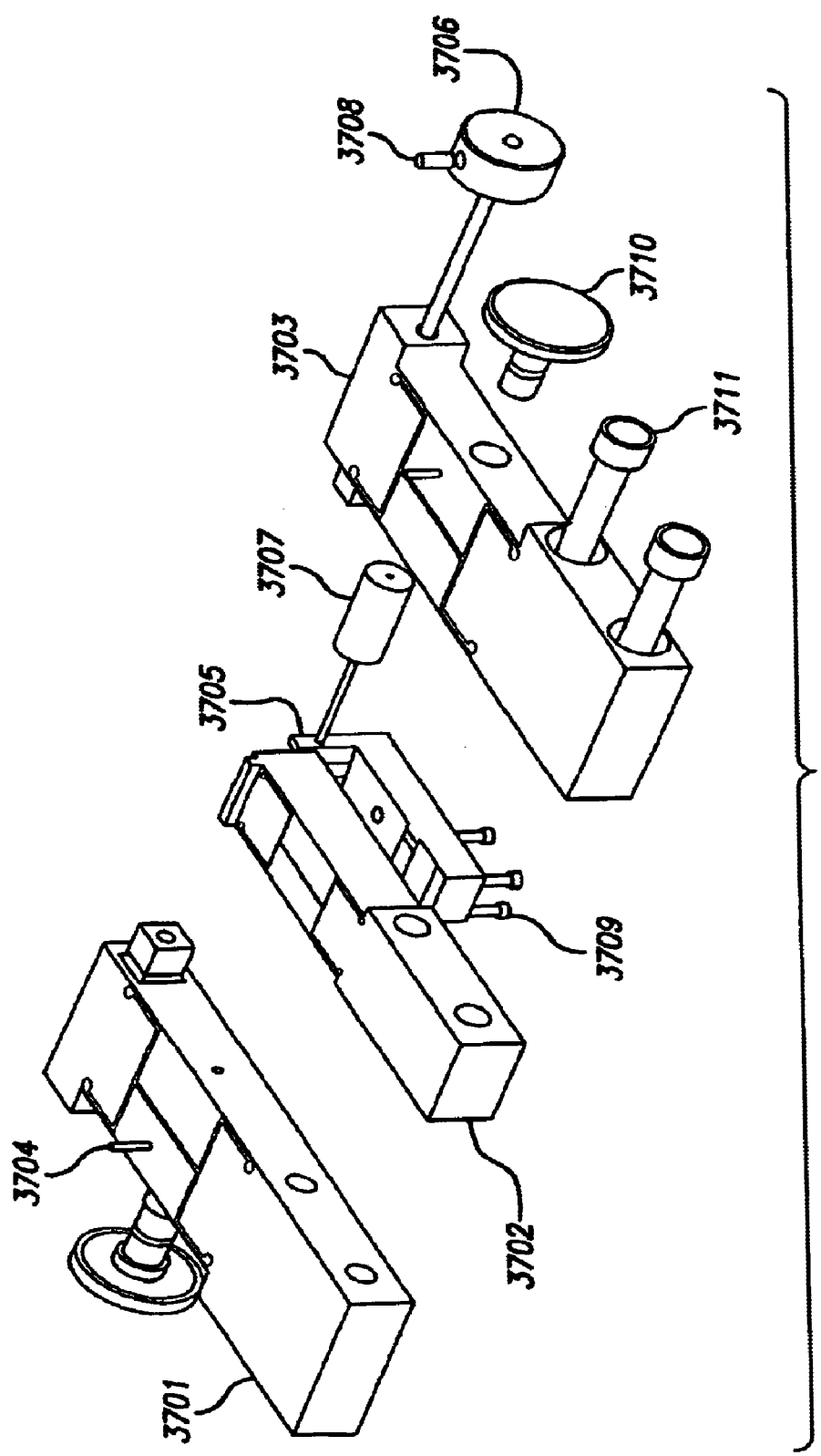
FIG. 37 is an exploded view of one aspect of an assembly tool that may be used in accordance with the present invention.

FIG. 37 illustrates an exploded view of the three sections and the associated hardware used to prepare the HGA or head assembly and mount for receiving a read/write head. In FIG. 37, the head mount tab (not shown) is mounted to the head assembly tool 3704. The center section is used to align and mount the tab to the HGA using the aforementioned M1.2 screw (not shown in this Figure). Heads are placed between the press-fit jaws of left and right assembly tool parts 3701 and 3703, between those assembly tool parts and the center section 3702, and are aligned using the HGA support 3705. The right head assembly tool part 3701 may be forced toward the center section 3702 using a vise or other clamping device, and the HGA bosses are press fit to the head mount tab bore. The head mount tab is aligned using the HGA support 3705 and alignment tool pins 3706 and 3707. The pins may be a straight or stepped pin to provide necessary support and alignment for the tasks outlined below.

Each of the assembly tool parts, left section 3701, center section 3702, and right section 3703 have slots cut through the material to provide limited lateral flexibility. The flexibility enables the tool to be used for a head to be assembled on either side of the head mount tab, or both sides may be assembled at once.

Figure 38A:
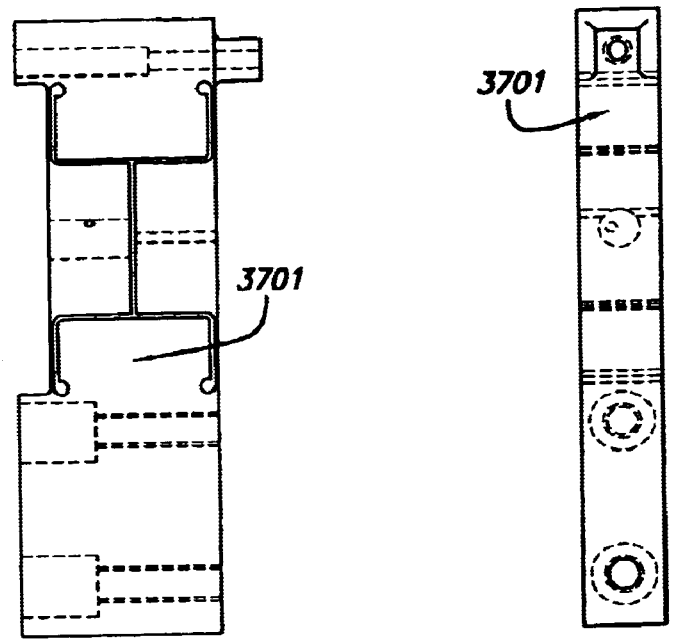
FIG. 38A shows front and side views of one aspect of a left section of an assembly tool according to one embodiment of the current invention.
Figure 38B:
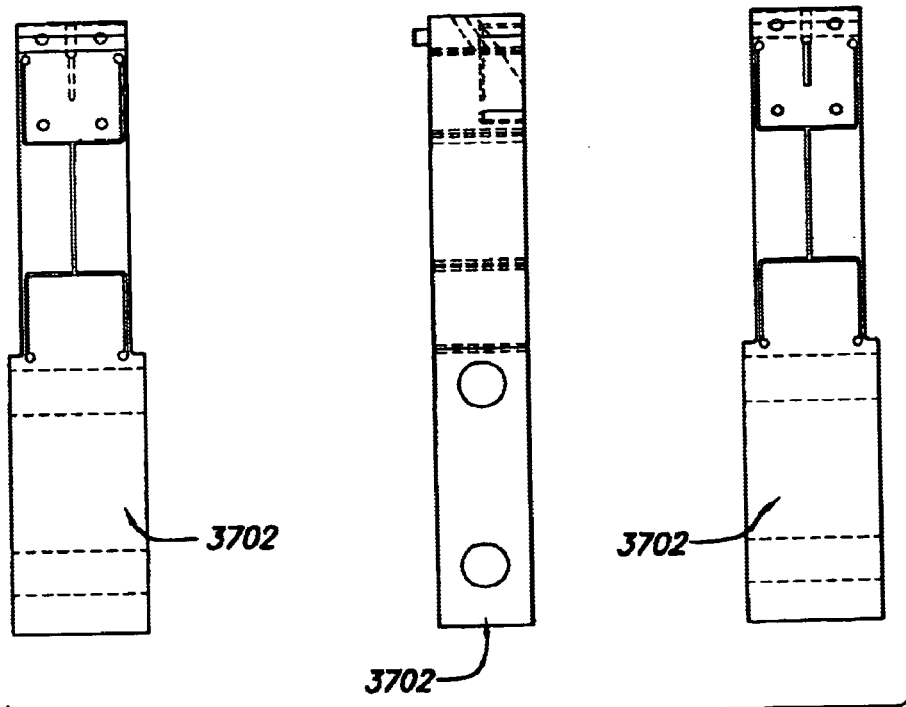
FIG. 38B illustrates front, rear, and side views of one aspect of a center section of an assembly tool according to one embodiment of the current invention.
Figure 38C:
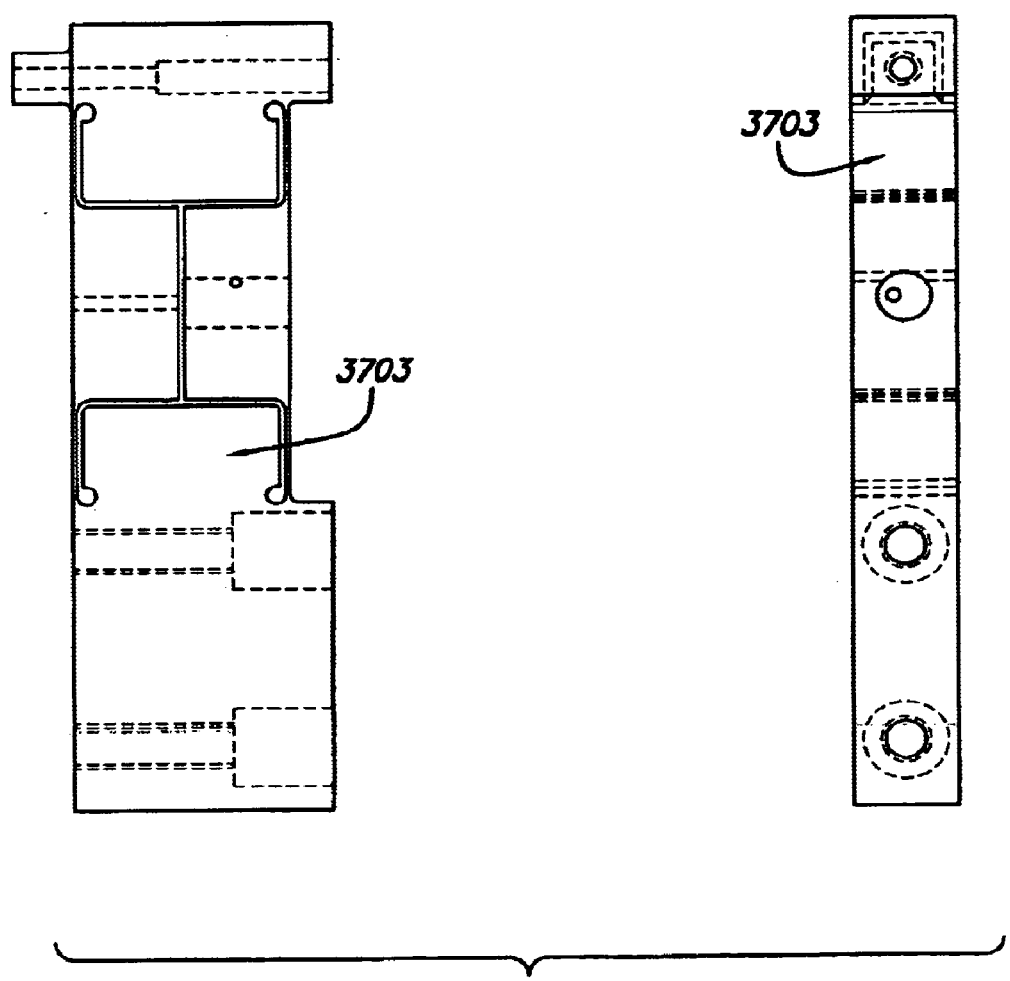
FIG. 38C represents front and side views of one aspect of a right section of an assembly tool according to one embodiment of the current invention.

FIGS. 38A, 38B, and 384C show details of the three assembly tool parts, left section 3701, center section 3702, and right section 3703. These are representative of one possible implementation, and other implementations may be employed while within the scope of the present invention.

Figure 39:
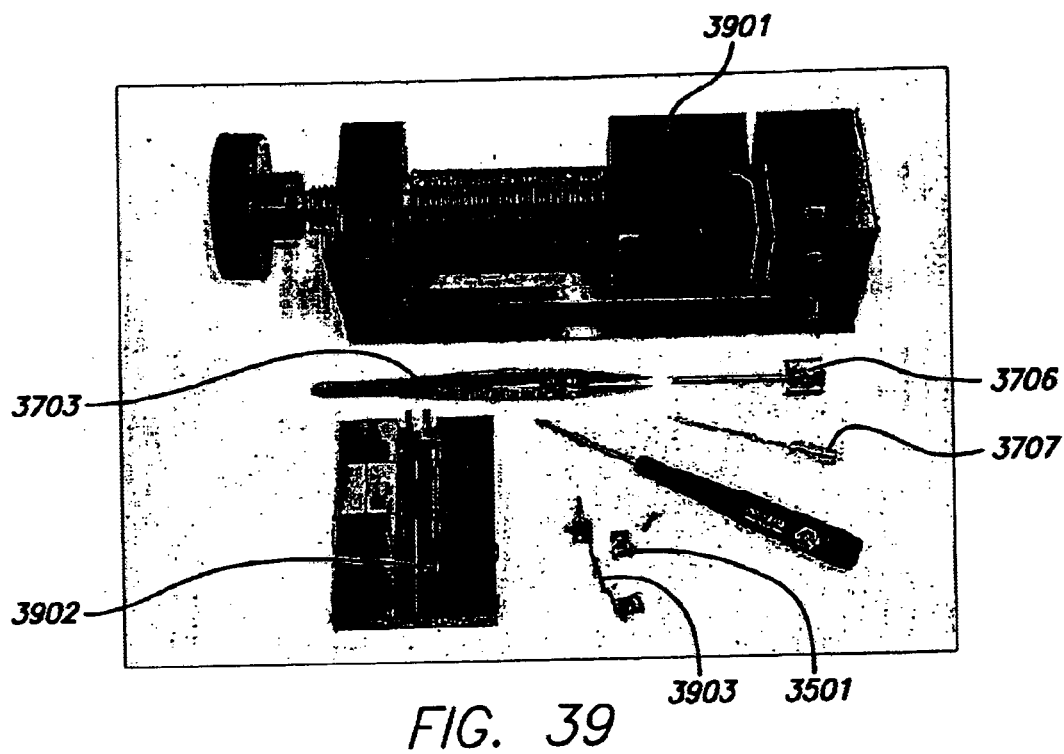
FIG. 39 shows various components that may be employed in the inventive press fit method disclosed herein according to one embodiment of the current invention.

Assembly of the system is shown in FIGS. 39–43. FIG. 39 illustrates a high precision vise 3901, the two alignment tool pins 3706 and 3707, the assembly tool 3902 comprising left section 3702, center section 3703, and right section 3704, the head assembly 3803, and tools for performing the head assembly. ESD protection may be employed during handling operation, and the work may be performed under a clean hood by an operator with gloved hands. The assembly tool may be constructed from any appropriate material, including but not limited to stainless steel, such as a cold rolled type 302 or 304 stainless steel. Other materials may be employed that provide sufficient holding, wear, and strength characteristics, among other advantageous aspects.

Head arm mount 3501 is inserted into the assembly tool 3902. The head assembly tool 3902 is maintained within the precision vise 3901 grasping the base of the tool 3902, thereby applying a level of pressure or tension to the assembly tool, but not so much as to restrict movement of the upper section of the tool sections. The center, right, and left sections of the assembly tool 3905 may be spread such that the head arm mount may be inserted in the gap and the pins of the head arm mount aligned into the center section 3703 of the assembly tool 3902. Spreading may occur by various means, including using the operator's fingers to separate the left, center, and right sections of the assembly tool 3902. The M1.2 screw is then tightened, thereby wedging the sides of the head arm mount 3501 within the center section 3703 of the assembly tool 3905. The operator or a machine may then pick up the head assembly, spread the outer members of the assembly tool and gently insert the head assembly between two of the sections, such as the left section 3702 and the head arm mount 3501. The staking boss (not shown) of the head assembly 3903 may be approximately aligned with the upper hole of the head arm mount 3501.

Figure 40:
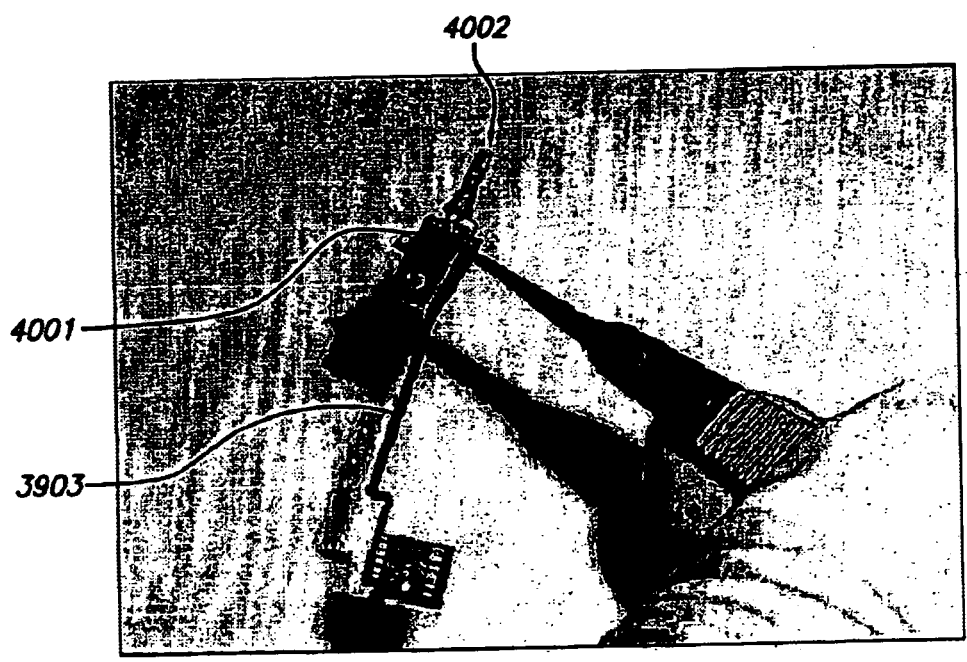
FIG. 40 shows one detailed aspect of a head assembly according to one embodiment of the current invention.

FIG. 40 presents a side view of a sample head assembly 3903, held with tweezers by an operator. This sample head assembly is only representative of the types of head assemblies that may be employed, and the head assembly shown has the ability to maintain the drive head 4002 at the top end in the orientation shown and has various openings which enable the assembly and alignment described below. It is to be particularly noted that other head assembly designs may be employed while still within the scope of the present invention.

Figure 41:
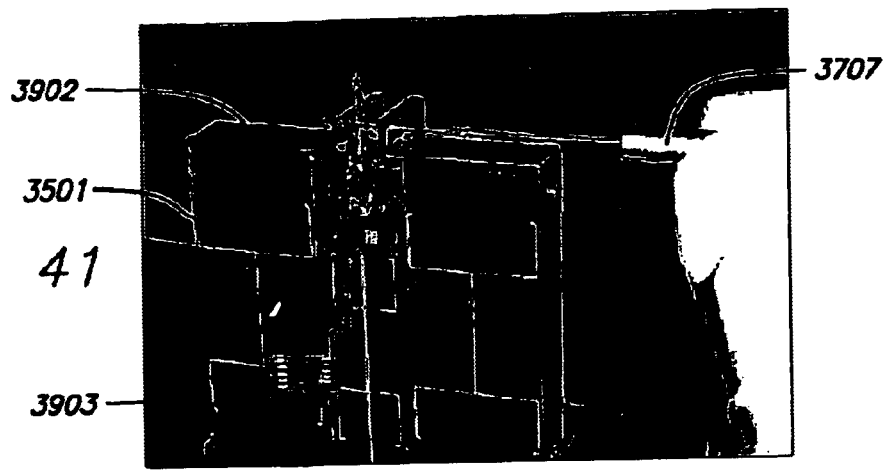
FIG. 41 is a view of an assembly tool maintaining a mounting tab and head assembly prior to press fitting with an alignment pin inserted therethrough according to one embodiment of the current invention.

In initial operation, the head arm mount 3501 is located within the assembly tool 3905, namely center section 3702. In an orientation where the center section spacing gap is positioned upward, the pins 3502 and 3503 of the head arm mount 3501 are oriented downward and the head arm mount 3501 is pushed down into the center section 3702. A screw is inserted through channel 3504, such as an M1.2 screw, to apply pressure to the sides of the head arm mount 3501 and fixedly mount the head arm mount 3501 to the center section 3702. FIG. 41 illustrates a head arm mount 3501 positioned against the head assembly 3903 within the assembly tool 3905. FIG. 41 further illustrates insertion of a pin 3707, such as a straight 0.8 mm diameter pin, through the upper slots of the assembly tool 4103 and through a tooling pin hole in the head assembly 4103.

Figure 42:
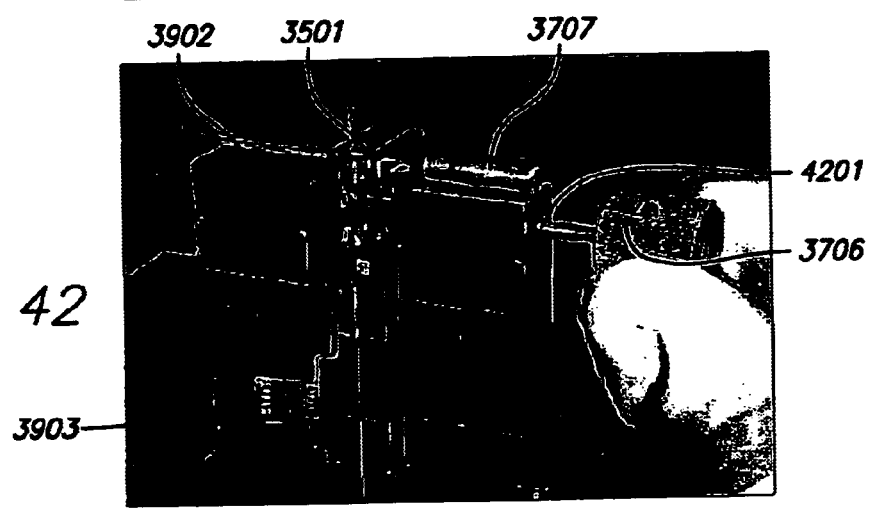
FIG. 42 illustrates an assembly tool maintaining a mounting tab and head assembly prior to press fitting with a second alignment pin inserted therethrough according to one embodiment of the current invention.

In certain circumstances, the head assembly may be repositioned so that pin 3707 can engage the tooling hole in the head assembly 3903. FIG. 42 illustrates insertion of pin 3706, such as a stepped 2.13 mm diameter pin, into a lower hole 4201 in the assembly tool 3905. The pin 3706 may be inserted carefully such that it passes through the head assembly 3903. An operator or machine may at this point inspect alignment of the head assembly 3903 within the head arm mount 3904. Inspection may occur in any available reasonable manner, including but not limited to a low power stereo inspection microscope. If alignment is acceptable, the pins 3706 and 3707 may be removed from the alignment tool. Spring pressure from the assembly tool 3905 in many circumstances will keep the head assembly aligned to the head arm mount 3501.

Figure 43:
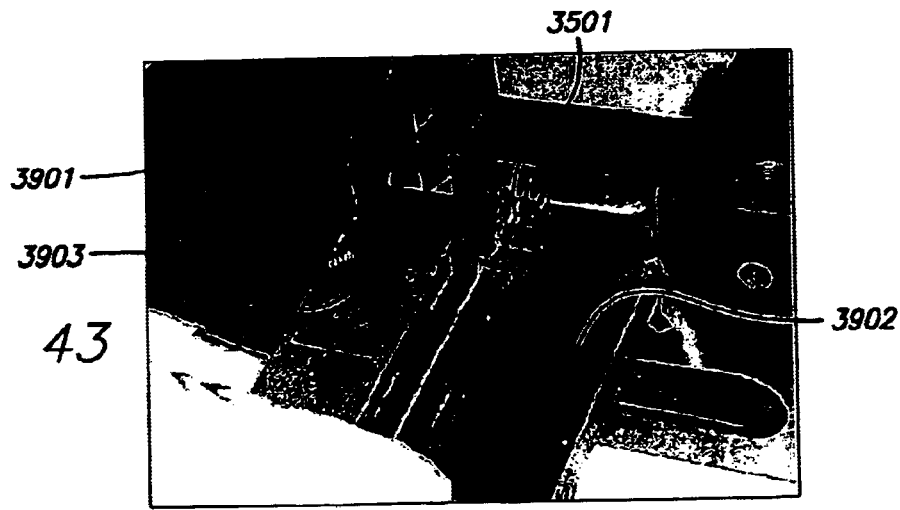
FIG. 43 shows an assembly tool maintaining a mounting tab and head assembly and press fitting the components together using a vise or clamping device according to one embodiment of the current invention.

The upper edge of the alignment tool 3905 may then be repositioned within the vise 3901 as shown in FIG. 43. A relatively small section of the alignment tool 3905 may be inserted into the vise 3901, such as less than 10 mm. A relatively small amount of pressure is then applied by tightening the vise 3901, thereby press fitting the head assembly 3903 into the head arm mount 3904. The screw may then be removed from the head arm mount 3501 and the head assembly press fitted to the head arm mount 3501 may be removed from the assembly tool.

Other implementations of the press fitting method described above are within the scope of the present invention, and the foregoing description, as with all descriptions of particular design aspects herein, is not intended to be restrictive or limiting.

Disk Biasing

An aspect of the present invention provides methods and systems for controlling disk position on a central hub or chuck during servo track writing and/or reading. The disk position control may occur prior to installation into a Hard Disk Drive. The disk biasing methods and systems disclosed herein may be applied to single or multiple disks, require minimal or no operator intervention, and provide a repeatable way to control eccentric placement of servo information onto the disk.

One aspect of the MTW that is particularly noteworthy is the mechanical clearance between the disk inside diameter, and the hub or chuck outside diameter, namely the disk opening and the hub that fills the opening. A significant clearance dimension is necessary to enable fast and reliable disk installation on and off the hub and to accommodate disk and hub manufacturing tolerances. Excessive eccentricity, or servo track "runout", can cause servo capture and performance problems for the HDD, in that the head can be mislocated above the disk and can run outside a track, or begin in one track and end in another.

One way to deal with this excessive eccentricity aspect of a media track writer is to have a mechanism to "center" the disk on the hub at disk installation. Centering the disk typically may require precise and expensive fixturing to achieve reasonable accuracy. Another, often less expensive, way to address excessive concentricity is to "bias" the disk ID against the hub OD in a controlled manner so that this same "bias" can be applied when the disk is eventually installed into an HDA, thereby controlling the eccentricity rather than allowing tolerances to vary unpredictably to significant error levels. A necessary part of this process is maintaining and/or determining the bias direction and circumferential point where the bias is applied. Such use of bias direction and circumferential point may be accomplished by marking the disks or by handling the disks in a controlled and repeatable way.

To consistently bias a disk, an embodiment of the invention can apply biasing force to the disk OD, usually by using a very precise fixture or tool. By alternately biasing disks against the HDA spindle hub in opposite directions using "V" shape devices to push on the disk OD, rotational unbalance forces can be minimized. Typically, these "V" shape devices are placed on either side of the disk and spindle stack, such that half the disks are biased in one direction and the other half biased 180 degrees in the opposite direction. This way, for stacks of even numbers of disks, first order disk unbalances can be minimized. These "V" shape blades may be made slightly compliant to compensate for disk, spindle hub, and biasing tool mechanical tolerances, either by using a compliant material or some mechanical compliance, such as a spring type mechanism. The vertical axis of the biasing tool used to apply the "V" shape blades may be precisely aligned to the spindle hub axis to consistently bias the disks in the appropriate direction at all locations in the disk stack. Further, biasing of disk spacers may be employed using OD biasing.

An embodiment of the invention biases the disks using the disk ID. In this case, biasing forces are applied in an outward radial direction to the disk ID at one or more points, such as two points, to force the disk in a known direction against the spindle hub. The biasing force can be applied in various ways, including but not limited to using air pressure to automatically bias disks in the stack in the required direction. Two, small, piston-like devices within the spindle hub may be used to apply a radial vector sum force in a known direction to each disk. By arranging the piston-like devices in a pattern, forces can be directed in any direction for each disk. The simplest pattern would be 180 degree opposite force vectors for each disk, such that the net rotational unbalance force for an even number of disks, assuming identical disks, would be zero. Even numbers of disks ensure dynamic as well as static force balance. For each disk, each group of two piston-like devices is arranged in a manner to provide a vector sum force in a known direction.

According to an embodiment, an arrangement that facilitates the manufacturing process, comprises two pistons radially oriented with respect to hub axis and spaced an angle apart. Although many angles will work, the preferred angle for manufacturing is 90 degrees. This angle provides a vector sum of 1.414 times the force generated by each piston, in a direction half-way between the pistons, or in this case, 45 degrees from either piston, directed radially outward. In addition, lateral forces are generated by each piston, and these lateral forces tend to force the disk laterally until a force balance exists on the disk. Friction related forces may also exist. A friction force has a tendency to oppose the biasing force, irrespective of the direction of the biasing force.

The directional accuracy with which the disk will be biased depends upon the ratio of the magnitudes of the friction force to the biasing force. It may be beneficial in certain circumstances to minimize friction and maximize the biasing forces for each disk. Friction between disks and disk spacers can be minimized by using special plating processes on the spacers. For example, hard nickel plating or nickel plating with embedded Teflon particles have demonstrated low friction coefficients with most disk surfaces. Other coatings and/or materials can be used as well.

One implementation of the present aspect of the design includes a four disk chuck assembly with integral disk biasing. Disks are stacked onto a chuck and spaced vertically using a spacer. Once the stack is assembled and biasing done, the stack is clamped together using a top cap. Biasing is accomplished by use of pressurized air or other gas such as nitrogen, prior to clamping. Disk clamping is performed with a single screw, although alternate designs may utilize vacuum or other mechanical clamping means. Air or other gas used for biasing is introduced through the bottom base of chuck, distributed by a shaft, with biasing forces generated by a ball and orifice housing assembly. If both air pressure and vacuum is used (first for biasing then for clamping), internal check valves within chuck body direct air or vacuum to the appropriate areas as necessary. The biasing forces generated by the pair of ball and orifice housing assemblies are self balancing via use of a series combination fixed and variable orifice within the assembly.

The design resembles air-bearing systems where self balancing forces are generated by use of a fixed orifice in series with a variable orifice, with the air pressure between the two orifices used to provide a lifting or noncontact bearing action. In an air bearing, the variable orifice is nearly always created by one member of the bearing moving with respect to the other. In this biasing design, the variable orifice is created between the moving ball which contacts the disk I.D. and the angled ball seat within the housing. Pressurized air flows first through the fixed orifice, which is in the order of 0.010 inches diameter, then through the variable orifice. The air pressure between the 2 orifices acts on the ball to create a force directly proportional to that pressure. As the ball moves outward, the pressure falls, reducing ball force. As the ball moves inward, thus reducing the area of the variable orifice, the pressure increases, increasing the ball force. With two of these ball and orifice housing assemblies arranged so that radially outward forces are applied to a disk at a fixed angle between the devices, a vector sum force can be applied such that the direction is controlled. Use of the fixed/variable orifice set devices provides a self-balancing action such that the force vector always applies a force vector to the disk such that the disk is forced or "biased" against the chuck body in a specific direction and point on the chuck. That contact point between disk and hub is approximately 180 degrees opposite the two ball orifice housing piston devices.

By alternating the direction, e.g. 180 degrees, in sequence for each disk, the disks can be forced outward in alternating directions such that half the disks are biased one way and half are biased the opposite direction. This alternating of bias direction compensates for first-order unbalance effects due to the disk centers being displaced from the chuck rotational center.

The described disk ID "biasing" method is but one of many possible detail configurations wherein changes in the design would not provide a fundamental difference from the basic concept described herein. Specifically, the number of disks, disk spacing and angles between the pair of ball and orifice housings can be easily modified to a near infinite number of combinations without affecting the fundamental operation of the biasing concept. Also, the pushing elements can be other than ball shapes, including but not limited to other piston-like devices. In addition, while a fixed orifice in combination with variable orifice is believed to have higher accuracy of final vector direction, it may also be possible to simplify the design further, by using pistons or balls alone within a simple radial bore, provided the forces are limited so that no permanent disk ID surface deformation, "brinneling", or other damage occur.

Locking Cap

Figure 44:
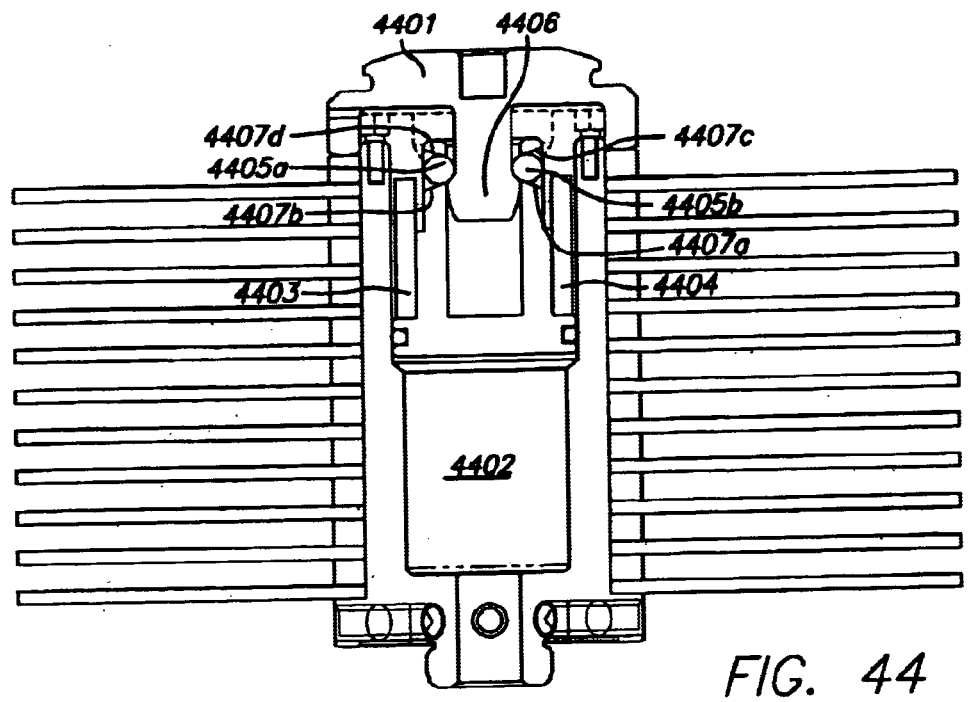
FIG. 44 is an aspect of the locking cap arrangement of a system according to one aspect of the current invention.
Figure 45:
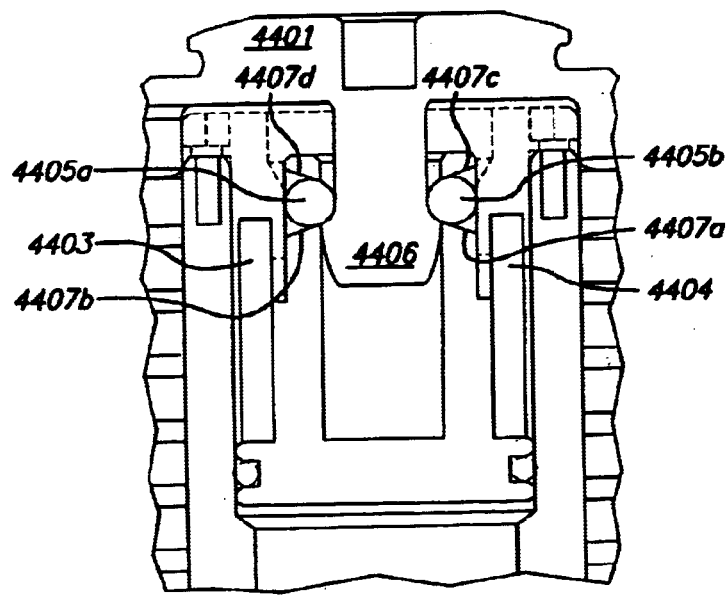
FIG. 45 is a close view of a locking cap according to an aspect of the present invention.

A further aspect of the present invention includes a specific mechanical aspect used to hold one or more of the disks in place in the media servowriter. An aspect of the present system includes certain aspects designed to facilitate maintaining disks at high rotation speeds. FIG. 44 illustrates a general view of one aspect of the device. FIG. 44 illustrates the disk maintenance design in a locked down configuration. A closer view of the inner elements of the design is presented in FIG. 45. The device includes a top cap 4401, a central chamber 4402, an annular compression spring 4403 and 4404 designed to pull the cap downward, and a set of ball bearings 4405, two of which are visible in these views, abutting the central core 4406 of the cap 4401. To unlock the device, the cap 4401 must be released, which requires application of air to the central chamber. Air is applied to the central chamber through the bottom of the device (hub). Air pushes up the central cylinder and the ball bearings 4405 buttressing the central core 4406 of the cap, thereby applying tension to the compression springs 4403 and 4404. When the ball bearings 4405 and the chambers in which they are located rise to a level proximate the upward sloping walls in the interior of the chamber, the ball bearings 4405 slide outward along the upward sloping walls 4407 and out of the way of the central core 4406 of the cap 4401. With the ball bearings 4405 out of the way, the cap 4401 can be readily released and disks 4410 either loaded or unloaded. In lieu of using air to engage and release the mechanism and cap 4401, a pushrod 4410 may be employed to push the central core upward and release the cap.

Figure 46:
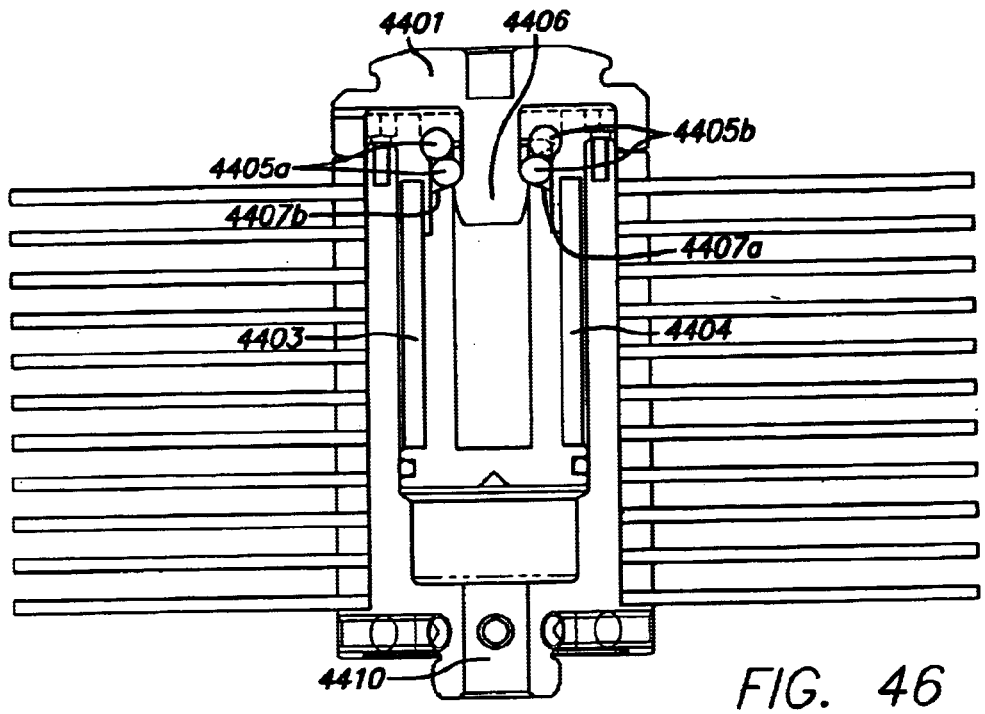
FIG. 46 is an aspect of the locking cap arrangement with bearings released and in release position according to one embodiment of the current invention.
Figure 47:
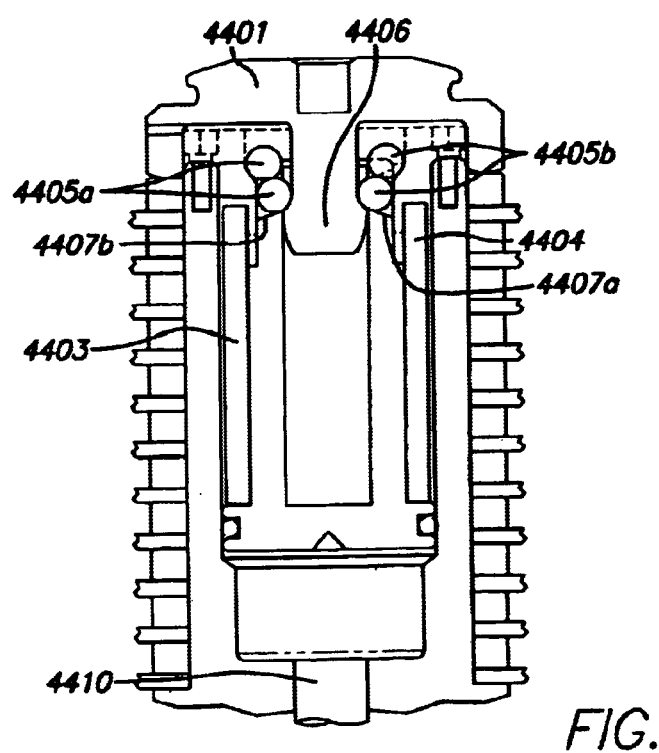
FIG. 47 is a close view of the locking cap arrangement with bearings released and in release position according to one embodiment of the current invention.

FIGS. 46 and 47 illustrate the cap in released position with the ball bearing and cap core in released position. Application of the cap 4401, specifically locking the cap down, requires removing air pressure from the interior of the cap, whereupon the central chamber slides downward and the ball bearings re-seat in the sloping holes and lock down the cap. Most of the components illustrated in these drawings are fashioned of metal, while the cap may be fashioned of a hardened plastic. Any materials may be employed that satisfy the engagement and release aspects and functionality described herein, and the central core and other exterior components, for example, may be fashioned of steel, nickel, or any other strong metal.

FIGS. 46 and 47 illustrate the ball bearings 4405 after having risen up to meet the chamber inner walls. The second figure is a close up view of the first figure. FIGS. 46 and 47 represent an alternative construct having larger compression springs and a larger interior chamber. The present design uses six ball bearings with six inner conical-shaped passages in the ball bearing set 4405. More or fewer ball bearings may be used. Alternate sloping of the channels where the ball bearings sit or the inner chamber walls which receive the ball bearings may be employed, as long as depressurization causes a release of the cap and pressurization holds the cap in place.

The present aspect of the system may be employed in a hard disk drive employing multiple disks, such as a servowriter and/or certification system verifying multiple disks, or in any other application requiring use of multiple fixed media, such as computer disks.

Multiple Finger Clamp

An additional aspect of the present system provides systems and methods for holding a hub, specifically a hub of a disk stacking cylinder employed to hold multiple disks during disk servowriting and certification. Previously available hub holding devices used some type of mechanical "jaws" that gripped the exterior of the hub and/or the notch formed between the hub and the main cylinder. The jaws were formed of some type of metal and were metal pieces used to pin the hub down and hold it in position by applying pressure to the upper side of the hub. These jaw-type locking devices tend to be imprecise in holding the hub or other cylindrical piece. At significantly high RPMs, such as in excess of 10,000 to 20,000 RPMs, centrifugal force works to pry these devices open, and many jaw type devices are pried open or move the piece as a result of high forces applied thereto. This prying tends to damage the hub and/or maintaining device and is generally unacceptable. Thus the previous devices could be characterized as easily pried open, with poor repeatability, and highly subject to movement of the piece.

Figure 48:
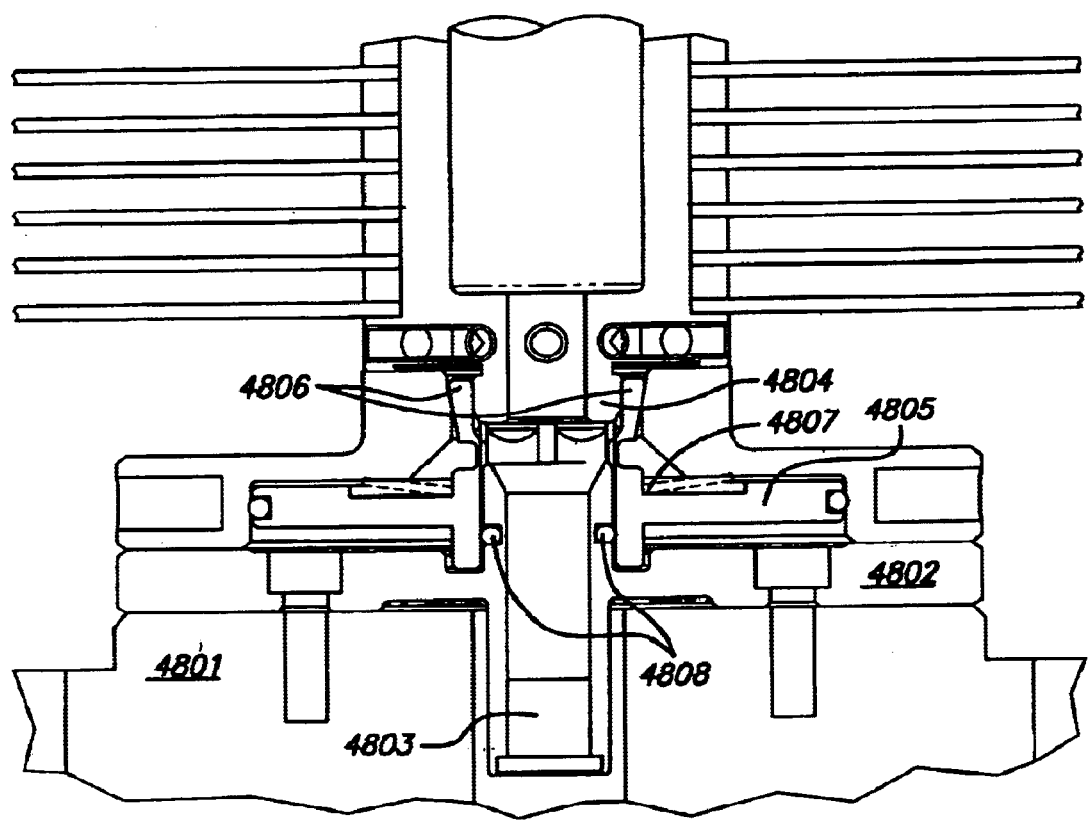
FIG. 48 illustrates the finger gripping arrangement used to grip a hub holding one or more disks according to one embodiment of the current invention.

FIG. 48 illustrates one aspect of the present design. The lowest piece is the spindle 4801, to which the chuck mounting plate 4802 is bolted. The central piece of the chuck mounting plate 4802 is the spindle 4803. The piece surrounding the chuck mounting plate 4802 and engaging the hub 4804 is the chuck clamp 4805. This design is air-actuated by passing air upward through the spindle and around the chuck mounting plate 4802. When air is applied, such as at a pressure of 60 psi, the chuck clamp 4805 rises and the hub 4804 can be removed from the clamp due to the set of fingers 4806 at the top of the clamp 4805, releasing the grip on the hub 4804. When air is applied, the Bellville spring 4807 collapses, and the central chuck clamp 4805 rises upward in the orientation shown, and releases. The "fingers" 4806 on the exterior flex and permit a close grip under ambient conditions. In other words, when the machine fails, it defaults to the gripped position shown in FIG. 48. The circles in the central chuck clamp are O-rings 4808 that provide air seals when in operation. The application of air pressure and the upward releasing push with the finger configuration shown enables sufficient clearance to "grasp" the hub 4804. The design shown has good positional repeatability, and the fail-safe design offers advantages over existing designs.

All parts may be fabricated from steel or similar material providing the functionality described, while the fingers 4806 and associated chuck clamp 4805 may be formed from high strength aluminum. This material affords sufficient flexibility of the fingers in the configuration shown while at the same time providing sufficient strength to hold the hub 4804. The fingers 4806 and aluminum chuck clamp 4805 may be coated with a synergistic coating that provides significant lubrisity. The chuck clamp housing may be formed from hardened steel. Again, other materials may be used as long as they provide the functionality and benefits described herein.

Figure 49:
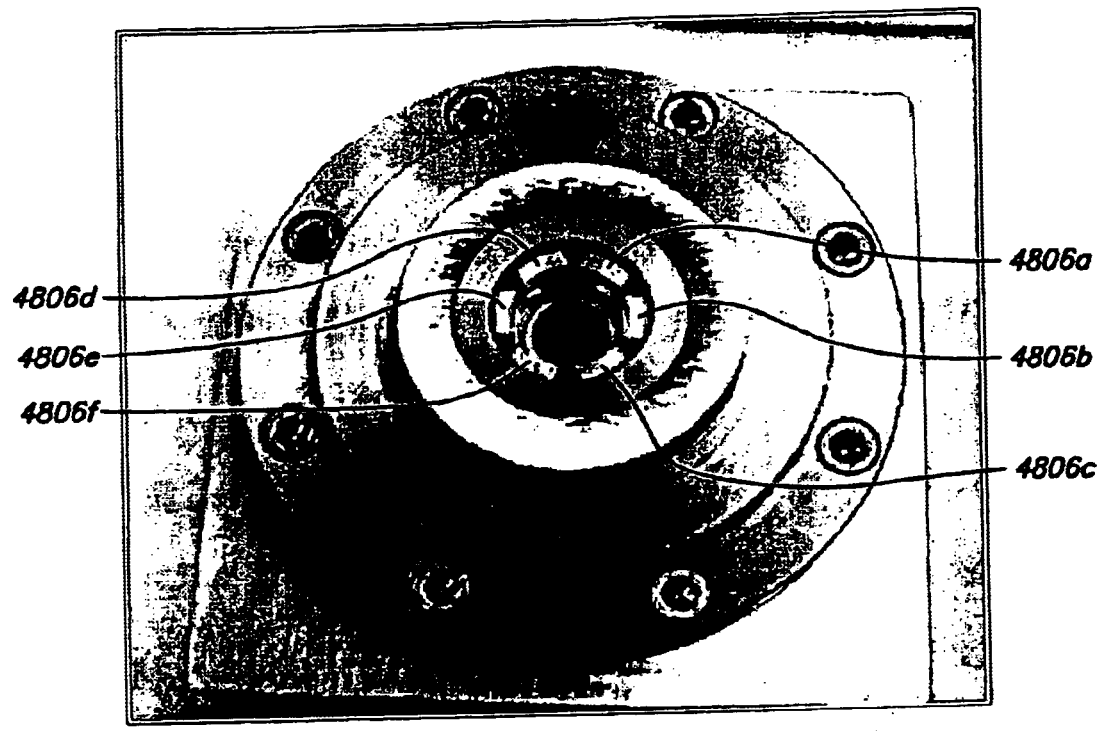
FIG. 49 is an alternate view of the finger gripping mechanism according to one embodiment of the current invention.
Figure 50:
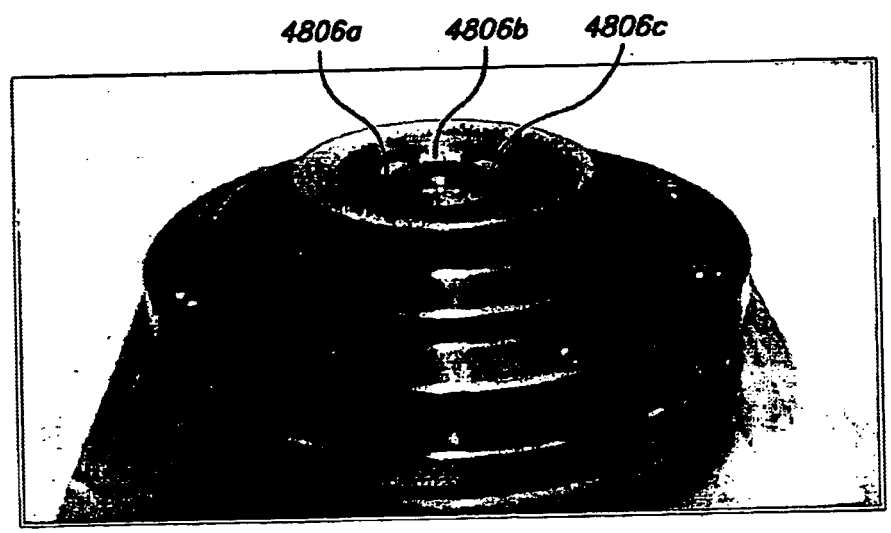
FIG. 50 is another alternate view of the finger gripping mechanism according to one embodiment of the current invention.

Further illustrations of the present design are shown in FIGS. 49 and 50. The angles of the fingers 4806 may be altered from the current approximate 10 degrees shown in FIG. 45 to 5 degrees or some other number. Further, the present design uses six fingers, but any number greater than three fingers could be used with likely adequate results. The present aspect of the design may be employed in any spin device where a hub or rounded end piece must be grasped accurately, such as a lathe or other industrial application. The implementation illustrated herein is that of clamping a disk hub for use in servowriting and disk inspection.

While the invention has been described in connection with specific embodiments thereof, it will be understood that the invention is capable of further modifications. This application is intended to cover any variations, uses or adaptations of the invention following, in general, the principles of the invention, and including such departures from the present disclosure as come within known and customary practice within the art to which the invention pertains.

What is claimed is:

1. A system for detecting movement of a plurality of disks mounted to a spindle, comprising:
   a transmitter/receiver capable of emitting a first beam of energy toward said spindle and receiving energy from said spindle; and
   an error calculator determining differences between actual head position based on a reflective element position and orientation of the spindle.

2. The system of claim 1, wherein said transmitter/receiver comprises an interferometer, and said energy comprises light energy.

3. The system of claim 1, wherein the transmitter/receiver comprises a laser diode and an optical detector.

4. The system of claim 1, wherein the spindle is polished to provide a high degree of reflectivity.

5. The system of claim 1, wherein the spindle is at least partially covered with a reflective material.

6. The system of claim 2, wherein the interferometer comprises a dual beam interferometer, and the transmitter/receiver further comprises a plurality of optical detectors.

7. The system of claim 1, wherein the spindle has a circumference and where the spindle comprises elements regularly spaced around the circumference of the spindle.

8. The system of claim 1, further comprising a lensing arrangement for receiving light energy and converting said received light energy into collimated light energy.

9. A system for positioning a head over a disk, said disk mounted to a spindle, comprising:
   a transmitter/receiver capable of emitting a first beam of energy toward said spindle and receiving energy from said spindle;
   a reflective element positionally emulating the head and oriented to receive a second beam of light energy from said transmitter/receiver and reflect the second beam back toward said transmitter/receiver; and
   an error calculator determining differences between actual head position based on said reflective element position and orientation of the spindle.

10. The system of claim 9, wherein said transmitter/receiver comprises an interferometer, and said energy comprises light energy.

11. The system of claim 9, wherein the transmitter/receiver comprises a laser diode and an optical detector.

12. The system of claim 9, wherein the spindle is polished to provide a high degree of reflectivity.

13. The system of claim 9, wherein the spindle is at least partially covered with a reflective material.

14. The system of claim 10, wherein the interferometer comprises a dual beam interferometer, and the transmitter/receiver further comprises a plurality of optical detectors.

15. The system of claim 9, wherein the spindle has a circumference and where the spindle comprises elements regularly spaced around the circumference of the spindle.

16. The system of claim 9, further comprising a lensing arrangement for receiving light energy and converting said received light energy into collimated light energy.

17. A method for positioning a head above a disk rotating about a spindle, comprising:
   transmitting a first light energy beam to said spindle and receiving light energy reflected off the spindle;
   transmitting a second light energy beam to a reflective element positioned to substantially emulate head position;
   receiving light energy from said transmitting that is reflected off the reflected element;
   computing an error signal based on positional differences between said spindle, said emulated head, and disk orientation; and
   altering head position based on the computed error signal.

18. The method of claim 17, wherein the reflective element comprises a corner cube mounted to an e-block.

19. The method of claim 17, wherein the first light energy transmitting beam and second light energy transmitting beam emanate from a dual beam interferometer.

20. The method of claim 17, wherein the second light energy beam is collimated.

21. The method of claim 17, further comprising transmitting a third light energy beam to the disk to provide z-axis measurement and provide tilt data.

22. The method of claim 17, wherein orientation of the first light energy beam is approximately 90 degrees different from orientation of the second light energy beam.

23. The method of claim 17, wherein orientation of the first light energy beam is greater than approximately 45 degrees from orientation of the second light energy beam.

24. A system for accurately positioning a head over a media disk, said media disk rotating about a spindle, comprising:
   a dual beam interferometer emitting a first beam of light energy toward said spindle and receiving reflected light energy from said spindle;

a reflective element positionally emulating the head and oriented to receive a second beam of light energy from said dual beam interferometer and reflect the second beam back toward said dual beam interferometer;

an error calculator determining differences between actual head position based on said reflective element position and orientation of said spindle.

25. The system of claim 24, further comprising a lensing arrangement for receiving light energy transmitted from the dual beam interferometer and converting said light energy into collimated light energy.

26. The system of claim 24, wherein the reflective element comprises a corner cube mounted to an e-block.

27. The system of claim 24, wherein the second light energy beam is collimated.

28. The system of claim 24, further comprising transmitting a third light energy beam toward the spindle to provide z-axis measurement and provide tilt data.

29. A method for efficiently positioning a head above a media disk rotating about a spindle, comprising:

transmitting a first light energy beam to said spindle and receiving light energy reflected off the spindle;

transmitting a second light energy beam to a reflective element positioned to substantially emulate head position and receiving light energy reflected off the reflective element;

computing an error signal based on positional differences between said spindle, said emulated head, and disk orientation; and altering head position based on the computed error signal.

30. The method of claim 29, wherein the reflective element comprises a corner cube mounted to an e-block.

31. The method of claim 29, wherein the first light energy transmitting beam and second light energy transmitting beam emanate from a dual beam interferometer.

32. The method of claim 29, wherein the second light energy beam is collimated.

33. The method of claim 29, further comprising transmitting a third light energy beam to the disk to provide z-axis measurement and provide tilt data.

34. The method of claim 29, wherein orientation of the first light energy beam is approximately 90 degrees different from orientation of the second light energy beam.

35. The method of claim 29, wherein orientation of the first light energy beam is greater than approximately 45 degrees from orientation of the second light energy beam.

36. A system for accurately positioning a head over rotating media, said rotating media able to spin about a center axis, comprising:

an interferometer having the ability to emit light energy and measure an effective distance between said head and said spindle; and means for computing a correction factor to be applied to said spindle to correct for any perceived distance errors related to said head measurement.

37. A system for determining spindle orientation inaccuracies, comprising:

an interferometer having the ability to emit light energy and measure an effective distance between said interferometer and said spindle; and means for computing a correction factor for application to the spindle to correct for perceived errors.

38. The system of claim 37, wherein the interferometer comprises a tri coupler.

39. The system of claim 37, wherein the light energy emitted from the interferometer is collimated.

40. The system of claim 37, further comprising transmitting an additional energy beam toward the spindle to ascertain z-axis performance and tilt data.

41. The system of claim 37, wherein orientation of the light energy is approximately 90 degrees different from orientation of the additional light energy beam.

42. The method of claim 37, wherein orientation of the light energy is greater than approximately 45 degrees from orientation of the additional light energy beam.

* * * * *